United States Patent
Konami et al.

(10) Patent No.: US 9,342,921 B2
(45) Date of Patent: May 17, 2016

(54) CONTROL APPARATUS, ELECTRONIC DEVICE, CONTROL METHOD, AND PROGRAM

(71) Applicant: Sony Corporation, Tokyo (JP)

(72) Inventors: Shuichi Konami, Chiba (JP); Osamu Ooba, Tokyo (JP); Yousuke Kawana, Tokyo (JP)

(73) Assignee: Sony Corporation (JP)

( * ) Notice: Subject to any disclaimer, the term of this patent is extended or adjusted under 35 U.S.C. 154(b) by 442 days.

(21) Appl. No.: 13/788,127

(22) Filed: Mar. 7, 2013

(65) Prior Publication Data
US 2013/0241925 A1    Sep. 19, 2013

(30) Foreign Application Priority Data
Mar. 16, 2012  (JP) .................................. 2012-060671

(51) Int. Cl.
| | |
|---|---|
| *G06T 15/08* | (2011.01) |
| *G06F 3/01* | (2006.01) |
| *G06F 3/0481* | (2013.01) |
| *G06F 3/0484* | (2013.01) |

(52) U.S. Cl.
CPC ................ *G06T 15/08* (2013.01); *G06F 3/012* (2013.01); *G06F 3/013* (2013.01); *G06F 3/017* (2013.01); *G06F 3/04815* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 7,719,621 B2 * | 5/2010 | Tsuboi ............... | G02B 27/2214 348/51 |
| 2010/0064259 A1 | 3/2010 | Alexanderovitc et al. | |
| 2011/0159929 A1 * | 6/2011 | Karaoguz .......... | H04N 13/0404 455/566 |
| 2011/0310227 A1 | 12/2011 | Konertz et al. | |
| 2012/0069131 A1 * | 3/2012 | Abelow ............... | G06Q 10/067 348/14.01 |

FOREIGN PATENT DOCUMENTS

| | | |
|---|---|---|
| CN | 101101379 A | 1/2008 |
| JP | 2001238253 A | 8/2001 |
| JP | 2002183150 A | 6/2002 |
| JP | 2005091475 A | 4/2005 |
| JP | 2006-235116 A | 9/2006 |
| JP | 2006343419 A | 12/2006 |

(Continued)

OTHER PUBLICATIONS

Chinese Office Action for CN Application No. 201310074888.9, dated Dec. 28, 2015.

(Continued)

*Primary Examiner* — Sath V Perungavoor
*Assistant Examiner* — Janese Duley
(74) *Attorney, Agent, or Firm* — Lerner, David, Littenberg, Krumholz & Mentlik, LLP

(57) ABSTRACT

There is provided a control apparatus including a control unit configured to control information to be displayed on a display screen in a manner that a different type of information is visually recognized according to a positional relationship between the display screen and a predetermined portion of a user viewing the display screen. The information to be displayed on the display screen under control of the control unit is information extracted from information capable of being displayed on the display screen as information having an attribute satisfying a predetermined condition set for each positional relationship.

10 Claims, 61 Drawing Sheets

EXAMPLE OF MULTI-PARALLAX DISPLAY

(56) References Cited

FOREIGN PATENT DOCUMENTS

| | | | |
|---|---|---|---|
| JP | 2008129775 A | 6/2008 | |
| JP | 2008256904 A | 10/2008 | |
| JP | 2011197537 A | 10/2011 | |
| WO | 2011149558 A2 | 12/2011 | |

OTHER PUBLICATIONS

Japanese Office Action for JP Application No. 2012060671, dated Jan. 5, 2016.

* cited by examiner

DISPLAY EXAMPLE OF OBJECT

FIG.23

EXAMPLE OF FILTER (FILTERING OF SUPERIMPOSITION INFORMATION)

| | BANK | BEEF BARBECUE RESTAURANT | STATION | BUS STOP | POST OFFICE |
|---|---|---|---|---|---|
| ATM FILTER | ○ | × | × | × | ○ |
| MEAL FILTER | × | ○ | × | × | × |
| TRANSPORT FACILITY FILTER | × | × | ○ | ○ | × |
| ... | ... | ... | ... | ... | ... |

FIG.24

EXAMPLE OF FILTER (FILTERING OF OPERATION OBJECT)

|  | SHUTTER | ZOOM | PLAYBACK | STOP | TRANSMISSION |
|---|---|---|---|---|---|
| PHOTO FILTER | ○ | ○ | × | × | × |
| MUSIC FILTER | × | × | ○ | ○ | × |
| MOVIE FILTER | × | × | ○ | ○ | × |
| ... | ... | ... | ... | ... | ... |

FIG.25

EXAMPLE OF FILTER (FILTERING OF MUSIC CONTENT)

| | MUSIC#1 | MUSIC#2 | MUSIC#3 | MUSIC#4 | MUSIC#5 |
|---|---|---|---|---|---|
| BALLADE FILTER | ○ | × | × | × | × |
| WALTZ FILTER | × | × | ○ | × | × |
| ETUDE FILTER | × | × | × | ○ | × |
| ... | ... | ... | ... | ... | ... |

FIG.26

EXAMPLE OF FILTER (FILTERING OF VIDEO CONTENT)

|  | MOVIE#1 | MOVIE#2 | MOVIE#3 | MOVIE#4 | MOVIE#5 |
|---|---|---|---|---|---|
| HORROR FILTER | ○ | × | ○ | × | × |
| ACTION FILTER | × | × | ○ | × | ○ |
| LOVE STORY FILTER | × | × | × | ○ | ○ |
| ... | ... | ... | ... | ... | ... |

FIG.28

FILTERING ACCORDING TO GAZE ANGLE

| | 0~10° | 11~20° | 21~30° | 31°~ |
|---|---|---|---|---|
| SHOP-NAME FILTER | ○ | × | × | ○ |
| OCCUPATION FILTER | × | ○ | × | ○ |
| PRICE-RANGE FILTER | × | × | ○ | ○ |
| ... | ... | ... | ... | ... |

FIG.29

ENLARGEMENT/REDUCTION BY PEEPING (GAZE ANGLE)

| GAZE ANGLE | 0~10° | 11~20° | 21~30° | 31° ~ |
|---|---|---|---|---|
| DISPLAY MAGNIFICATION | 100% | 110% | 140% | 200% |

FIG.30

ENLARGEMENT/REDUCTION BY PEEPING (DISTANCE BETWEEN SCREEN AND HEAD)

| DISTANCE BETWEEN SCREEN AND HEAD | NEAR | STANDARD RANGE | FAR |
|---|---|---|---|
| DISPLAY MAGNIFICATION | 150% | 100% | 50% |

FIG.33

FIXING OF DISPLAY CONTROL BASED ON STATIONARY TIME AND FIXING RELEASE METHOD

| VIEWPOINT MOVEMENT | LONG MOTIONLESSNESS | SHORT MOTIONLESSNESS | NORMAL MOVEMENT | SMALL VIBRATION | BLINK |
|---|---|---|---|---|---|
| OPERATION | FIXING | NORMAL DISPLAY | NORMAL DISPLAY | FIXING RELEASE | FIXING RELEASE |

TWO-DIMENSIONAL (2D) + DEPTH REPRESENTATION

FIG.55

RANKING OF SELECTION RESULTS

| | No.1 | No.2 | No.3 | No.4 | No.5 |
|---|---|---|---|---|---|
| SELECTION RESULTS OF MEN IN 20'S | OBJ4 | OBJ1 | OBJ7 | OBJ2 | OBJ5 |
| SELECTION RESULTS OF MEN IN 30'S | OBJ1 | OBJ9 | OBJ6 | OBJ5 | OBJ2 |
| SELECTION RESULTS OF MEN IN 40'S | OBJ1 | OBJ4 | OBJ2 | OBJ7 | OBJ5 |
| ... | ... | ... | ... | ... | ... |

FIG.56

EXAMPLE OF HIGHLIGHTING

| NUMBER OF LINE-OF-SIGHT INTERSECTIONS | NONE | FEW | MANY | THRESHOLD VALUE OR MORE |
|---|---|---|---|---|
| COLOR REPRESENTATION | NOT HIGHLIGHTED | BLUISH | YELLOWISH | REDDISH |
| MOTION REPRESENTATION | MOTIONLESSNESS | SHAKINESS | VIBRATION | ROTATION |
| TRANSPARENCY | 80% | 60% | 30% | 10% |
| ... | ... | ... | ... | ... |

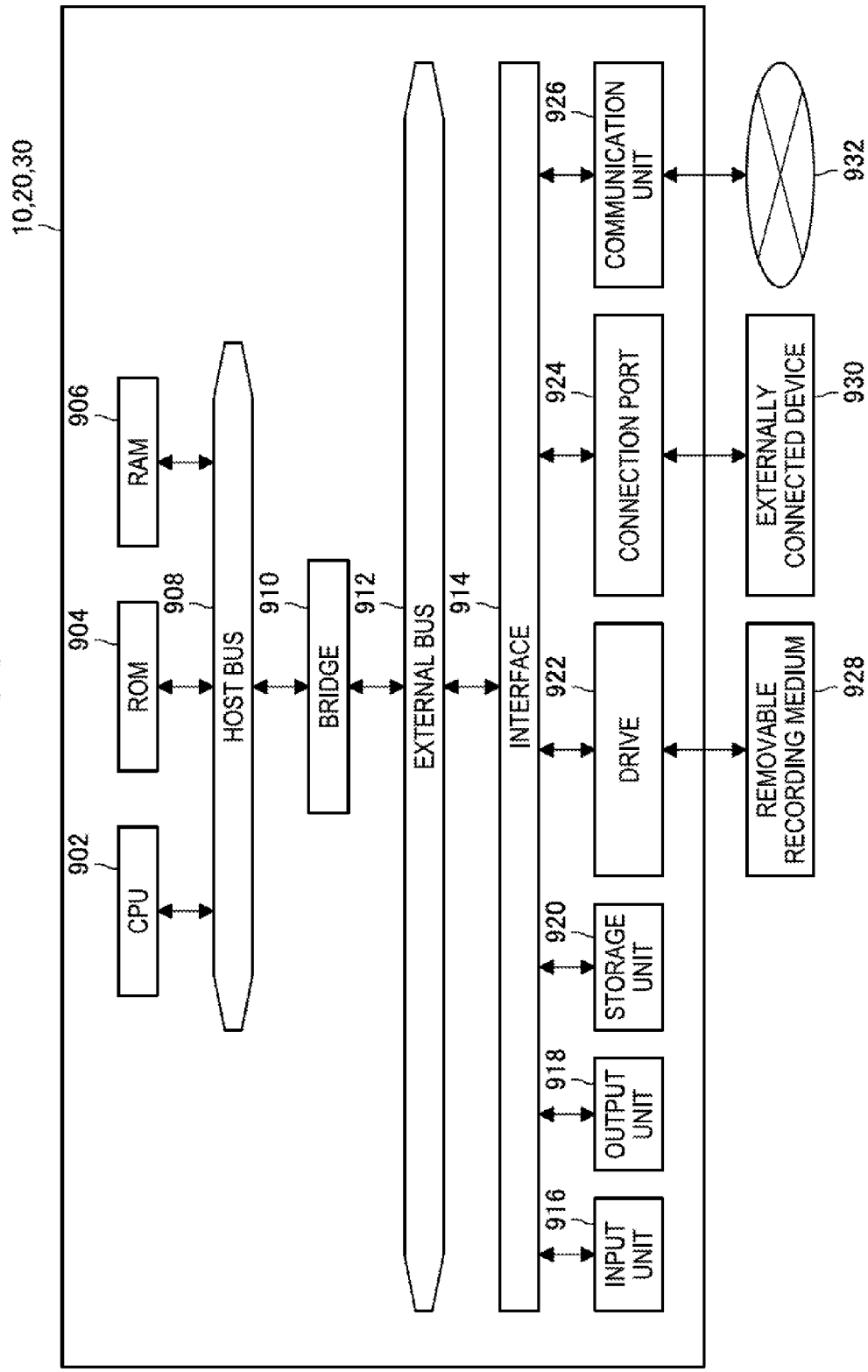

CONTROL APPARATUS, ELECTRONIC DEVICE, CONTROL METHOD, AND PROGRAM

CROSS-REFERENCE TO RELATED APPLICATION

The present application claims priority from Japanese Patent Application No. JP 2012-060671 filed in the Japanese Patent Office on Mar. 16, 2012, the entire content of which is incorporated herein by reference.

BACKGROUND

The present technology relates to a control apparatus, an electronic device, a control method, and a program.

Recently, stereoscopic view display technology for allowing a viewer to recognize a stereoscopic sense of a video by displaying a video in which parallax is considered has received attention. The stereoscopic view display technology is technology for allowing the viewer to recognize the stereoscopic sense of the video by preparing a left-eye video and a right-eye video in consideration of the parallax, projecting the left-eye video to a left eye of the viewer, and projecting the right-eye video to a right eye of the viewer. In this technology, there are a scheme of projecting different videos to the left and right eyes using dedicated glasses (a scheme using polarization or the like) and a scheme of separating light entering the left and right eyes using a lenticular lens, a parallax barrier, or the like (a so-called naked-eye three dimensional (3D) scheme) (see JP 2006-235116A).

These technologies are widely known as the stereoscopic view display technology, but technologies for displaying different videos or images at different viewpoints using the lenticular lens, the parallax barrier, or the like can be more generalized. For example, if the lenticular lens, the parallax barrier, or the like is used, it is possible to display different videos with respect to three or more viewpoints without being limited to two viewpoints (that is, the left and right eyes). In addition, if the stereoscopic view display is not considered, it is also possible to project entirely-separate images to three or more different viewpoints. The above-described technology is referred to as multi-parallax display technology.

SUMMARY

The inventors have studied methods of applying the above-described multi-parallax display technology and equivalent technologies to user interfaces (UIs). In this process, the inventors have come to have various questions about configurations of UIs adopted by many electronic devices currently proliferated. Although there are various input devices including a touch panel and users usually perform operations using the input devices with comfort, one question is whether higher operability is obtainable without contact with an operation device in a certain type of operation. In addition, if a UI by which an operation can be performed without contact with the operation device is implemented, it seems that a new service not contemplated so far is likely to be implemented.

It is desirable to provide a novel and improved control apparatus, electronic device, control method, and program capable of implementing more comfortable operability.

According to an embodiment of the present disclosure, there is provided a control apparatus including a control unit configured to control information to be displayed on a display screen in a manner that a different type of information is visually recognized according to a positional relationship between the display screen and a predetermined portion of a user viewing the display screen. The information to be displayed on the display screen under control of the control unit is information extracted from information capable of being displayed on the display screen as information having an attribute satisfying a predetermined condition set for each positional relationship.

According to an embodiment of the present disclosure, there is provided an electronic device including a display unit configured to display information, and a control unit configured to control information to be displayed on a display screen of the display unit in a manner that a different type of information is visually recognized according to a positional relationship between the display screen and a predetermined portion of a user viewing the display screen. The information to be displayed on the display screen under control of the control unit is information extracted from information capable of being displayed on the display screen as information having an attribute satisfying a predetermined condition set for each positional relationship.

According to an embodiment of the present disclosure, there is provided a control method including controlling information to be displayed on a display screen in a manner that a different type of information is visually recognized according to a positional relationship between the display screen and a predetermined portion of a user viewing the display screen. The information to be displayed on the display screen under control in the controlling step is information extracted from information capable of being displayed on the display screen as information having an attribute satisfying a predetermined condition set for each positional relationship.

According to an embodiment of the present disclosure, there is provided a control method including controlling, by an electronic device having a display unit that displays information, information to be displayed on a display screen of a display unit in a manner that a different type of information is visually recognized according to a positional relationship between the display screen and a predetermined portion of a user viewing the display screen. The information to be displayed on the display screen under control in the controlling step is information extracted from information capable of being displayed on the display screen as information having an attribute satisfying a predetermined condition set for each positional relationship.

According to an embodiment of the present disclosure, there is provided a program for causing a computer to realize a control function of controlling information to be displayed on a display screen in a manner that a different type of information is visually recognized according to a positional relationship between the display screen and a predetermined portion of a user viewing the display screen. The information to be displayed on the display screen under control of the control function is information extracted from information capable of being displayed on the display screen as information having an attribute satisfying a predetermined condition set for each positional relationship.

According to an embodiment of the present disclosure, there is provided a program for causing a computer to realize a display function of displaying information, and a control function of controlling information to be displayed on a display screen on which the information is displayed in a manner that a different type of information is visually recognized according to a positional relationship between the display screen and a predetermined portion of a user viewing the display screen. The information to be displayed on the display screen under control of the control function is information extracted from information capable of being displayed on the display screen as information having an attribute satisfying a predetermined condition set for each positional relationship.

In addition, in accordance with another embodiment of the present technology, a computer-readable recording medium recording the above-described program is provided.

In accordance with the present technology as described above, it is possible to implement more comfortable operability.

BRIEF DESCRIPTION OF THE DRAWINGS

FIG. 23 is an explanatory diagram illustrating filtering of superimposition information;

FIG. 24 is an explanatory diagram illustrating filtering of an operation object;

FIG. 25 is an explanatory diagram illustrating filtering of content;

FIG. 26 is an explanatory diagram illustrating filtering of content;

FIG. 28 is an explanatory diagram illustrating filtering according to an angle of gaze;

FIG. 29 is an explanatory diagram illustrating an enlargement/reduction operation by peeping;

FIG. 30 is an explanatory diagram illustrating an enlargement/reduction operation by peeping;

FIG. 33 is an explanatory diagram illustrating an operation of fixing display content based on a stationary time or blink;

FIG. 55 is an explanatory diagram illustrating a ranking display of selection results;

FIG. 56 is an explanatory diagram illustrating a method of highlighting an object corresponding to the number of line-of-sight intersections;

FIG. 61 is an explanatory diagram illustrating a configuration of hardware capable of implementing functions of an electronic device and a server in accordance with this embodiment.

DETAILED DESCRIPTION OF THE EMBODIMENT(S)

Figure 1:
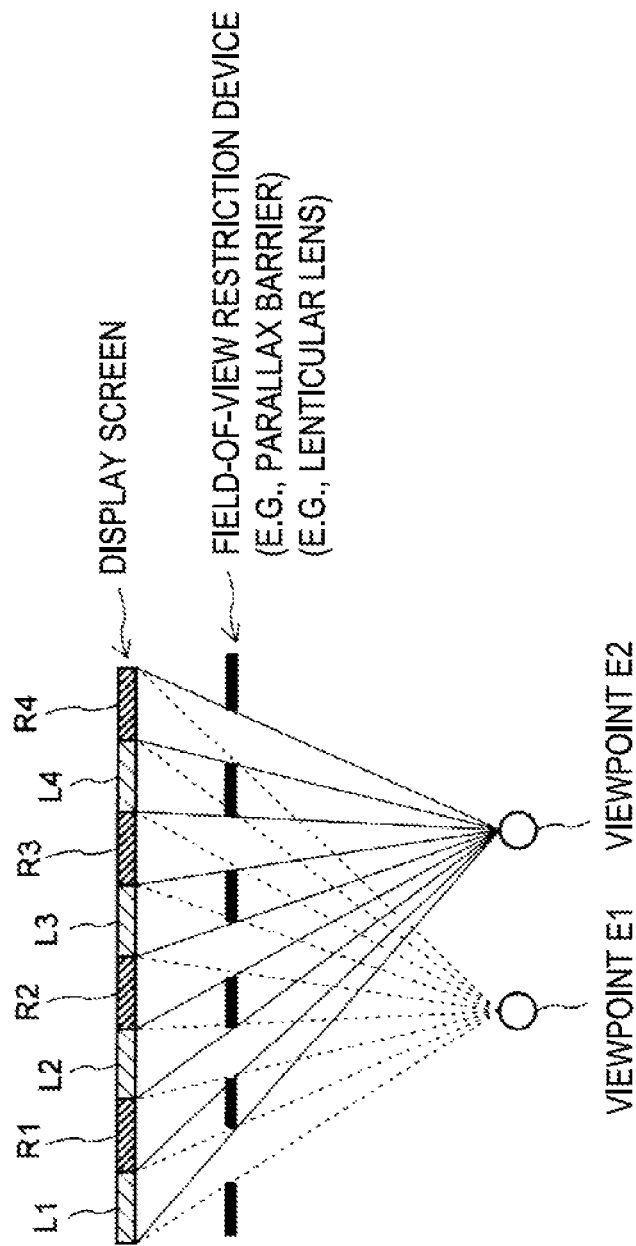
FIG. 1 is an explanatory diagram illustrating a multi-parallax display.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Here, the flow of the following description will be briefly described.

First, the outline of technology in accordance with this embodiment will be described with reference to FIGS. 1 to 12. Then, a first example of this embodiment will be described with reference to FIGS. 13 to 33. Then, a second example of this embodiment will be described with reference to FIGS. 34 to 59. Then, an object selection method in which a portion of an object conspicuous to a user is recognized will be described with reference to FIG. 60. Then, an example of a method of combining the first and second examples of this embodiment will be introduced. Then, an example of a hardware configuration in which technology in accordance with this embodiment is implemented will be described with reference to FIG. 61. Finally, technical ideas of the same embodiment will be summarized and operation effects obtained from the technical ideas will be briefly described.

(Description Items)

1: Introduction
   1-1: Introduction of Basic Technology
   1-1-1: Multi-Parallax Display
   1-1-2: Head Tracking
   1-2: Example of General UI and Consideration of Idea for Improvement
   1-2-1: Object Display Method
   1-2-2: Object Operation Method
   1-3: Outline of First Example (Filtering of Information, etc.)
   1-4: Outline of Second Example (Selection of Information, etc.)
   1-5: Detection of Environmental Vibration and Consideration of Countermeasures
   1-6: System Configuration Examples
   1-6-1: Configuration Example #1 (Configuration Using Cloud Environment)
   1-6-2: Configuration Example #2 (Configuration Using Function of Device)
   2: Details of First Example (Filtering of Information, etc.)
   2-1: Case of Configuration Example #1
   2-1-1: Functional Configuration of Electronic Device
   2-1-2: Functional Configuration of Server
   2-1-3: Basic Operation of System
   2-2: Case of Configuration Example #2
   2-2-1: Functional Configuration of Electronic Device
   2-2-2: Basic Operation of System
   2-3: (Application Example) Control of Application
   2-3-1: Application Switching Operation Corresponding to Line-of-Sight Direction
   2-3-2: Tool Switching Operation Corresponding to Line-of-Sight Direction
   2-3-3: Playback-Speed Switching Operation Corresponding to Line-of-Sight Direction
   2-4: (Application Example) Configuration of Filter
   2-4-1: Filtering of Superimposition Information
   2-4-2: Filtering of Operation Object
   2-4-3: Filtering of Content
   2-5: (Application Example) Peeping Operation
   2-5-1: Display of Information Regarding Gaze Point
   2-5-2: Filtering according to Angle of Gaze
   2-5-3: Enlargement/Reduction by Peeping
   2-6: (Application Example) Fixing of Display Content
   2-6-1: Fixing of Display Content by Gesture
   2-6-2: Fixing of Display Content by Line-of-Sight Movement to Predetermined Region
   2-6-3: Fixing of Display Content Based on Stationary Time
   2-6-4: Fixing of Display Content by Blink (Facial Expression Change)
   2-7: Application Example
   2-8: Effects
   3: Details of Second Example (Selection of Information, etc.)
   3-1: Case of Configuration Example #1
   3-1-1: Functional Configuration of Electronic Device
   3-1-2: Functional Configuration of Server
   3-1-3: Basic Operation of System
   3-2: Case of Configuration Example #2
   3-2-1: Functional Configuration of Electronic Device
   3-2-2: Basic Operation of System
   3-3: (Supplement) Depth Representation
   3-3-1: 3D Display
   3-3-2: 2D Display+Depth Information
   3-4: Object Selection Method #1 (Single User)
   3-4-1: Selection Method Based on Number of Line-of-Sight Intersections
   3-4-2: Region Division of Object
   3-4-3: Selection Determination Based on Gaze Time
   3-4-4: Selection Determination Based on Line-of-Sight Movement Speed
   3-4-5: Decision Operation by Gesture
   3-4-6: Decision Operation by Blink (Facial Expression Change)

3-4-7: Assistance of Narrowing-Down Operation by Movement of Object
3-4-8: Change of Selection Object
3-5: Object Selection Method #2 (Plurality of Users)
3-5-1: Selection Method Based on Number of Line-of-Sight Intersections
3-5-2: Personalization Based on Physical-Object Identification Result (Age/Sex/Registrant, etc.)
3-5-3: Ranking Display of Selection Results
3-6: Display of Gaze Situation
3-6-1: Highlighting Corresponding to Number of Line-of-Sight Intersections (Color/Motion/Transmission, etc.)
3-6-2: Heat map Display
3-6-3: Display of Number of Line-of-Sight Intersections by Numeric Value or Character
3-6-4: Display of Number of Line-of-Sight Intersections by Indicator
3-7: Cancelation Method
3-8: Method of Considering Conspicuous Region
3-9: Application Example
3-10: Effects
4: Application Example (Combination)
4-1: Display of Object Corresponding to Line-of-Sight Direction+Selection by Line of Sight
4-1-1: Fixing of Object Display+Selection by Line-of-Sight Movement
4-1-2: Display Control by Upward/Downward Movement+Selection Operation by Left/Right Movement
4-2: Combination of Plurality of Devices
4-2-1: Portable Device (Filter)+Television Receiver (Line-of-Sight Operation)
4-2-2: Portable Device (Filter)+Digital Signage Terminal (Line-of-Sight Operation)
5: Hardware Configuration Example
6: Summary

1: INTRODUCTION

Before detailed description of technology in accordance with this embodiment, basic technology relating to the technology will first be described. Then, outlines of examples will be described in detail later.
[1-1: Introduction of Basic Technology]
First, multi-parallax display technology and head tracking technology will be introduced.
(1-1-1: Multi-Parallax Display (FIGS. 1 to 3))
As described above, the multi-parallax display technology is widely used as basic technology of a 3D display. As illustrated in FIG. 1, the multi-parallax display is implemented by restricting a field of view using a field-of-view restriction device and causing a different display area to be viewed according to a viewpoint position. As the field-of-view restriction device, for example, there is a parallax lens, a lenticular lens, or the like. Of course, the lenticular lens does not restrict the field of view by light blocking, but the lenticular lens can implement a function equivalent to the parallax lens in that a region to be viewed is restricted by controlling a light guide.
In the example of FIG. 1, display areas R1, R2, R3, and R4 are not viewed from a viewpoint E1. Likewise, display areas L1, L2, L3, and L4 are not viewed from a viewpoint E2. In the description, a viewing position (for example, a position of an eye) is referred to as a "viewpoint." In the example of FIG. 1, if a right-eye image is displayed on the display areas R1, R2, R3, and R4 and a left-eye image is displayed on the display areas L1, L2, L3, and L4, the user stereoscopically recognizes the images when the viewpoint E1 is the user's left eye and the viewpoint E2 is the user's right eye.

Figure 2:
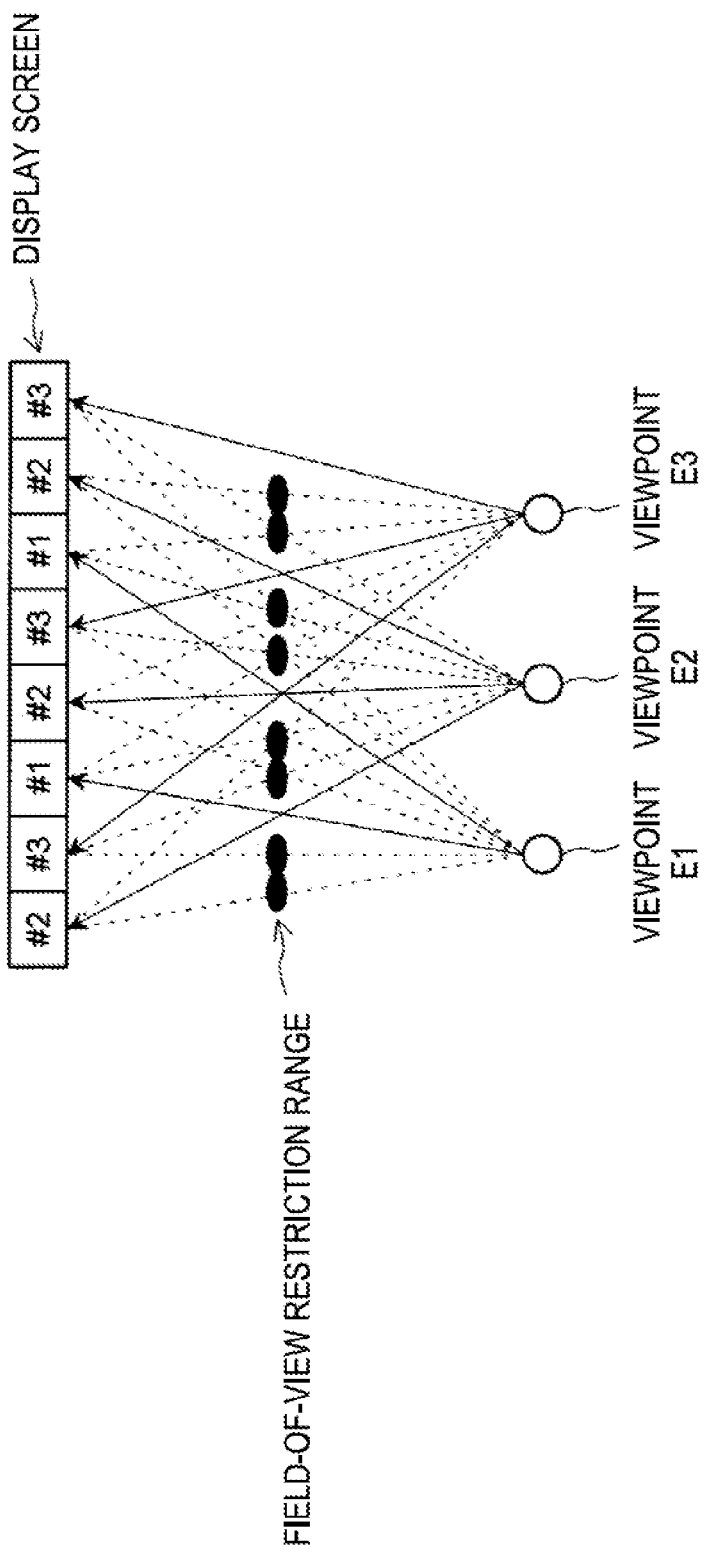
FIG. 2 is an explanatory diagram illustrating a multi-parallax display.

In the case of 3D display, although it is only necessary that different images be viewed with respect to two viewpoints, it is possible to cause different images to be viewed with respect to three or more viewpoints in substantially the same method. Specifically, as illustrated in FIG. 2, it is possible to limit each of ranges viewed from three or more viewpoints to a predetermined display area by controlling the field-of-view restriction device and adjusting the field-of-view restriction range. In the example of FIG. 2, a range viewed from a viewpoint E1 is limited to a display area #1, a range viewed from a viewpoint E2 is limited to a display area #2, and a range viewed from a viewpoint E3 is limited to a display area #3.

Figure 3:
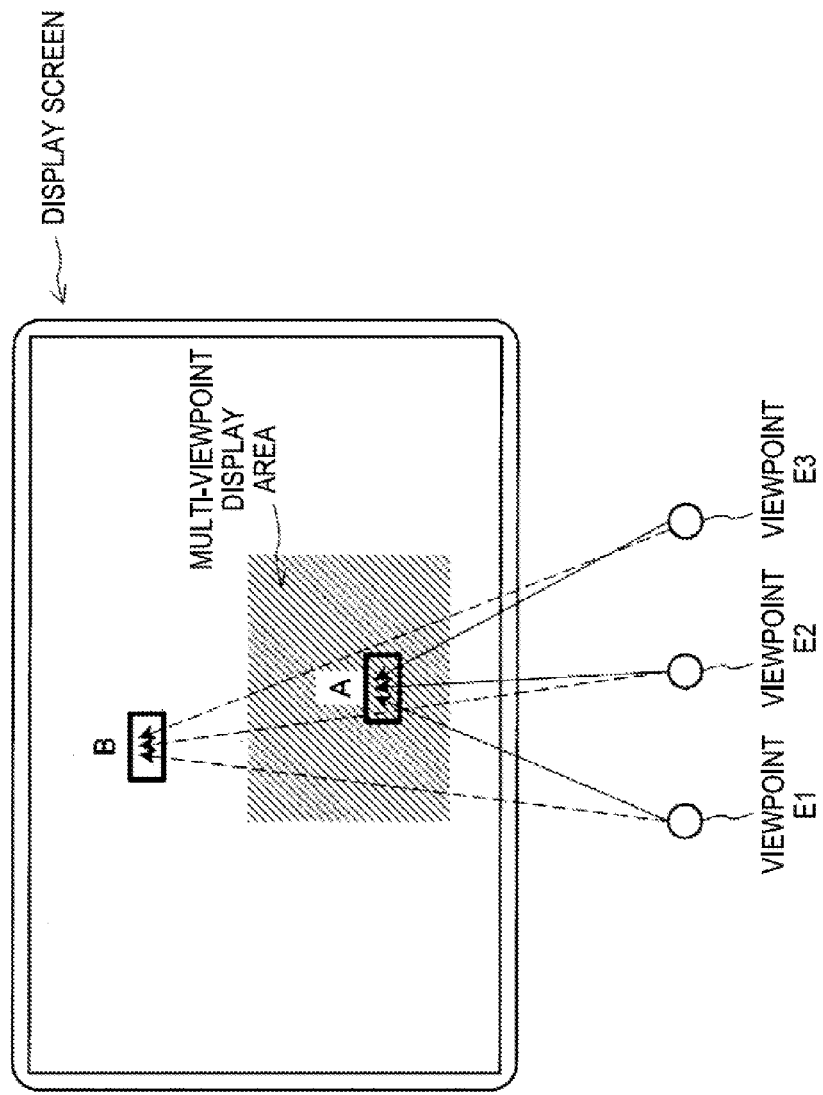
FIG. 3 is an explanatory diagram illustrating a multi-parallax display.

In the case of the 3D display, two types of images are displayed by considering parallax in two types of display areas corresponding to two viewpoints while being conscious of left and right eyes. However, if the same images are displayed, 2D display is performed. Accordingly, the multi-parallax display is applicable to the 2D display as well as the 3D display. Thus, in the following description, for ease of description, an example of the 3D or 2D display will be described. However, it should be noted that technologies to be described later are applicable to any display scheme. In addition, as illustrated in FIG. 3, only part of a display screen can be subjected to the multi-parallax display.

The multi-parallax display has been briefly described above.
(1-1-2: Head Tracking)
As described above, the multi-parallax display is a mechanism for causing different information to be viewed from each viewpoint position by restricting a field of view using the field-of-view restriction device. In addition to this mechanism, as a mechanism for causing different information to be viewed from each viewpoint position, for example, a mechanism using the head tracking technology is assumed. Therefore, the head tracking technology will be briefly introduced.

The head tracking technology is technology for tracking motion of a predetermined portion (for example, a head). For example, technology for tracking a subject from continuously captured images when a plurality of images are continuously captured such as when a preview image to be presented to the user is captured before a shutter operation in relation to an imaging apparatus is known. Specifically, technology for tracking a subject using a silicon retina (for example, see JP 2004-240591A) and technology for tracking a subject using depth sensing imaging technology (for example, see JP 2007-514211T) are known.

In addition, in Jean-Yves Bouguet's "Pyramidal Implementation of the Lucas Kanade Feature Tracker Description of the algorithm," from Intel Corporation Microprocessor Research Labs (2000) OpenCV Documents, a mechanism for tracking a subject using a Lucas-Kanade algorithm is proposed.

In addition, in the case of the technology using the silicon retina or depth sensing imaging technology, specialized equipment having the silicon retina or a depth camera is necessary. In addition, in the case of the mechanism using the Lucas-Kanade algorithm, a processing load necessary for detecting a feature point or tracking a subject is high and processing is time-consuming. Further, as a disadvantage of the Lucas-Kanade algorithm, it is pointed out that the subject is not stably tracked when a shape change is great or the like. Based on this point, recently, improved tracking technology has been developed (for example, see JP No. 2011-150594A). When this technology is applied, an imaging apparatus not equipped with the specialized equipment can stably track the subject (for example, a head or the like).

When the above-described tracking technology is used, it is possible to detect a direction of a face, a position of an eye, a line-of-sight direction, and the like. Thus, it is possible to implement a mechanism for causing different information to be viewed from each viewpoint position as in the case of the multi-parallax display by switching display content according to a detection result of a viewpoint position.

The head tracking has been briefly described above.

[1-2: Example of General UI and Consideration of Idea for Improvement]

Next, an example of a general UI is shown and a point to be improved is considered.

(1-2-1: Object Display Method (FIGS. 4 and 5))

Figure 4:
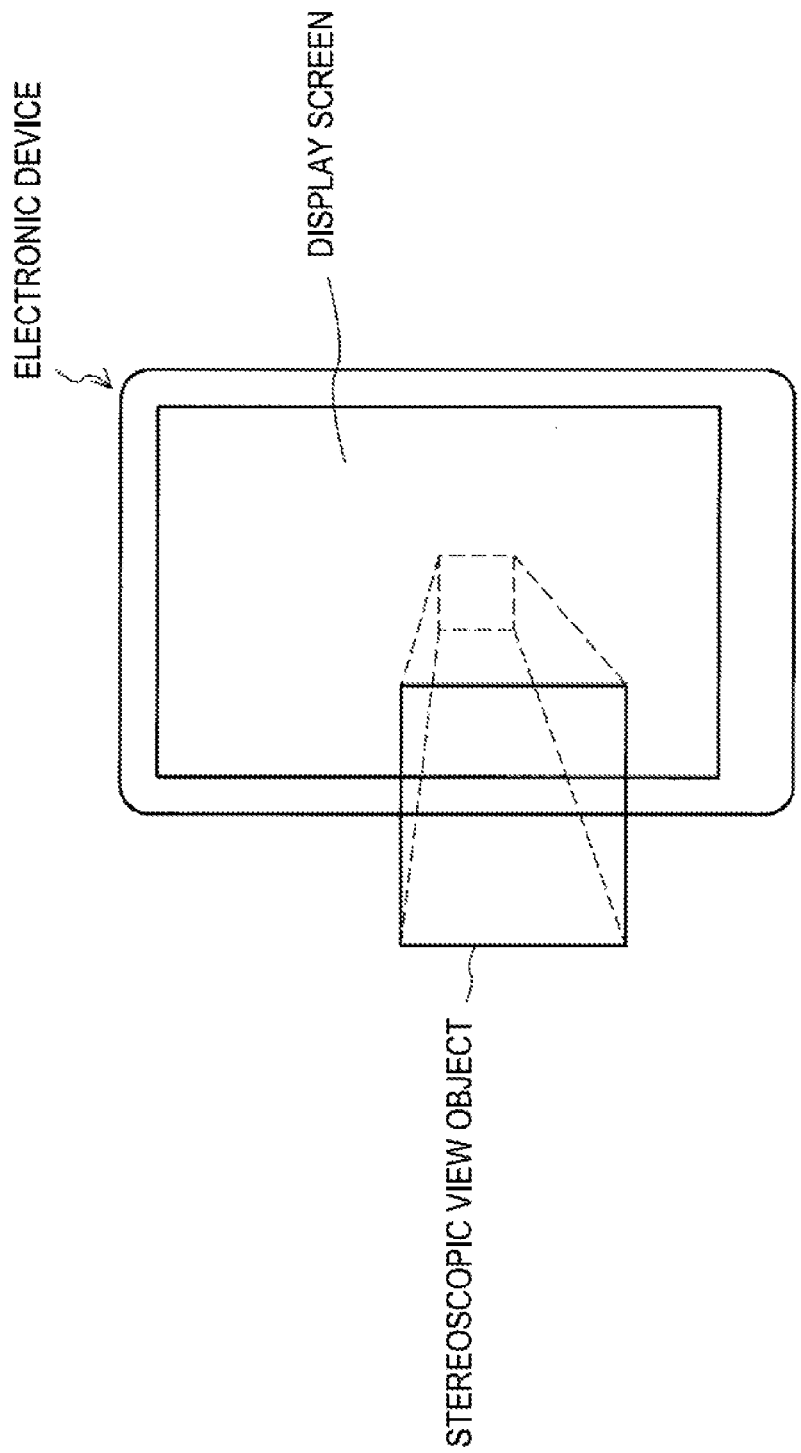
FIG. 4 is an explanatory diagram illustrating an object display method.

As illustrated in FIG. 4, a function of displaying a stereoscopic object is loaded in some electronic devices among currently proliferated electronic devices. As described above, it is possible to perform a display so that the object is stereoscopically viewed by restricting regions to be viewed by left and right eyes and displaying an image of an object in consideration of a parallax. In this case, exactly, an object is viewed to protrude from a display screen. This display method is widely applicable to electronic devices, for example, such as a portable terminal, a portable game machine, a portable phone, a television receiver, a digital signage terminal, and other display apparatuses.

Figure 5:
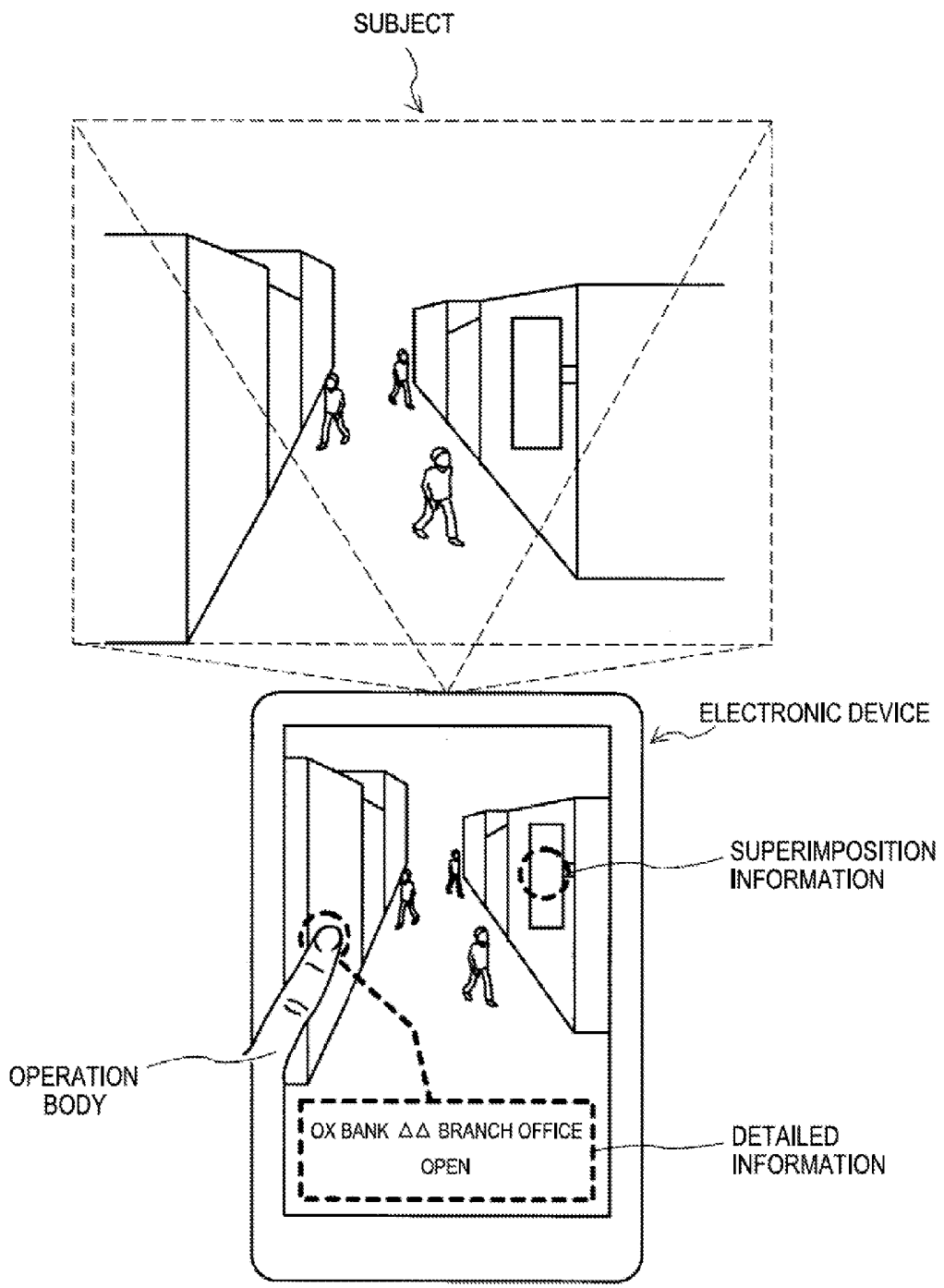
FIG. 5 is an explanatory diagram illustrating an object display method.

In addition, as illustrated in FIG. 5, technology for displaying a subject imaged using an imaging function of the electronic device in real time is known. Further, a function of superimposing and displaying information (hereinafter, superimposition information) on a displayed subject is loaded in some electronic devices. As the superimposition information, there is various information regarding the subject, for example, such as a name of a building, a name of a shop, handling products, a genre, and popularity. In addition, an object for clearly specifying the presence of the above-described related information may be displayed as the superimposition information. Further, there is also an application by which detailed superimposition information is obtained when the object is in contact with an operation body.

(1-2-2: Object Operation Method (FIG. 6))

Figure 6:
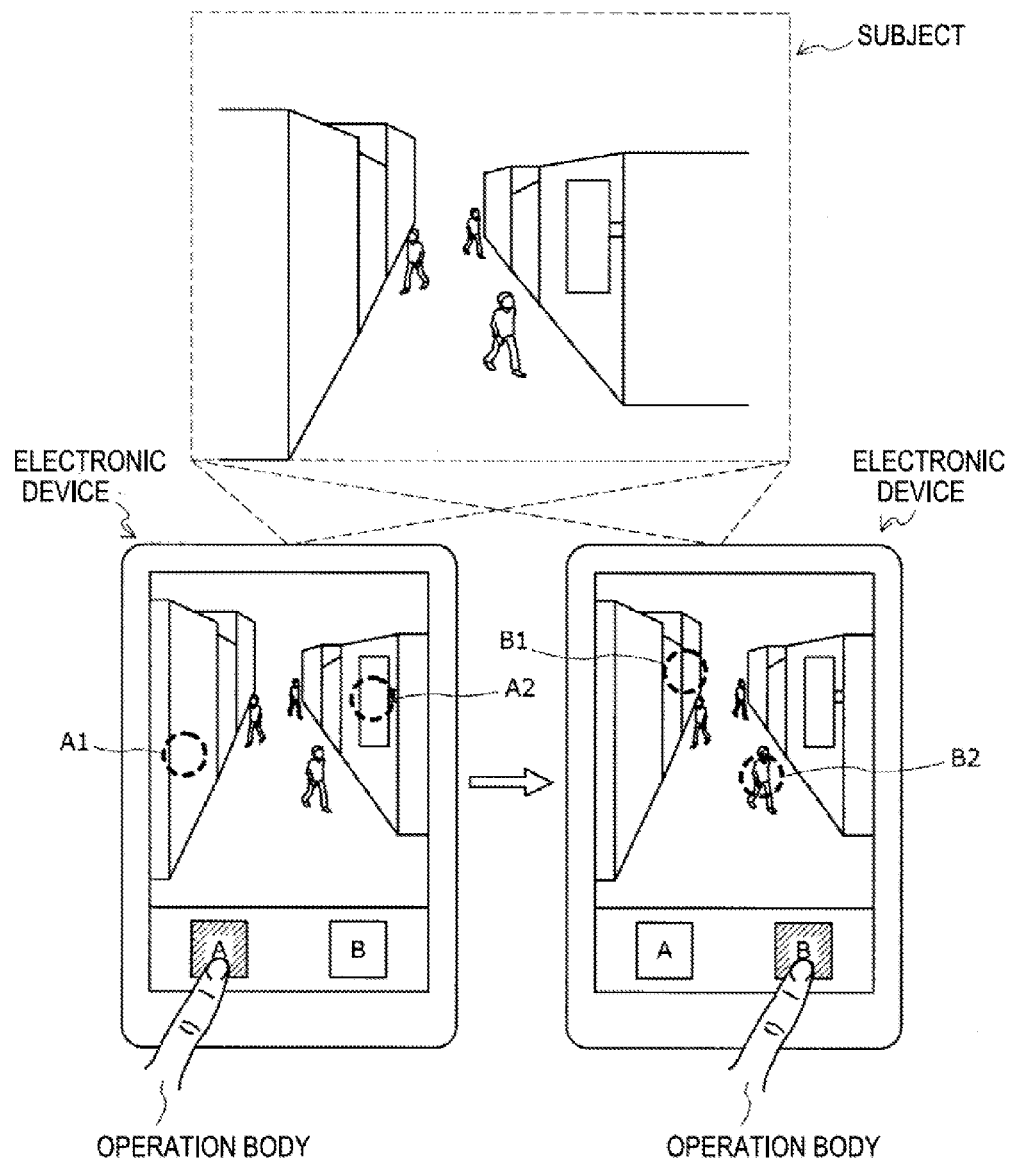
FIG. 6 is an explanatory diagram illustrating an object display method.

Further, in many electronic devices equipped with a display function of the superimposition information, as illustrated in FIG. 6, an operation system that switches a type or amount of superimposition information using a button operation is used. In the case of the electronic device illustrated in FIG. 6, superimposition information A1 and A2 is displayed when a button A has been pressed, and superimposition information B1 and B2 is displayed when a button B has been pressed.

There are definitely fewer chances of many users experiencing extreme inconvenience in the above-described operation system. However, the hands of a user who operates an electronic device with a large luggage or the like may be full. Because it is necessary to hold the electronic device with at least one hand, the user performs a button operation with the hand holding the electronic device when the other hand is full. Although a situation in which two large buttons are operated is shown for simplicity in the example of FIG. 6, a large number of small buttons may actually be arranged. In addition, an information display area is narrowed if a size of a button is large and it is more difficult to switch or narrow down information if the number of buttons further decreases.

Although the example of the button operation has been described, the same is true even in an operation of touching a predetermined region within a screen as in the example illustrated in FIG. 5. Further, as in the example illustrated in FIG. 4, when a stereoscopic view display is applied, skill is originally necessary to operate an object with the operation body. In view of such circumstances, an element that degrades the operability may be included in a UI itself necessary for the operation body to be physically in contact with a display screen of the electronic device or for the operation body to be virtually in contact with a stereoscopic view object. Of course, because the full exclusion of an operation system in which contact with the operation body is necessary is also expected to be a factor that degrades the operability, a good idea is to combine a new operation technique if necessary.

Next, a mechanism to be considered as the new operation technique will be discussed. In addition, a scene in which the new operation technique effectively functions will also be discussed. The inventors have designed a mechanism using the user's operation such as "view" by performing keen examination with the above-described concept. Hereinafter, specific examples will be introduced.

[1-3: Outline of First Example (Filtering of Information, Etc.) (FIGS. 7 and 8)]

First, the outline of the first example will be described. The first example relates to an operation technique of switching display information of viewpoint movement. This operation technique is based on viewpoint detection technology using the above-described multi-parallax display, head tracking, or the like.

Figure 7:
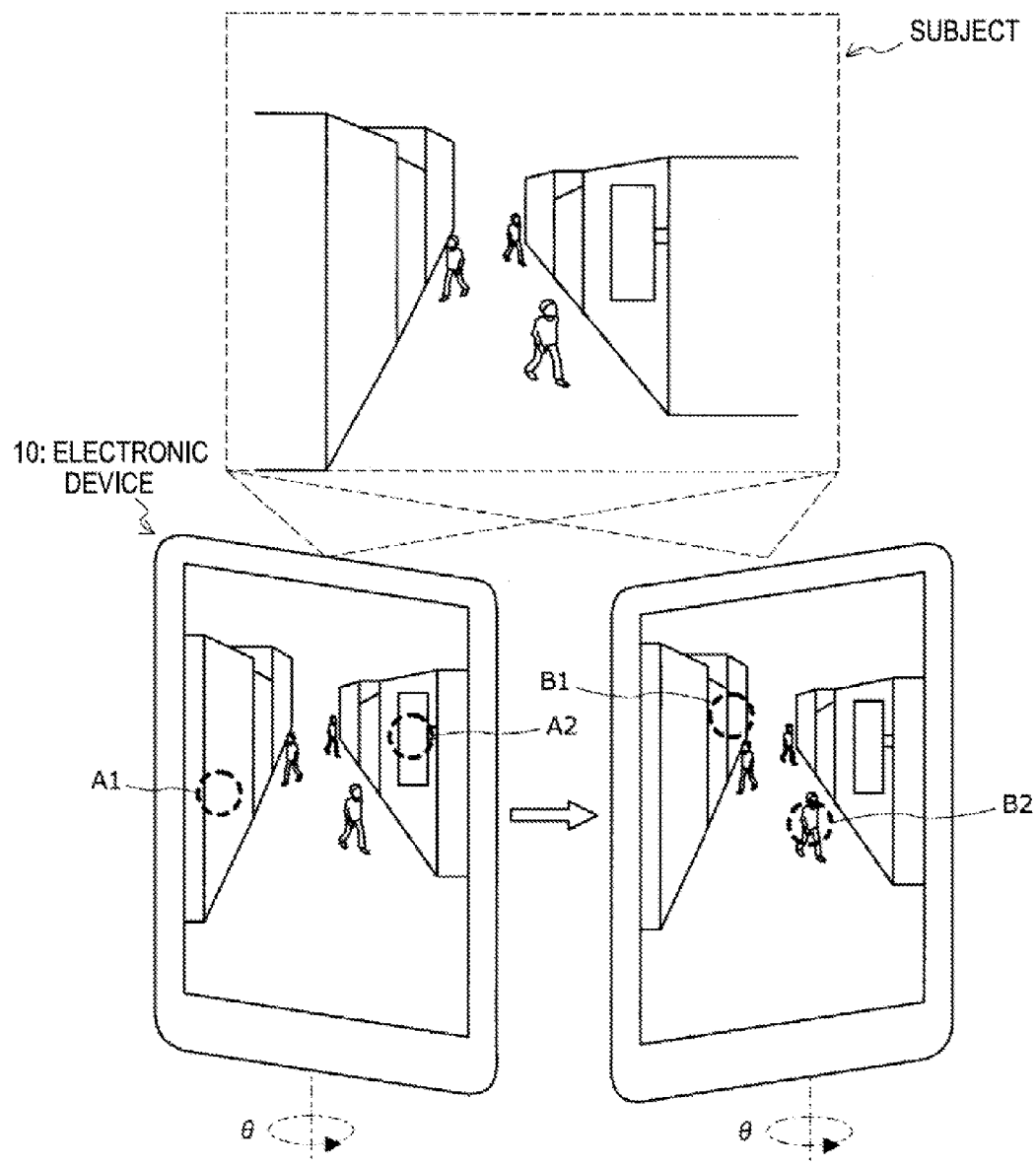
FIG. 7 is an explanatory diagram illustrating an outline of a first example.

For example, an electronic device 10 has a function of switching (filtering) a type of information to be viewed according to an angle $\theta$ at which the user views a display screen. Thus, as illustrated in FIG. 7, when the electronic device 10, for example, is viewed from the right toward the display screen (that is, when the electronic device 10 has a leftward tilt), superimposition information A1 and A2 is set to be viewed. Likewise, when the electronic device 10, for example, is viewed from the left toward the display screen (that is, when the electronic device 10 has a rightward tilt), superimposition information B1 and B2 is set to be viewed. The above-described function is provided, and hence the user can switch the display information only by tilting the direction of the electronic device 10 to the left/right in a state in which the electronic device 10 is held. Although an example in which the electronic device 10 has a tilt to the left/right is shown in FIG. 7, a similar function can be provided even in another direction such as up or down.

Figure 8:
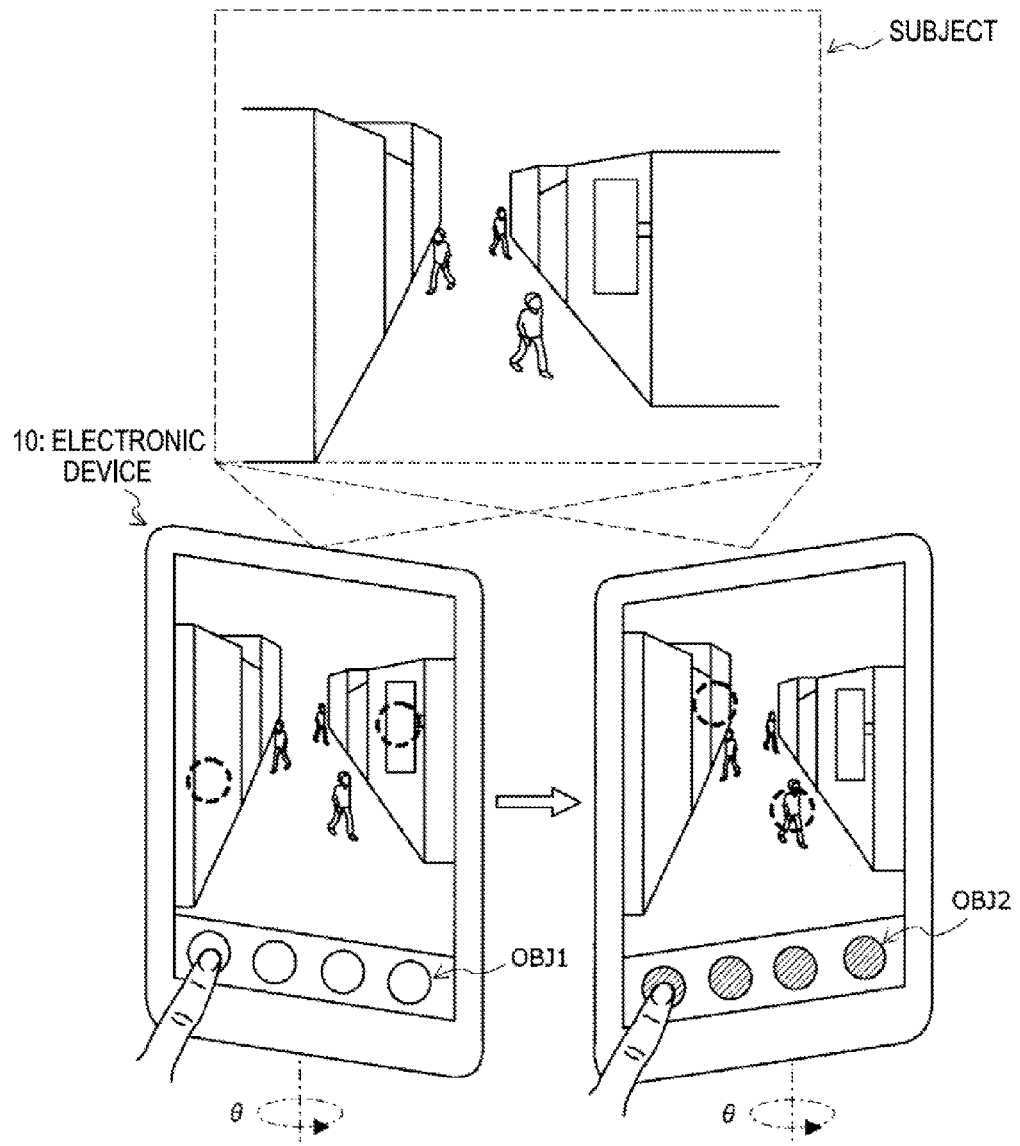
FIG. 8 is an explanatory diagram illustrating the outline of the first example.

In addition, although a technique of switching superimposition information has been illustrated in the example of FIG. 7, it is also possible to make a modification so that operation objects OBJ1 and OBJ2 are switched as illustrated in FIG. 8. Further, a region of an angle $\theta$ may be divided into a plurality of ranges and display content may be configured to be changed for each range. For example, the front can be set as 0 degrees, a range from −15 degrees to 15 degrees can be set as a first range, a range from 16 degrees to 30 degrees can be set as a second range, a range of 31 degrees or more can be set as a third range, a range from −16 degrees to −30 degrees can be set as a fourth range, and a range of −31 degrees or less is set as a fifth range. When an absolute value of the angle $\theta$ is larger, an amount of information or details of content can be set to be larger (or smaller).

When a step-by-step display of the above-described information is set to be implemented by an object such as a button, a large number of buttons are necessary or a special UI such as a dial or an operation bar is necessary. Further, in order to operate such an operation object, the opposite hand of the one holding the device is necessary or the number of operation processes increases. However, when a new operation technique as illustrated in FIGS. 7 and 8 is applied, it is possible to implement a step-by-step display of information in an intuitive operation in which the number of operation processes is small.

In addition, when the multi-parallax display is used, switching of display information is quickly implemented without causing any delay due to switching of an image by displaying information to be displayed in advance for an image group to be viewed by the user for each angle domain. In this case, it should be noted that the electronic device 10 does not switch an image only by switching information to be viewed by the user. On the other hand, when the head tracking is used, it is necessary for the electronic device 10 to switch an image for each angle domain. In this case, the electronic device 10 may be set to previously acquire an image corresponding to the vicinity of the front (the vicinity of an angle of 0 degrees) and acquire images in order from an image corresponding to an angle domain in which an angle is small.

Usually, this is because the user checks display content while viewing the electronic device 10 from the front, and then changes the angle. As described above, traffic necessary for image acquisition is reduced and the reduced traffic contributes to the improvement of throughput by assuming the user's operation and adjusting a timing at which an image is acquired. In addition, because images are acquired in order from an image corresponding to the vicinity of the front, a display delay is unlikely to be caused while image acquisition is awaited. Accordingly, a smooth operation sense can be provided to the user. Although this configuration can be expected to have a high effect when an image is acquired from a server (including a cloud system or the like) connected via a network, the effect is also obtained even when an image is acquired from a storage device within a device.

The outline of the first example has been described above.

[1-4: Outline of Second Example (Selection of Information, Etc.) (FIG. 9)]

Next, the outline of the second example will be described. The second example relates to an operation technique of selecting an object using a line-of-sight direction. This operation technique is based on line-of-sight detection technology using the above-described multi-parallax display or head tracking or the like. Although an example of a 3D display will be described here, the same technology of the example is also similarly applicable to a 2D display for an object having depth information.

Figure 9:
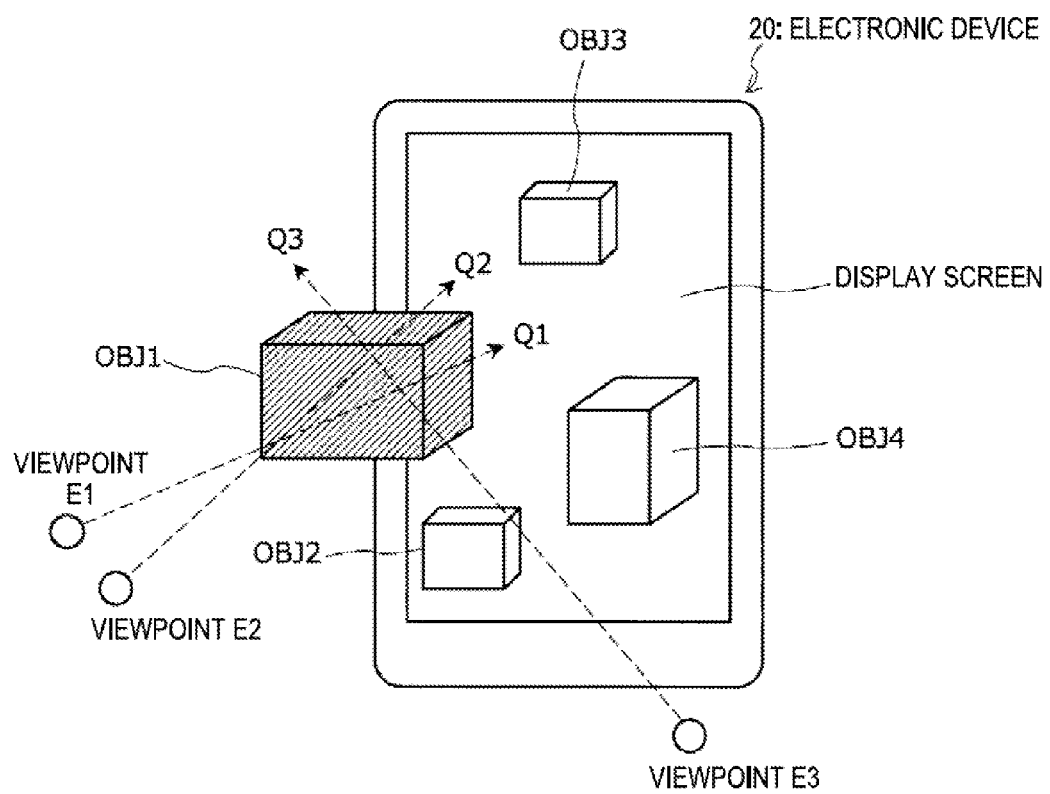
FIG. 9 is an explanatory diagram illustrating an outline of a second example.

As illustrated in FIG. 9, an electronic device 20 has a function of stereoscopically displaying an object. In addition, the electronic device 20 detects a line of sight of the user. The electronic device 20 determines an intersection between the line of sight and the object. Further, the electronic device 20 counts the number of intersections for each object. For example, when a line of sight Q1 has been detected, the electronic device 20 detects an intersection between the line of sight Q1 and an object OBJ1, and sets the number of intersections for the object OBJ1 to 1. For simplicity, it is assumed that lines of sight Q1 and Q2 do not intersect objects OBJ2 to OBJ4. Then, when the line of sight Q2 has been detected, the electronic device 20 detects an intersection between the line of sight Q2 and the object OBJ1, and updates the number of intersections for the object OBJ1 to 2.

Likewise, when a line of sight Q3 has been detected, the electronic device 20 detects an intersection between the line of sight Q3 and the object OBJ1, and updates the number of intersections for the object OBJ1 to 3. In addition, in the example of FIG. 9, because the line of sight Q3 intersects the object OBJ2, the electronic device 20 detects an intersection between the line of sight Q3 and the object OBJ2, and sets the number of intersections for the object OBJ2 to 1. Here, because the number of intersections for the object OBJ1 is 3, the number of intersections for the object OBJ2 is 1, and the number of intersections for the objects OBJ3 and OBJ4 is 0, the electronic device 20 selects the object OBJ1 having a largest number of intersections.

The lines of sight Q1 to Q3 may be lines of sight of a single user or may be lines of sight of multiple users. For example, the electronic device 20 may be set to detect a line of sight in a predetermined cycle, and the selection of an object may be set to be performed based on the number of intersections for each object detected in a predetermined period (the case of one or more users). In addition, the electronic device 20 may be set to detect the line of sight at a certain timing, and the selection of an object may be set to be performed based on the number of intersections for each object detected at that moment (the case of multiple users). In addition, a configuration may be made so that an object having a predetermined number of intersections or more as well as an object having a largest number of intersections is selected.

Because an object can be selected only by paying attention when the operation technique of the above-described second example is applied, it is possible to easily select an object having a stereoscopic sense. In particular, the present technology is preferable as a technique of operating a viewable object from which a sense of touch is not obtained. In addition, because it is possible to detect an object to which a plurality of users simultaneously pay attention, there are many possibilities of applying the present technology to various services such as the use of statistical data for marketing and use for an effective advertisement display.

The outline of the second example has been described above.

[1-5: Detection of Environmental Vibration and Consideration of Countermeasures (FIG. 10)]

Incidentally, in the case of a UI that switches a display in a view direction or a direction in which a line of sight is directed, a display is likely to be switched and visibility is likely to be degraded by vibration unintended by the user. For example, when a display is frequently switched by vibration of a train or bus (hereinafter, environmental vibration), there is a concern that the frequent switching leads to physical condition deterioration as well as degradation of visibility.

Figure 10:
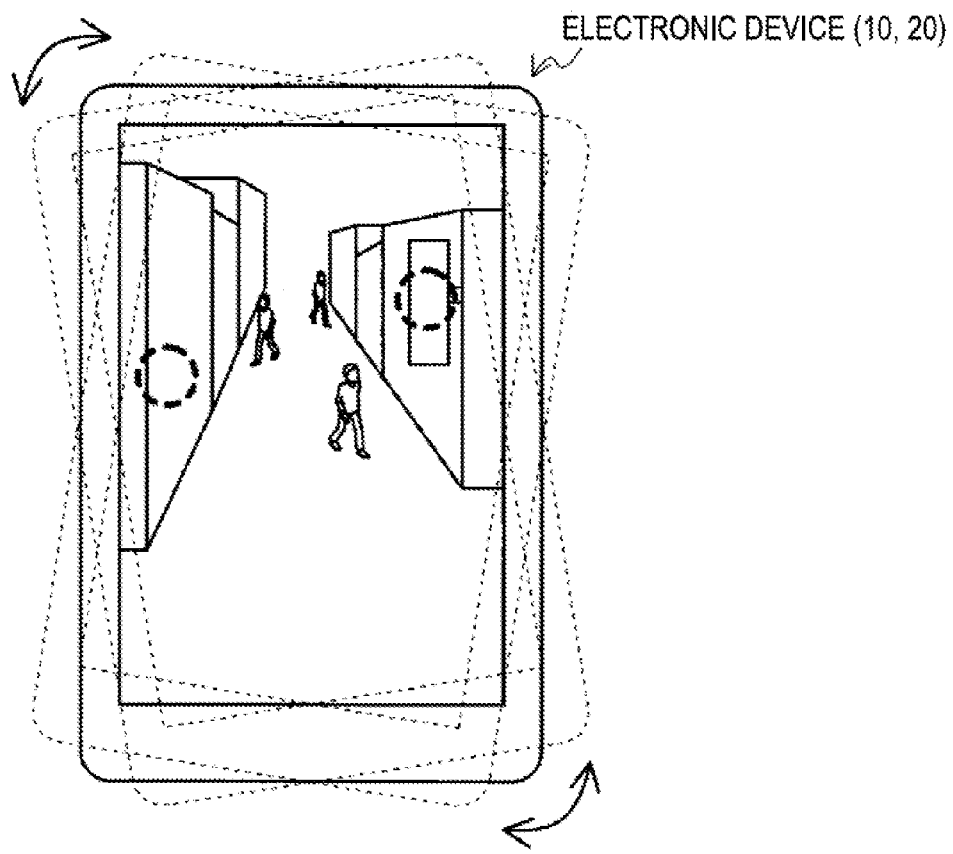
FIG. 10 is an explanatory diagram illustrating detection of environmental vibration and consideration of countermeasures.

Therefore, as illustrated in FIG. 10, a display is fixed before a tilt angle exceeds a predetermined threshold value so that the display is not switched in a degree of a tilt due to environmental vibration. In addition, a mechanism equipped with a mode switching function of preparing a vehicle mode or the like, increasing a threshold value in the vehicle mode, and decreasing the threshold value in other cases is also considered. Further, a mechanism for fixing display content through cooperation with a gyro sensor, an acceleration sensor, or the like when large environmental vibration occurs instantaneously is also considered. It is possible to avoid the negative effect of environmental vibration on the user even when the operation techniques in accordance with the first and second examples are applied by providing the above-described mechanism.

[1-6: System Configuration Examples]

Here, examples of system configurations to which technologies of the first and second examples are applicable will be described. As the system configurations to which the technologies in accordance with the first and second examples, for example, a configuration mainly using a cloud environment (configuration example #1) and a configuration mainly using a function of a device (configuration example #2) are considered. Therefore, each system configuration example will be introduced.

(1-6-1: Configuration Example #1 (Configuration Using Cloud Environment) (FIG. 11))

Figure 11:
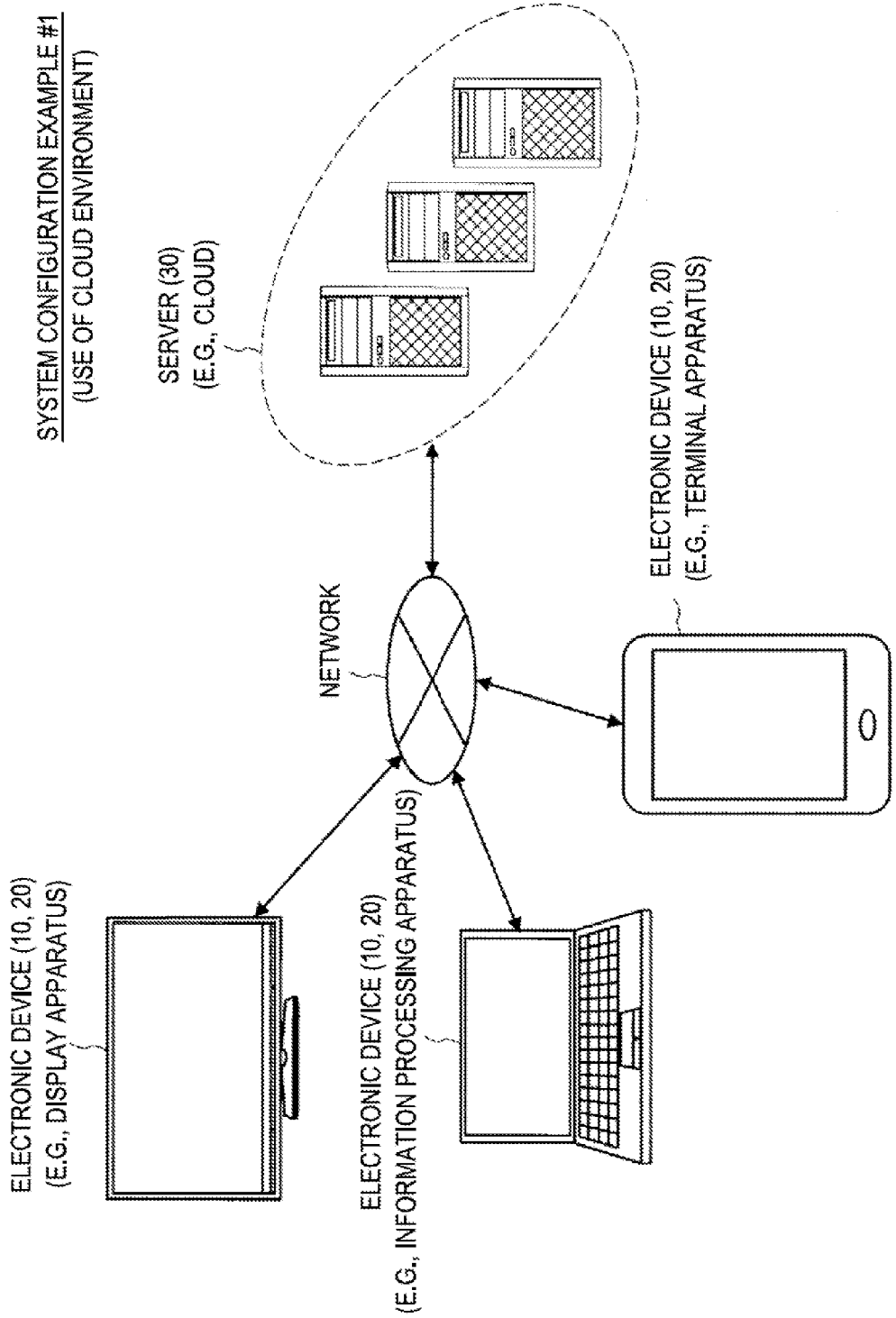
FIG. 11 is an explanatory diagram illustrating an example of a system configuration to which technology in accordance with the example is applicable.

First, the configuration example #1 will be described. As illustrated in FIG. 11, a system in accordance with the configuration example #1 includes electronic devices (electronic devices 10 and 20) and a server (server 30) mutually connected via a network. In addition, as the electronic devices 10 and 20, for example, a display apparatus, an information processing apparatus, a terminal apparatus, and the like are considered. As the server 30, a stand-alone server apparatus, a server group including a plurality of server apparatuses, and the like are considered. Further, as a form of the server group, a distributed parallel arithmetic system installed in a data center or the like, a so-called cloud system, or the like is considered. However, when the technologies of the first and second examples are applied, a difference between the above-described forms is not important and the technologies are applicable to an arbitrary form.

(1-6-2: Configuration Example #2 (Configuration Using Function of Device) (FIG. 12))

Figure 12:
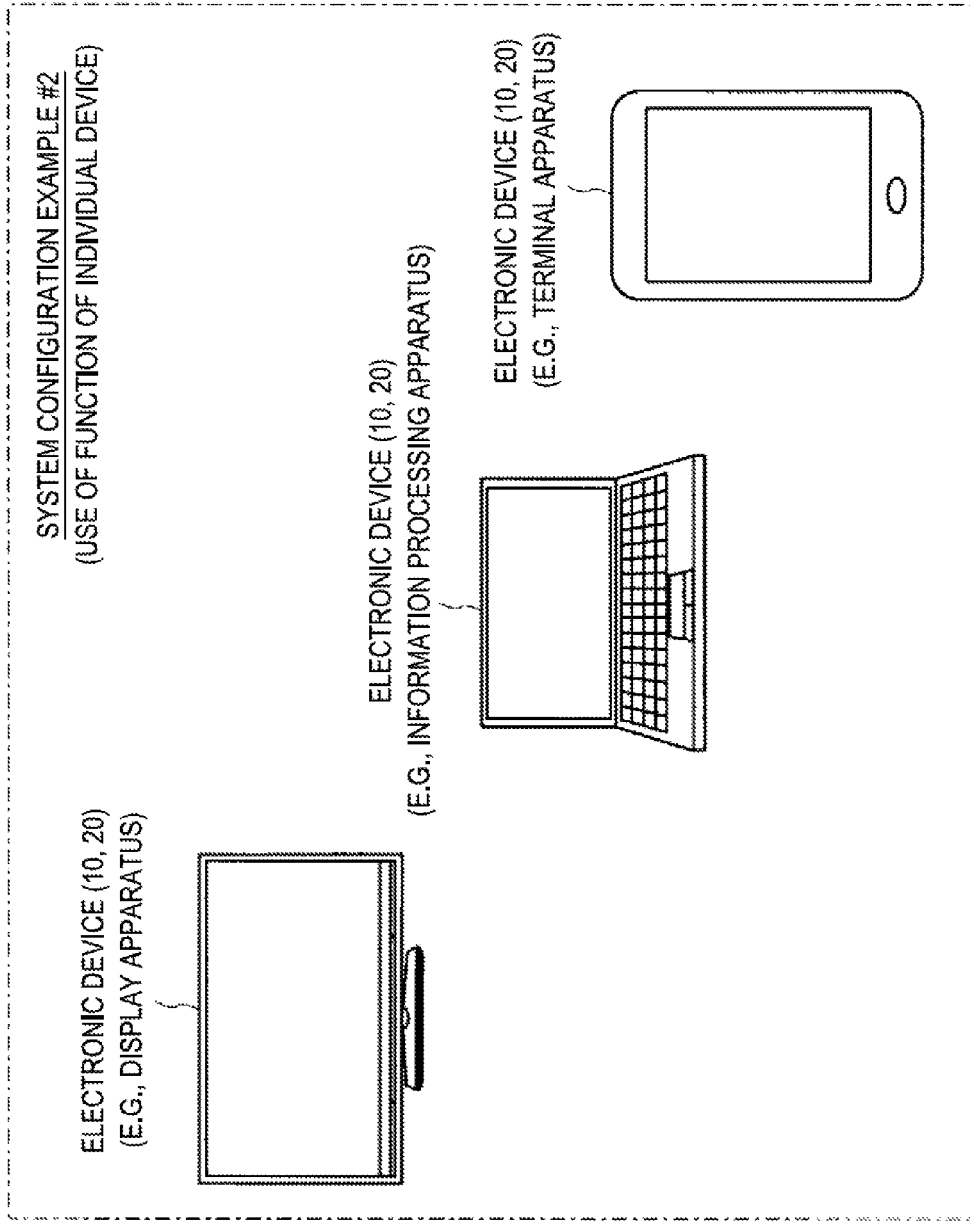
FIG. 12 is an explanatory diagram illustrating an example of a system configuration to which technology in accordance with the example is applicable.

Next, the configuration example #2 will be described. As illustrated in FIG. 12, a system in accordance with the configuration example #2 includes stand-alone electronic devices (electronic devices 10 and 20). However, the electronic devices 10 and 20 are not completely independent from a network. Here, a configuration in which the device itself executes main processing on the occasion of applying the technologies of the first and second examples is intended. As the electronic devices 10 and 20, for example, a display apparatus, an information processing apparatus, a terminal apparatus, and the like are considered.

The system configuration examples have been described above. Hereinafter, description will proceed in consideration of the two types of system configuration examples. Of course, the system configuration can be appropriately modified in view of the technology trend at present and in the future. Of course, it is possible to apply the technologies in accordance with the first and second examples to systems subjected to the modification.

2: DETAILS OF FIRST EXAMPLE

Filtering of Information, Etc.

Hereinafter, the first example will be described in detail.

[2-1: Case of Configuration Example #1]

In the case of the configuration example #1, a functional configuration of the electronic device 10 and a functional configuration of the server 30 in accordance with the first example, for example, are represented as follows.

(2-1-1: Functional Configuration of Electronic Device (FIGS. 13 and 14))

Figure 13:
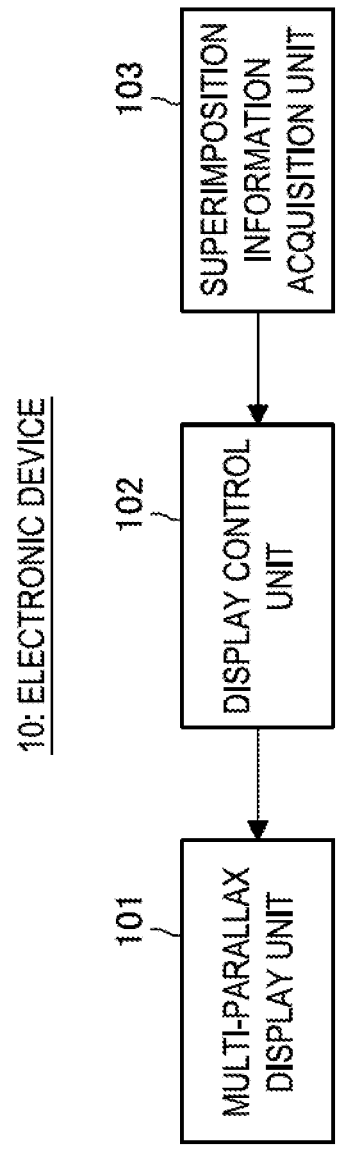
FIG. 13 is an explanatory diagram illustrating a functional configuration of an electronic device in accordance with the first example.
Figure 14:
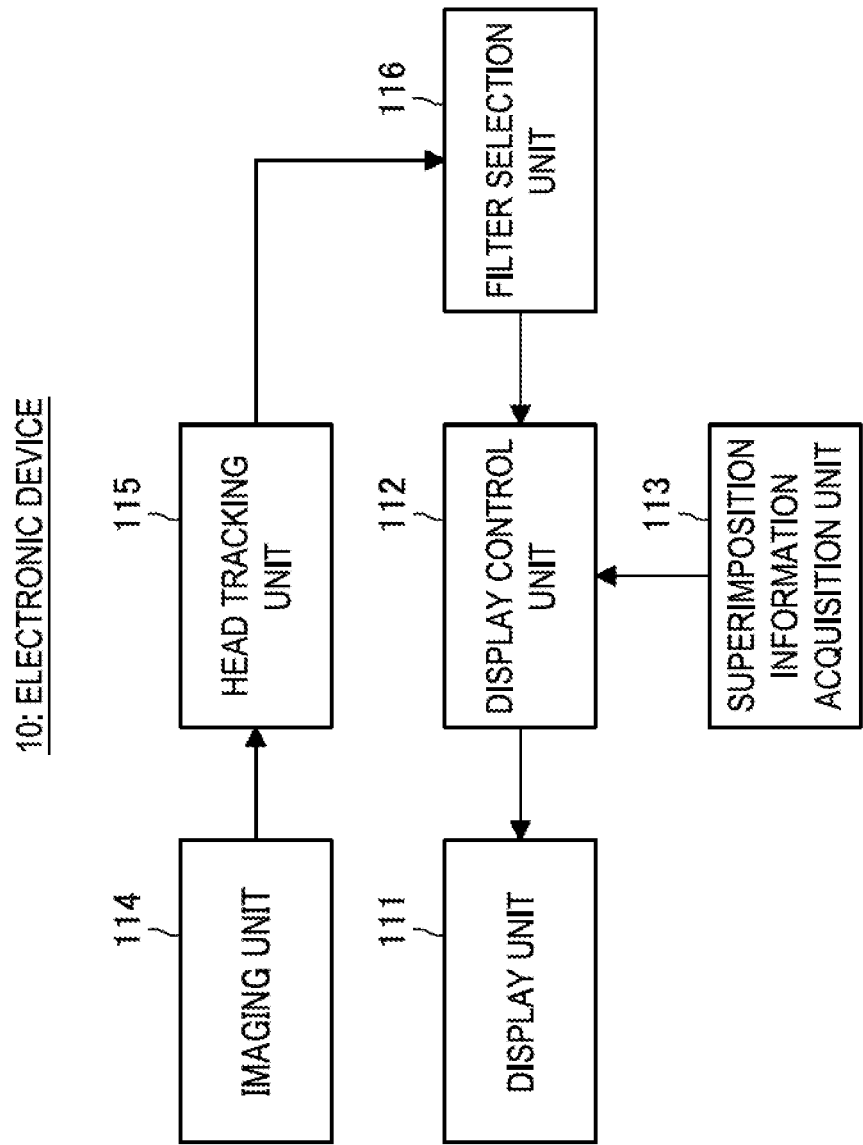
FIG. 14 is an explanatory diagram illustrating a functional configuration of an electronic device in accordance with the first example.

First, referring to FIGS. 13 and 14, the functional configuration of the electronic device 10 will be described. FIG. 13 is an explanatory diagram illustrating the functional configuration of the electronic device 10 capable of implementing an operation technique using the multi-parallax display. FIG. 14 is an explanatory diagram illustrating the functional configuration of the electronic device 10 capable of implementing an operation technique using the head tracking. Although a configuration (see FIG. 7) in which superimposition information is switched according to the operation technique in accordance with the first example will be described for ease of description here, for example, a configuration (see FIG. 8) in which an object is switched or the like is also similar.

(When Multi-Parallax Display Device is Used (FIG. 13))

As illustrated in FIG. 13, the electronic device 10 mainly includes a multi-parallax display unit 101, a display control unit 102, and a superimposition information acquisition unit 103. The multi-parallax display unit 101 is a multi-parallax display device capable of implementing multi-parallax display as in FIG. 1 or 2. The display control unit 102 has a function of causing the multi-parallax display unit 101 to display information. The superimposition information acquisition unit 103 has a function of acquiring superimposition information from the server 30 via the network. The electronic device 10 may include an imaging unit (not illustrated), which images a subject, a storage unit (not illustrated), which stores information, a Global Positioning System (GPS), a gyro sensor, an acceleration sensor, and the like.

For example, the case illustrated in FIG. 7 will be considered. In this case, first, the display control unit 102 causes the multi-parallax display unit 101 to display a captured image obtained by imaging a subject in real time. Then, the superimposition information acquisition unit 103 transmits information available to specify an object included in the subject to the server 30 and acquires related information regarding the object. The superimposition information acquisition unit 103 acquiring the related information inputs the related information acquired from the server 30 to the display control unit 102 as superimposition information to be superimposed and displayed on the captured image. The display control unit 102 acquiring the superimposition information displays the superimposition information in a display area in which a position or related information corresponding to the object of the captured image should be displayed.

At this time, the display control unit 102 considers the fact that a pixel group to be viewed differs according to a direction in which the user views and displays superimposition information that differs according to a pixel group corresponding to each direction. For example, the display control unit 102 uses a filter that sorts superimposition information for each attribute, sorts the superimposition information using the filter pre-associated with each direction, and causes the superimposition information after the sorting to be displayed on a corresponding pixel group. In this case, the user views superimposition information having a different attribute according to a view direction. In addition, when the number of pieces of superimposition information is associated with each direction, the display control unit 102 causes superimposition information whose number of pieces is narrowed down randomly or by a predetermined rule to be displayed with respect to a pixel group corresponding to each direction. In this case, superimposition information whose number of pieces differs according to a view direction is viewed by the user.

A display method by the display control unit 102 is not limited to the above-described example, and various modifications are possible. Although control of an attribute by the direction and control of the number by the direction is implemented in the above-described example, for example, control of a detailed degree of superimposition information or a display area including an object can be similarly implemented. For identification of attributes, for example, parameters representing characteristics of objects such as "food," "lunch," "goods," "bank," "bank ATM," "bank teller," "post office," "station," and "bus stop" can be used. These parameters may be acquired from the server 30 and may be prepared and held in a storage unit.

When the multi-parallax display is used, the display control unit 102 causes superimposition information corresponding to all pixel groups to be displayed in a step in which the superimposition information has been prepared. As described above, a standby time necessary to switch the superimposition information does not occur by displaying the superimposition information in advance regardless of whether an angle at which the user views has been changed. As a result, it is possible to switch display content at a high speed. In addition, when no superimposition information is displayed in advance, the superimposition information acquisition unit 103 acquires superimposition information for the front from the server 30 in advance, and then acquires superimposition information in order from superimposition information for a direction near the front. According to the above-described configuration, it is possible to reduce an acquisition latency of superimposition information.

The functional configuration of the electronic device 10 capable of implementing the operation technique using the multi-parallax display has been described above. Next, the functional configuration of the electronic device 10 capable of implementing the operation technique using the head tracking will be described.

(When Head Tracking is Used (FIG. 14))

As illustrated in FIG. 14, the electronic device 10 mainly includes a display unit 111, a display control unit 112, a superimposition information acquisition unit 113, an imaging unit 114, and a head tracking unit 115. The electronic device 10 may include an imaging unit (not illustrated), which images a subject, a storage unit (not illustrated), which stores information, a GPS, a gyro sensor, an acceleration sensor, and the like.

Here, the case illustrated in FIG. 7 will also be considered. In this case, first, the display control unit 112 causes the display unit 111 to display a captured image obtained by imaging a subject in real time. Then, the superimposition information acquisition unit 113 transmits information available to specify an object included in the subject such as information regarding a current position or an imaging direction to the server 30, and acquires related information regarding the object. The superimposition information acquisition unit 113 acquiring the related information inputs the related information acquired from the server 30 to the display control unit 112 as superimposition information to be superimposed and displayed on the captured image. The display control unit 112 acquiring the superimposition information displays the superimposition information in a display area in which a position or related information corresponding to the object of the captured image should be displayed.

At this time, the imaging unit 114 images the user. A captured image obtained by imaging the user is sequentially input from the imaging unit 114 to the head tracking unit 115. The head tracking unit 115 tracks a predetermined portion of the user from the captured image using the head tracking technology, and detects a position of a viewpoint from the tracking result. The detection result by the head tracking unit 115 is input to the filter selection unit 116. When the detection result is input, the filter selection unit 116 selects a filter corresponding to a direction based on the direction indicated by the input detection result. This filter, for example, may be used to sort superimposition information according to an attribute, and may be used to limit the number of pieces of the superimposition information. Information regarding the filter selected by the filter selection unit 116 is input to the display control unit 112.

The display control unit 112 to which the filter has been input sorts the superimposition information using the input filter and causes the display unit 111 to display the sorted superimposition information to the user. In this case, the user views the sorted superimposition information. In addition, when a direction in which the user views is changed, the filter is changed by the filter selection unit 116, and the display control unit 112 causes the display unit 111 to display superimposition information sorted by the changed filter. Thus, as when the multi-parallax display has been used, the user can view different superimposition information by merely changing the view direction.

A display method by the display control unit 112 is not limited to the above-described example, and various modifications are possible. Although control of an attribute by the direction and control of the number by the direction are implemented in the above-described example, for example, control of a detailed degree of superimposition information or a display area including an object can be similarly implemented. For identification of attributes, for example, parameters representing characteristics of objects such as "food," "lunch," "goods," "bank," "bank ATM," "bank teller," "post office," "station," and "bus stop" can be used. These parameters may be acquired from the server 30 and may be prepared and held in a storage unit.

In addition, the superimposition information acquisition unit 113 may be configured to acquire superimposition information for the front from the server 30 in advance, and then acquire superimposition information in order from superimposition information for a direction near the front. According to the above-described configuration, it is possible to reduce an acquisition latency of superimposition information.

The functional configuration of the electronic device 10 capable of implementing the operation technique using the head tracking has been described above. Next, the functional configuration of the server 30 will be described.

(2-1-2: Functional Configuration of Server (FIG. 15))

Figure 15:
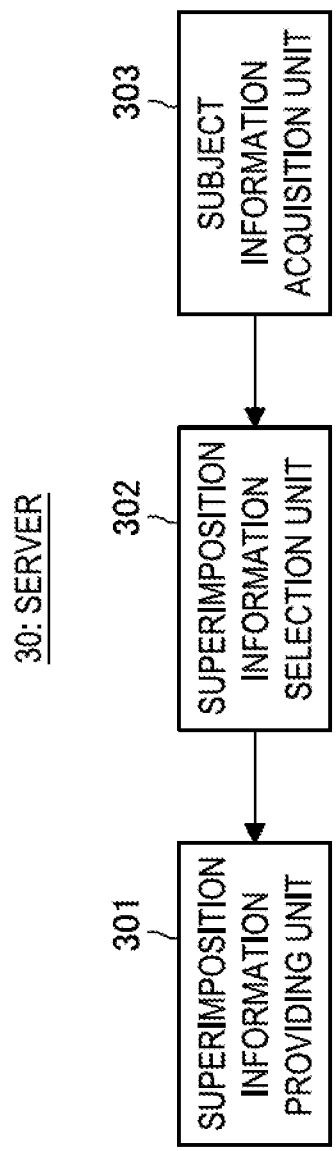
FIG. 15 is an explanatory diagram illustrating a functional configuration of a server in accordance with the first example.

As illustrated in FIG. 15, the server 30 includes a superimposition information providing unit 301, a superimposition information selection unit 302, and a subject information acquisition unit 303. First, the subject information acquisition unit 303 acquires information (hereinafter, subject information) for specifying an object included in a subject from the electronic device 10. As the subject information, for example, there is position information detected by the GPS or the like and information regarding an imaging direction detected by various sensors or the like. The subject information acquired by the subject information acquisition unit 303 is input to the superimposition information selection unit 302.

When the subject information is input, the superimposition information selection unit 302 selects superimposition information regarding an object based on the input subject information. At this time, the superimposition information selection unit 302 may acquire the superimposition information from an external system if necessary. The superimposition information selected by the superimposition information selection unit 302 is input to the superimposition information providing unit 301. The superimposition information providing unit 301 to which the superimposition information has been input provides the input superimposition information to the electronic device 10 transmitting the subject information. The server 30 may be configured to provide information regarding a filter prepared for the electronic device 10.

The functional configuration of the server 30 has been described above.

(2-1-3: Basic Operation of System (FIG. 16))

Figure 16:
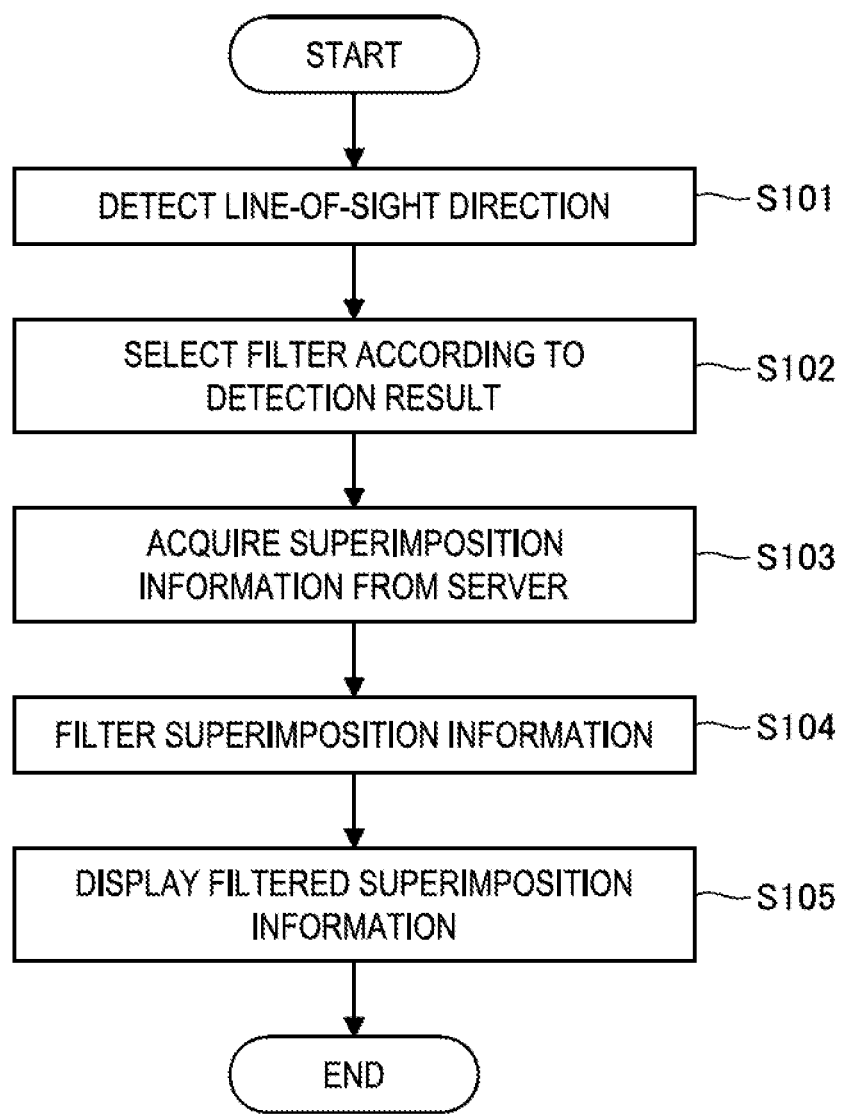
FIG. 16 is an explanatory diagram illustrating an operation of a system in accordance with the first example.

Next, a basic operation of the system in accordance with the first example will be described with reference to FIG. 16. FIG. 16 is an explanatory diagram illustrating the basic operation of the system in accordance with the first example.

As illustrated in FIG. 16, first, the electronic device 10 detects a direction (line-of-sight direction) in which the user views (S101). However, when a multi-parallax display is used, it is not necessary to detect the line-of-sight direction. Then, the electronic device 10 selects a filter according to the detection result of the line-of-sight direction (S102). However, when the multi-parallax display is used, the electronic device 10 prepares a filter corresponding to each line-of-sight direction in this step. Then, the electronic device 10 acquires superimposition information from the server 30 (S103). Then, the electronic device 10 filters the superimposition information acquired from the server 30 based on the filter selected in step S102 (S104). Then, the electronic device 10 displays the filtered superimposition information (S105).

The basic operation of the system in accordance with the first example has been described above.

As described above, in the case of the configuration example #1, the exchange of superimposition information between the electronic device 10 and the server 30 occurs. Next, the case of the configuration example #2 will be described.

[2-2: Case of Configuration Example #2]

In the case of the configuration example #2, the functional configuration of the electronic device 10 in accordance with the first example, for example, is represented as follows.

(2-2-1: Functional Configuration of Electronic Device (FIGS. 17 and 18))

Figure 17:
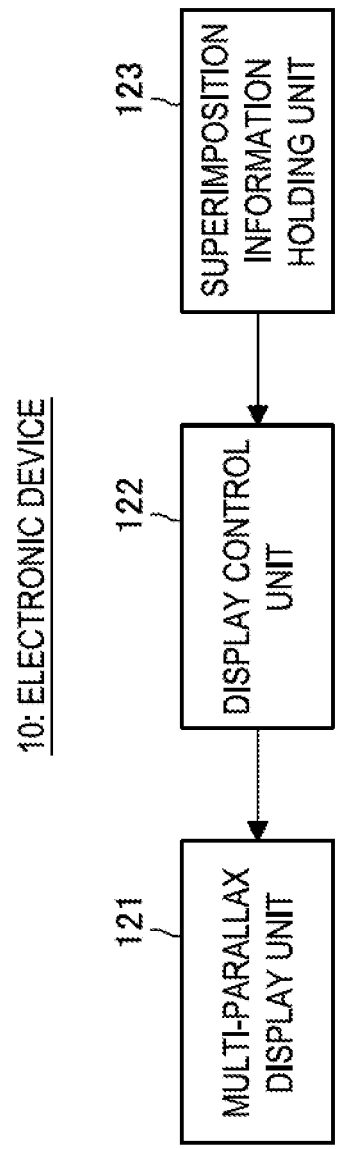
FIG. 17 is an explanatory diagram illustrating a functional configuration of an electronic device in accordance with the first example.
Figure 18:
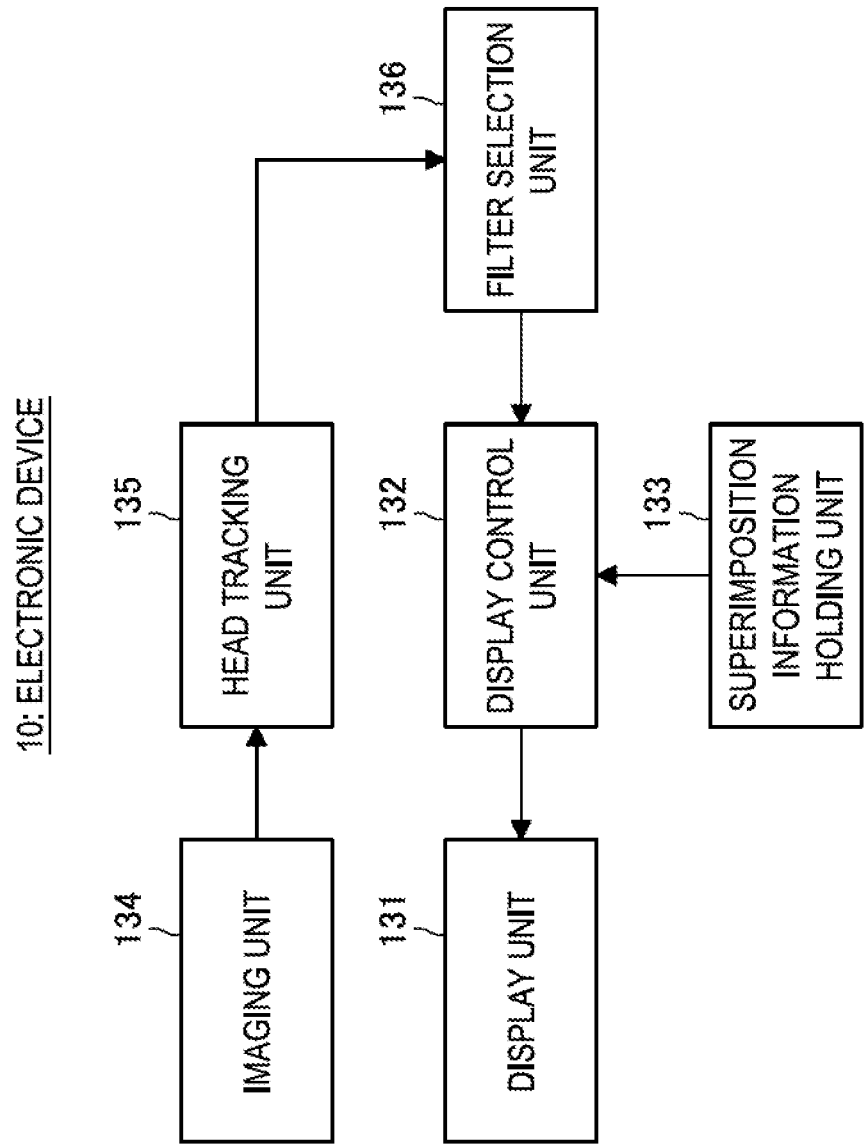
FIG. 18 is an explanatory diagram illustrating a functional configuration of an electronic device in accordance with the first example.

First, the functional configuration of the electronic device 10 will be described with reference to FIGS. 17 and 18. FIG. 17 is an explanatory diagram illustrating the functional configuration of the electronic device 10 capable of implementing the operation technique using the multi-parallax display. FIG. 18 is an explanatory diagram illustrating the functional configuration of the electronic device 10 capable of implementing the operation technique using the head tracking. Although a configuration (see FIG. 7) in which the superimposition information is switched by the operation technique in accordance with the first example will be described for ease of description here, for example, a configuration (see FIG. 8) in which the object is switched is also similar.

(When Multi-Parallax Display Device is Used (FIG. 17))

As illustrated in FIG. 17, the electronic device 10 mainly includes a multi-parallax display unit 121, a display control unit 122, and a superimposition information holding unit 123. The multi-parallax display unit 121 is a multi-parallax display device capable of implementing a multi-parallax display as in FIG. 1 or 2. The display control unit 122 has a function of causing the multi-parallax display unit 121 to display information. The superimposition information holding unit 123 has a function of storing information. The electronic device 10 may include an imaging unit (not illustrated), which images a subject, a storage unit (not illustrated), which stores information other than the superimposition information, a GPS, a gyro sensor, an acceleration sensor, and the like.

For example, the case illustrated in FIG. 7 will be considered. In this case, first, the display control unit 122 causes the multi-parallax display unit 121 to display a captured image obtained by imaging a subject in real time. Then, the superimposition information holding unit 123 selects related information regarding an object based on information available to specify an object included in the subject such as information regarding a current position or an imaging direction. The superimposition information holding unit 123 selecting the related information inputs the related information to the display control unit 122 as the superimposition information to be superimposed and displayed on the captured image. The display control unit 122 acquiring the superimposition information displays the superimposition information in a display area in which a position or related information corresponding to an object of the captured image should be displayed.

At this time, the display control unit 122 considers the fact that a pixel group to be viewed differs according to a direction in which the user views and displays superimposition information that differs according to a pixel group corresponding to each direction. For example, the display control unit 122 uses a filter that sorts superimposition information for each attribute, sorts the superimposition information using the filter pre-associated with each direction, and causes the superimposition information after the sorting to be displayed on a corresponding pixel group. In this case, superimposition information having a different attribute according to a view direction is viewed by the user. In addition, when the number of pieces of superimposition information is associated with each direction, the display control unit 122 causes superimposition information whose number of pieces is narrowed down randomly or by a predetermined rule to be displayed with respect to a pixel group corresponding to each direction. In this case, superimposition information whose number of pieces differs according to a view direction is viewed by the user.

A display method by the display control unit 122 is not limited to the above-described example, and various modifications are possible. Although control of an attribute by the direction and control of the number by the direction are implemented in the above-described example, for example, control of a detailed degree of superimposition information or a display area including an object can be similarly implemented. For identification of attributes, for example, parameters representing characteristics of objects such as "food," "lunch," "goods," "bank," "bank ATM," "bank teller," "post office," "station," and "bus stop" can be used. These parameters may be acquired from an external system and may be prepared and held in a storage unit.

When the multi-parallax display is used, the display control unit 122 causes superimposition information corresponding to all pixel groups to be displayed in a step in which the superimposition information has been prepared. As described above, a standby time necessary to switch the superimposition information does not occur by displaying the superimposition information in advance regardless of whether an angle at which the user views has been changed. As a result, it is possible to switch display content at a high speed.

The functional configuration of the electronic device 10 capable of implementing the operation technique using the multi-parallax display has been described above. Next, the functional configuration of the electronic device 10 capable of implementing the operation technique using the head tracking will be described.

(When Head Tracking is Used (FIG. 18))

As illustrated in FIG. 18, the electronic device 10 mainly includes a display unit 131, a display control unit 132, a superimposition information holding unit 133, an imaging unit 134, and a head tracking unit 135. The electronic device 10 may include an imaging unit (not illustrated), which images a subject, a storage unit (not illustrated), which stores information other than superimposition information, a GPS, a gyro sensor, an acceleration sensor, and the like.

Here, the case illustrated in FIG. 7 will also be considered. In this case, first, the display control unit 132 causes the display unit 131 to display a captured image obtained by imaging a subject in real time. Then, the superimposition information holding unit 133 selects related information regarding an object based on information available to specify an object included in the subject such as information regarding a current position or an imaging direction. The superimposition information holding unit 133 selecting the related information inputs the related information to the display control unit 132 as the superimposition information to be superimposed and displayed on the captured image. The display control unit 132 acquiring the superimposition information displays the superimposition information in a display area in which a position or related information corresponding to an object of the captured image should be displayed.

At this time, the imaging unit 134 images the user. A captured image obtained by imaging the user is sequentially input from the imaging unit 134 to the head tracking unit 135. The head tracking unit 135 tracks a predetermined portion of the user from the captured image using the head tracking technology, and detects a position of a viewpoint from the tracking result. The detection result by the head tracking unit 135 is input to the filter selection unit 136. When the detection result is input, the filter selection unit 136 selects a filter corresponding to a direction based on the direction indicated by the input detection result. This filter, for example, may be used to sort superimposition information according to an attribute, and may be used to limit the number of pieces of the superimposition information. Information regarding the filter selected by the filter selection unit 136 is input to the display control unit 132.

The display control unit 132 to which the filter has been input sorts the superimposition information using the input filter and causes the display unit 131 to display the sorted superimposition information to the user. In this case, the user views the sorted superimposition information. In addition, when a direction in which the user views is changed, the filter is changed by the filter selection unit 136 and the display control unit 132 causes the display unit 131 to display superimposition information sorted by the changed filter. Thus, as when the multi-parallax display has been used, the user can view different superimposition information by merely changing the view direction.

A display method by the display control unit 132 is not limited to the above-described example, and various modifications are possible. Although control of an attribute by the direction and control of the number by the direction are implemented in the above-described example, for example, control of a detailed degree of superimposition information or a display area including an object can be similarly implemented. For identification of attributes, for example, parameters representing characteristics of objects such as "food," "lunch," "goods," "bank," "bank ATM," "bank teller," "post office," "station," and "bus stop" can be used. These parameters may be acquired from an external system and may be prepared and held in a storage unit.

The functional configuration of the electronic device 10 capable of implementing the operation technique using the head tracking has been described above.

(2-2-2: Basic Operation of System (FIG. 19))

Figure 19:
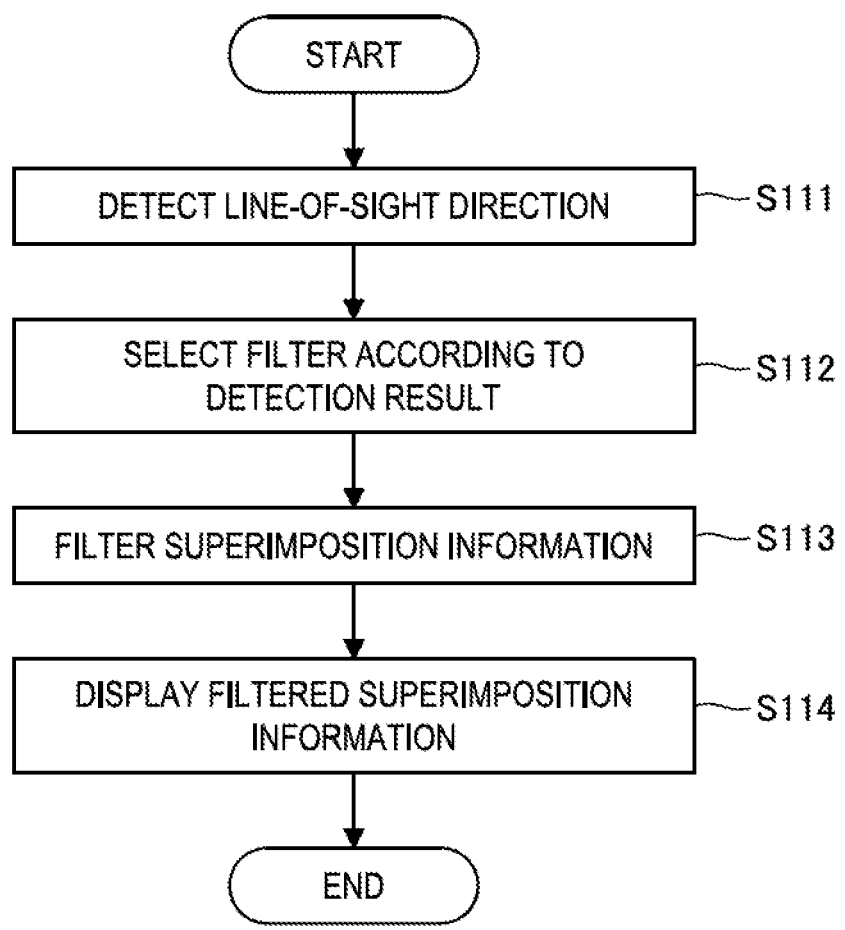
FIG. 19 is an explanatory diagram illustrating an operation of the system in accordance with the first example.

Next, the basic operation of the system in accordance with the first example will be described with reference to FIG. 19. FIG. 19 is an explanatory diagram illustrating the basic operation of the system in accordance with the first example.

As illustrated in FIG. 19, first, the electronic device 10 detects a direction (line-of-sight direction) in which the user views (S111). However, when a multi-parallax display is used, it is not necessary to detect the line-of-sight direction. Then, the electronic device 10 selects a filter according to the detection result of the line-of-sight direction (S112). However, when the multi-parallax display is used, the electronic device 10 prepares a filter corresponding to each line-of-sight direction in this step. Then, the electronic device 10 filters the superimposition information based on the filter selected in step S112 (S113). Then, the electronic device 10 displays the filtered superimposition information (S114).

The basic operation of the system in accordance with the first example has been described above.

[2-3: (Application Example) Control of Application]

A mechanism for changing and displaying a filter for each line-of-sight direction so that superimposition information is switched according to a line-of-sight direction has been described above. Here, a method of implementing various display control by applying this mechanism will be introduced.

(2-3-1: Application Switching Operation Corresponding to Line-of-Sight Direction (FIG. 20))

Figure 20:
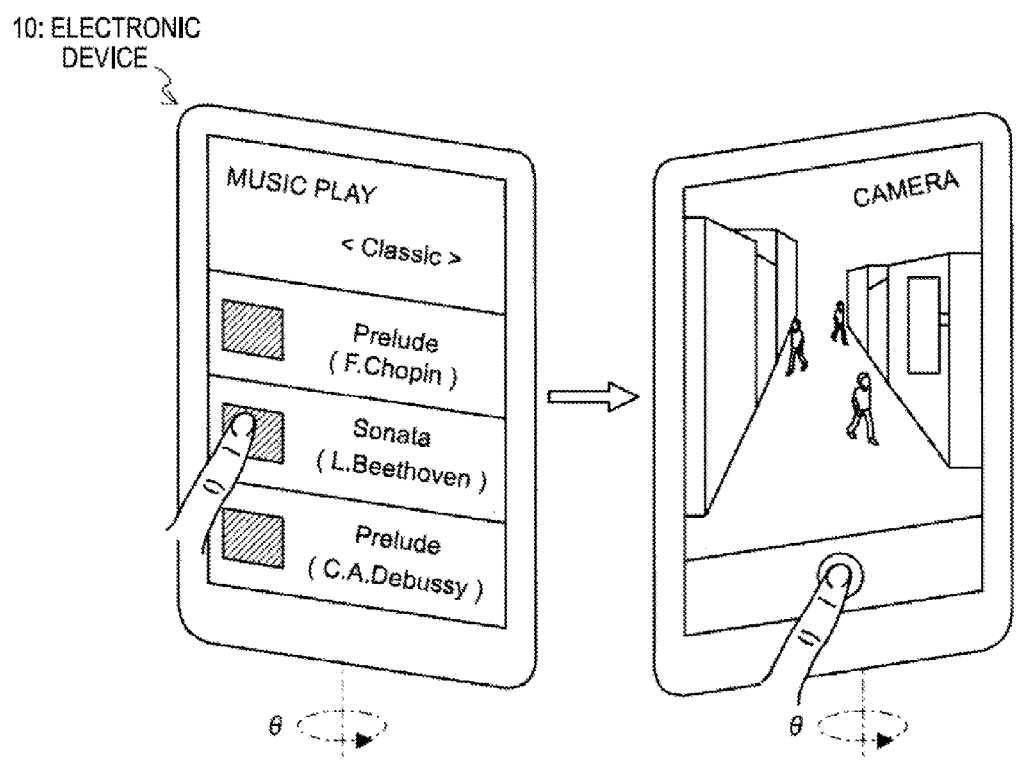
FIG. 20 is an explanatory diagram illustrating an application switching operation corresponding to a line-of-sight direction.

First, as one application example, an operation of switching an application by line-of-sight movement as illustrated in FIG. 20 is considered. In the example of FIG. 20, a screen of a music player application is displayed when the electronic device 10 has a tilt to the left (when viewed from the right), and a screen of a camera application is displayed when the electronic device 10 has a tilt to the right (when viewed from the left). As described above, when the technology of the first example is applied, a UI that switches different types of applications according to the view direction is implemented. Because display content is not switched when the multi-parallax display is used, it is desirable to design an arrangement so that objects such as operation buttons are not in the same or near positions in a plurality of active applications.

(2-3-2: Tool Switching Operation Corresponding to Line-of-Sight Direction (FIG. 21))

Figure 21:
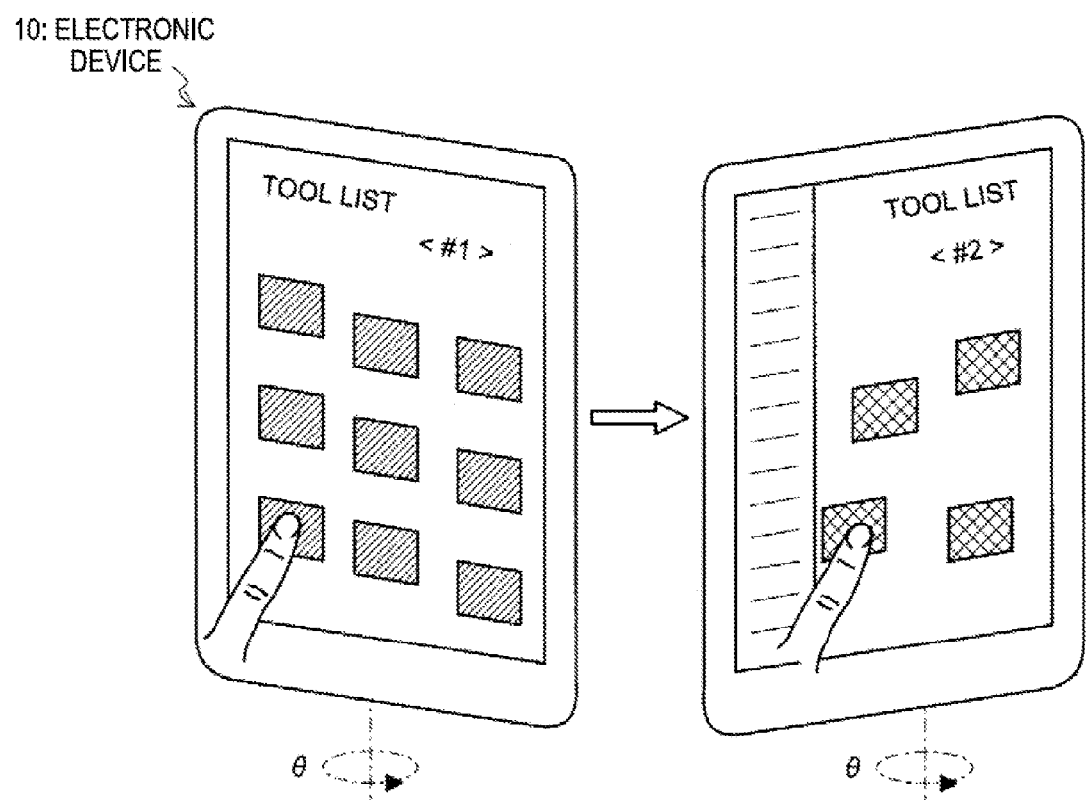
FIG. 21 is an explanatory diagram illustrating a tool switching operation corresponding to a line-of-sight direction.

In addition, as another application example, an operation of switching a tool by line-of-sight movement as illustrated in FIG. 21 is considered. In the example of FIG. 21, a first tool list #1 is displayed on a screen when the electronic device 10 has a tilt to the left (when viewed from the right), and a second tool list #2 is displayed on a screen when the electronic device 10 has a tilt to the right (when viewed from the left). As described above, when the technology of the first example is applied, a UI that switches a tool group according to the view direction among the same types of applications is implemented. Because display content is not switched when the multi-parallax display is used, it is desirable to design an arrangement so that icons and the like of tools are not in the same or near positions in a plurality of tools.

(2-3-3: Playback-Speed Switching Operation Corresponding to Line-of-Sight Direction (FIG. 22))

Figure 22:
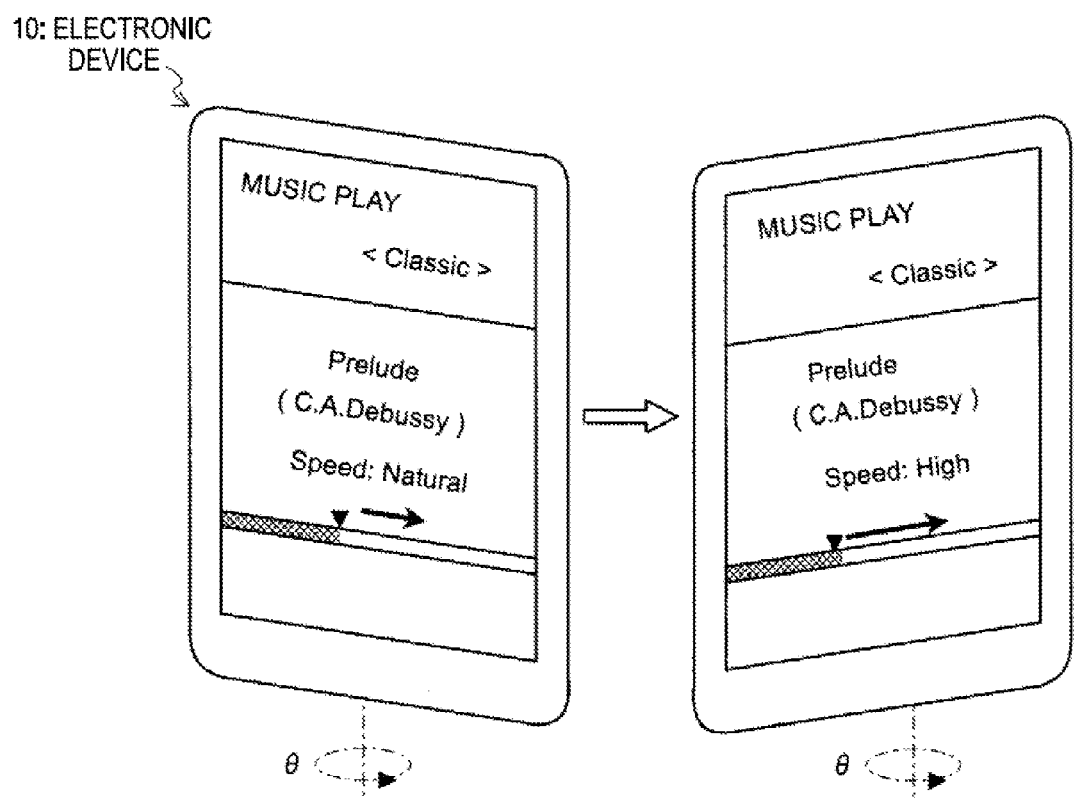
FIG. 22 is an explanatory diagram illustrating a playback-speed switching operation corresponding to a line-of-sight direction.

In addition, as another application example, an operation of switching a playback speed by line-of-sight movement as illustrated in FIG. 22 is considered. In the example of FIG. 22, the playback speed is decreased when the electronic device 10 has a tilt to the left (when viewed from the right), and the playback speed is increased when the electronic device 10 has a tilt to the right (when viewed from the left). The increase/decrease in the speed may be changed according to a tilt amount, changed by a predetermined amount, or changed according to a tilt time. As described above, when the technology of the first example is applied, a UI that switches the playback speed according to the view direction is implemented. This operation is not used when the stand-alone multi-parallax display is used, and should be combined with technology such as head tracking.

The application examples relating to the control of the application have been introduced above.

[2-4: (Application Example) Configuration of Filter]

Next, the application example relating to the configuration of the filter will be introduced.

(2-4-1: Filtering of Superimposition Information (FIG. 23: Specific Example))

As a filter that filters superimposition information, for example, as illustrated in FIG. 23, there are an ATM filter, a meal filter, a transport facility filter, and the like. When the ATM filter is applied, for example, superimposition information regarding "bank" and "post office" passes, but "beef barbecue restaurant," "station," and "bus stop" are excluded. Likewise, when the meal filter is applied, for example, superimposition information regarding "beef barbecue restaurant" passes, but "bank," "station," and "post office" are excluded. In addition, when the transport facility filter is applied, for example, superimposition information regarding "station" and "but stop" passes, but "bank," "beef barbecue restaurant," and "post office" are excluded. As described above, it is possible to execute filtering on the superimposition information.

(2-4-2: Filtering of Operation Object (FIG. 24))

In addition to the superimposition information, for example, a configuration in which operation objects are filtered is also considered. As a filter that filters the operation objects, for example, as illustrated in FIG. 24, there are a photo filter, a music filter, a movie filter, and the like. When the photo filter is applied, for example, objects of "shutter" and "zoom" pass, but objects of "playback," "stop," and "transmission" are excluded. Likewise, when the music filter or the movie filter is applied, for example, the objects of "playback" and "stop" pass, and the object of "shutter," "zoom," and "transmission" are excluded. As described above, it is possible to execute filtering on the operation objects.

(2-4-3: Filtering of Content (FIGS. 25 and 26))

In addition to the superimposition information and the operation objects, for example, a configuration in which content is filtered is also considered. As a filter that filters music content, for example, there are filters classified by music characteristics such as a ballade filter, a waltz filter, an etude filter, and the like as illustrated in FIG. 25. In addition, as a filter that filters video content, there are filters classified by video characteristics such as a horror filter, an action filter, and a love story filter as illustrated in FIG. 26. In addition, a filter that narrows down content by an artist or a genre is also considered. When the above-described filter is used, it is possible to execute filtering on content.

The application example relating to the configuration of the filter has been introduced above.

[2-5: (Application Example) Peeping Operation]

Next, the application example relating to the peeping operation will be introduced. The peeping mentioned here is an operation in which the user viewing an object displayed on a screen views the object at a deeper angle. At this time, a distance between the user's head and the display screen and the like may be considered.

(2-5-1: Display of Information Regarding Gaze Point (FIG. 27))

Figure 27:
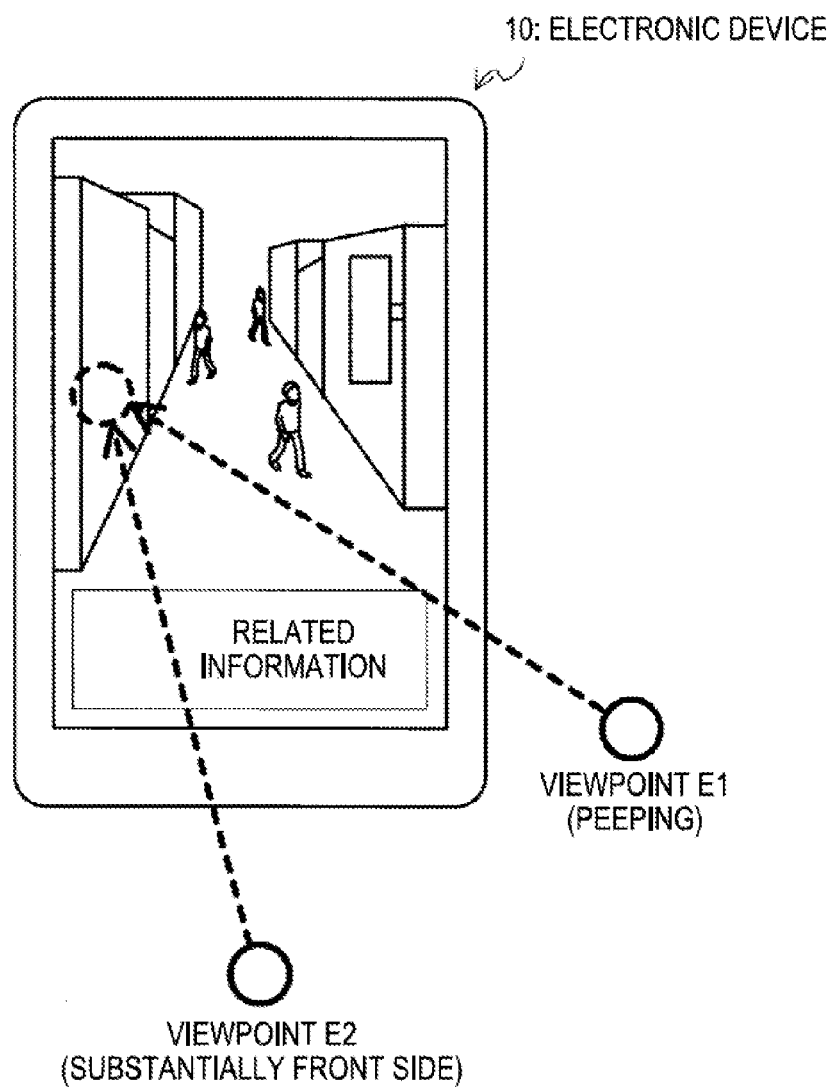
FIG. 27 is an explanatory diagram illustrating a method of displaying information regarding a gaze point.

For example, as illustrated in FIG. 27, in a scene in which related information is displayed at a point (hereinafter, gaze point) at which the user gazes, an application example in which an outline is displayed in the case (viewpoint E2) of a view from substantially the front and details are displayed in the case (viewpoint E1) of peeping and the like are considered. When the interest for an object at the gaze point is deep or the object is closely viewed, many users perform an operation of peeping into the object or tend to move the face close thereto. Therefore, a more intuitive UI is implemented by changing a detailed degree of information in cooperation with the above-described operation. Because the distance between the user's head and the display screen can also be estimated when the head tracking is used, the detailed degree may be configured to gradually increase according to the estimation result.

(2-5-2: Filtering According to Angle of Gaze (FIG. 28))

In addition, when the peeping operation is considered as the UI, it is desirable that the user also consider a peeping angle (hereinafter, a gaze angle). For example, as illustrated in FIG. 28, a configuration can be made to switch a type of filter according to the gaze angle. In the example of FIG. 28, a shop-name filter is applied when the gaze angle is 0 degrees to 10 degrees, an occupation filter is applied when the gaze angle is 11 degrees to 20 degrees, and a price-range filter is applied when the gaze angle is 21 degrees to 30 degrees. Further, when the gaze angle is 31 degrees or more, all filters are applied. If the number of filters of an application target is set to increase with an increase in the gaze angle, a degree of narrowing-down increases according to the gaze angle. On the other hand, if the number of filters of the application target is set to decrease with the increase in the gaze angle, a degree of narrowing-down decreases according to the gaze angle. In addition, it is also possible to perform narrowing-down gradually suitable to the user's preference according to the gaze angle by designing a combination of filters to be applied.

(2-5-3: Enlargement/Reduction by Peeping (FIGS. 29 and 30))

In addition, a mechanism capable of controlling the enlargement/reduction of a display according to the peeping operation is also considered. For example, as illustrated in FIG. 29, display magnification can be configured to increase with the increase in the gaze angle. In addition, as illustrated in FIG. 30, the display magnification can be configured to change according to a distance between the display screen and the user's head. Further, these are combined and the display magnification can be configured to be freely changed according to a 2D or 3D operation of the head. In this case, it is only necessary to determine ultimate display magnification based on the product of the display magnification illustrated in FIG. 29 and the display magnification illustrated in FIG. 30 or the like.

The application example relating to the peeping operation has been introduced above.

[2-6: (Application Example) Fixing of Display Content]

Next, an example of an operation of fixing display content will be introduced. Although a mechanism in which display content is switched according to a view direction is useful, display content corresponding to a certain direction may be fixed and the display content may be desired to be viewed from the front. A mechanism for coping with the above-described case will be introduced.

(2-6-1: Fixing of Display Content by Gesture (FIG. 31))

Figure 31:
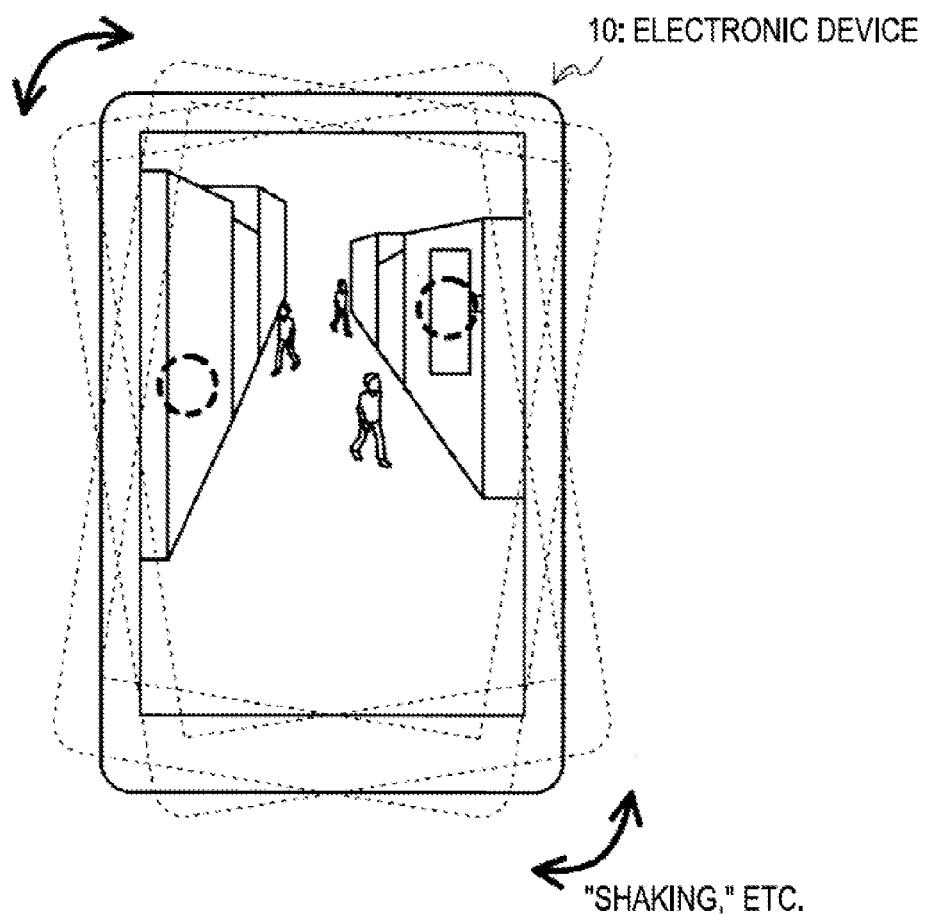
FIG. 31 is an explanatory diagram illustrating an operation of fixing display content by a gesture.

For example, as illustrated in FIG. 31, a method of fixing display content according to a gesture is considered. As the gesture, for example, a method of shaking the electronic device 10 to the left/right or the like is considered. In addition, a method of fixing display content according to large shaking or quick shaking is also considered. The above-described gesture can be detected using an acceleration sensor, a gyro sensor, or the like provided in the electronic device 10. In addition, a method of detecting the gesture from a change in a captured image is also considered. When this method is used, a fixing operation is easily performed without changing the view direction.

(2-6-2: Fixing of Display Content by Line-of-Sight Movement to Predetermined Region (FIG. 32))

Figure 32:
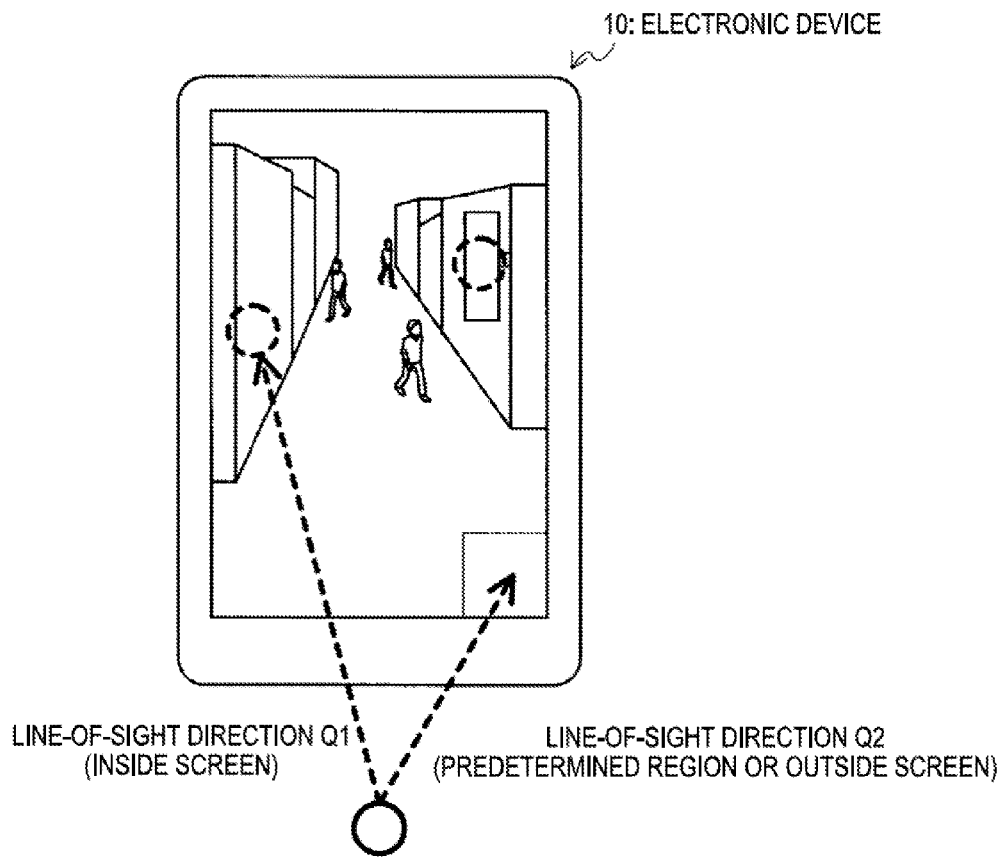
FIG. 32 is an explanatory diagram illustrating an operation of fixing display content by line-of-sight movement to a predetermined region.

In addition, as illustrated in FIG. 32, a method of fixing display content when a line-of-sight direction has moved to a predetermined region (line-of-sight direction Q2) or when the line-of-sight direction has quickly moved outside a screen is considered. In this case, because the display content is likely to be switched according to a change in the line-of-sight direction, it is preferable to provide a mechanism for determining an operation of fixing display content or an operation of switching the display content according to a change time or a change amount in the line-of-sight direction. In addition, for example, the user is expected to perform the operation of fixing display content without worry by adding a function of returning to display content displayed before movement of the line-of-sight direction, or the like when the line-of-sight direction has moved to a predetermined region. It is preferable to further perform the above-described addition if necessary.

(2-6-3: Fixing of Display Content Based on Stationary Time (FIG. 33))

In addition as illustrated in FIG. 33, a method of fixing display content based on a time for which the line of sight has been stationary is also considered. In many cases, it is difficult for the line of sight to be directed to the same gaze point for a long time. Thus, as long as the user does not intentionally perform the above-described operation, a state in which the line of sight has been stationary is not substantially maintained for a long time. To determine the intention of the user, a method using a stationary time of the line of sight is effective. As illustrated in FIG. 33, it is only necessary to provide a mechanism for determining not to fix display content when the line of sight is stopped for a short time and determining to fix display content when the line of sight is stopped for a long time. Because a long-time stationary operation of the viewpoint is connected to an operation in which a person stares, a more intuitive UI is implemented according to the above-described mechanism.

(2-6-4: Fixing of Display Content by Blink (Facial Expression Change) (FIG. 33))

In addition, as illustrated in FIG. 33, it is also desirable to provide a mechanism for releasing fixing of display content. As its method, as illustrated in FIG. 33, a small motion, a blink, or the like of the line of sight is considered. In addition, it is preferable to release fixing according to a predetermined number of blinks, a blink pattern, or the like so that fixing is not released by an accidental blink.

The operation of fixing the display content has been introduced above.

[2-7: Application Example]

The technology in accordance with the first example described above is applicable to various devices. For example, the present technology is applicable to portable devices such as a portable phone, a portable information terminal, a portable game machine, a portable music player, and a portable video player. In addition, the present technology is also applicable to a large-size display apparatus installed at a street angle such as a digital signage terminal. Further, the present technology is applicable to a video device such as a television receiver or an imaging apparatus. In addition, the present technology is applicable to a set-top box, a recording/playback apparatus, a game machine, or the like in combination with the television receiver. Also, for example, the present technology is also applicable to a car navigation system or an apparatus such as an ATM, an automatic ticket vending machine, or a vending machine. However, an apparatus having at least a display function or connected to a device equipped with the display function is necessary.

[2-8: Effects]

When the configuration of the first example is applied, the user can switch display information by merely moving a predetermined portion or tilting a device, or comfortably perform an operation using a method in which there is no contact with a physical interface device. For example, display information can be switched by merely holding a device having a display screen with one hand and tilting the device or tilting one's predetermined portion. As a result, it is possible to comfortably perform an operation even in a scene in which two hands are not freely used such as when one hand is holding luggage. In addition, it is possible to perform an additional operation different from an operation using both hands in a device that is operated with both hands such as a portable game machine.

The first example has been described above.

3: DETAILS OF SECOND EXAMPLE

Selection of Information, Etc.

The second example will be described in detail next.

[3-1: Case of Configuration Example #1]

In the case of the configuration example #1, the functional configuration of the electronic device 20 and the functional configuration of the server 30 in accordance with the second example, for example, are represented as follows.

(3-1-1: Functional Configuration of Electronic Device (FIG. 34))

Figure 34:
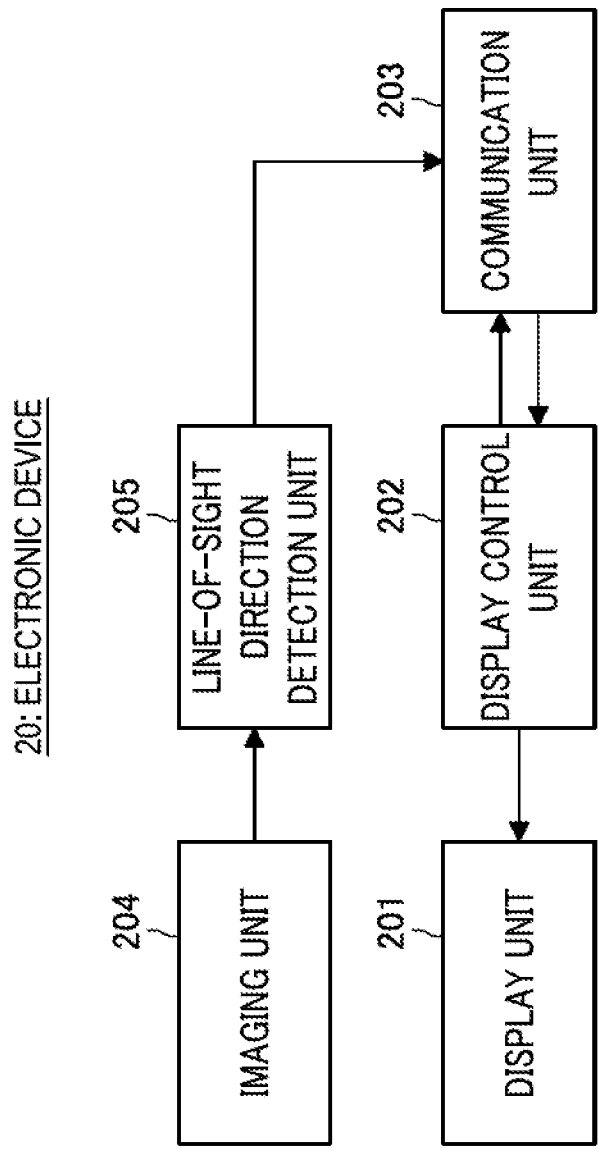
FIG. 34 is an explanatory diagram illustrating a functional configuration of an electronic device in accordance with a second example.

First, the functional configuration of the electronic device 20 will be described with reference to FIG. 34. FIG. 34 is an explanatory diagram illustrating the functional configuration of the electronic device 20 capable of implementing an operation technique of selecting an object using a line-of-sight direction. Although a configuration (see FIG. 9) in which a 3D-displayed object is selected by the operation technique in accordance with the second example will be described for ease of description here, for example, the same is true even for a configuration in which a 2D-displayed object having depth information is selected.

As illustrated in FIG. 34, the electronic device 20 mainly includes a display unit 201, a display control unit 202, a communication unit 203, an imaging unit 204, and a line-of-sight direction detection unit 205. The electronic device 20 may include an imaging unit (not illustrated), which images a subject, a storage unit (not illustrated), which stores information, a GPS, a gyro sensor, an acceleration sensor, and the like.

The display unit 201 has a function of displaying an object in a 3D or 2D display scheme. The display control unit 202 causes the display unit 201 to display an object. In addition, the display control unit 202 highlights the object, displays additional information, or moves a display position of the object. The communication unit 203 communicates with the server 30. In addition, the imaging unit 204 images the user.

A captured image captured by the imaging unit 204 is input to the line-of-sight direction detection unit 205. When the captured image is input, the line-of-sight direction detection unit 205 detects a line of sight of the user from the captured image. For example, using the above-described head tracking technology or another image analysis technique, the line-of-sight direction detection unit 205 detects a head direction, an eye position, or the like, and detects the user's line-of-sight direction. Information (hereinafter, line-of-sight information) regarding the line-of-sight direction detected by the line-of-sight direction detection unit 205 is transmitted to the server 30 via the communication unit 203. At this time, the communication unit 203 transmits information (hereinafter, display information) indicating a display position of an object to the server 30 along with the line-of-sight information.

In addition, as will be described later, the server 30 selects an object based on the display information and the line-of-sight information, and transmits the selection result to the electronic device 20. The selection result is received by the communication unit 203, and input to the display control unit 202. When the selection result is input, the display control unit 202 changes a display of the object based on the input selection result or executes a process corresponding to the selected object.

The functional configuration of the electronic device 20 has been described above.

(3-1-2: Functional Configuration of Server (FIG. 35))

Figure 35:
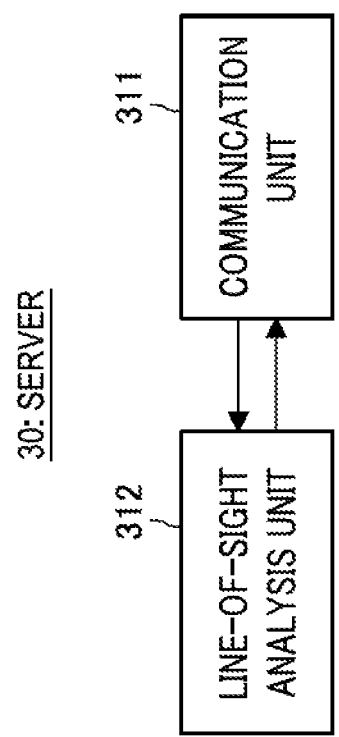
FIG. 35 is an explanatory diagram illustrating a functional configuration of a server in accordance with the second example.

Next, the functional configuration of the server 30 will be described with reference to FIG. 35. As illustrated in FIG. 35, the server 30 mainly includes a communication unit 311 and a line-of-sight analysis unit 312. The communication unit 311 is a communication device for communicating with the electronic device 20. The line-of-sight analysis unit 312 has a function of selecting an object based on the line-of-sight information and the display information acquired from the electronic device 20 via the communication unit 311. For example, the line-of-sight analysis unit 312 determines whether a line of sight specified by the line-of-sight information intersects a display range of each object specified by the display information. Further, the line-of-sight analysis unit 312 determines whether the number of line-of-sight intersections for each object has exceeded a predetermined number. The line-of-sight analysis unit 312 selects an object whose number of intersections has exceeded the predetermined number, and transmits the selection result to the electronic device 20 via the communication unit 311.

The functional configuration of the server 30 has been described above. A method of selecting an object will be described in detail later with a specific example.

(3-1-3: Basic Operation of System (FIGS. 36 and 37))

Figure 36:
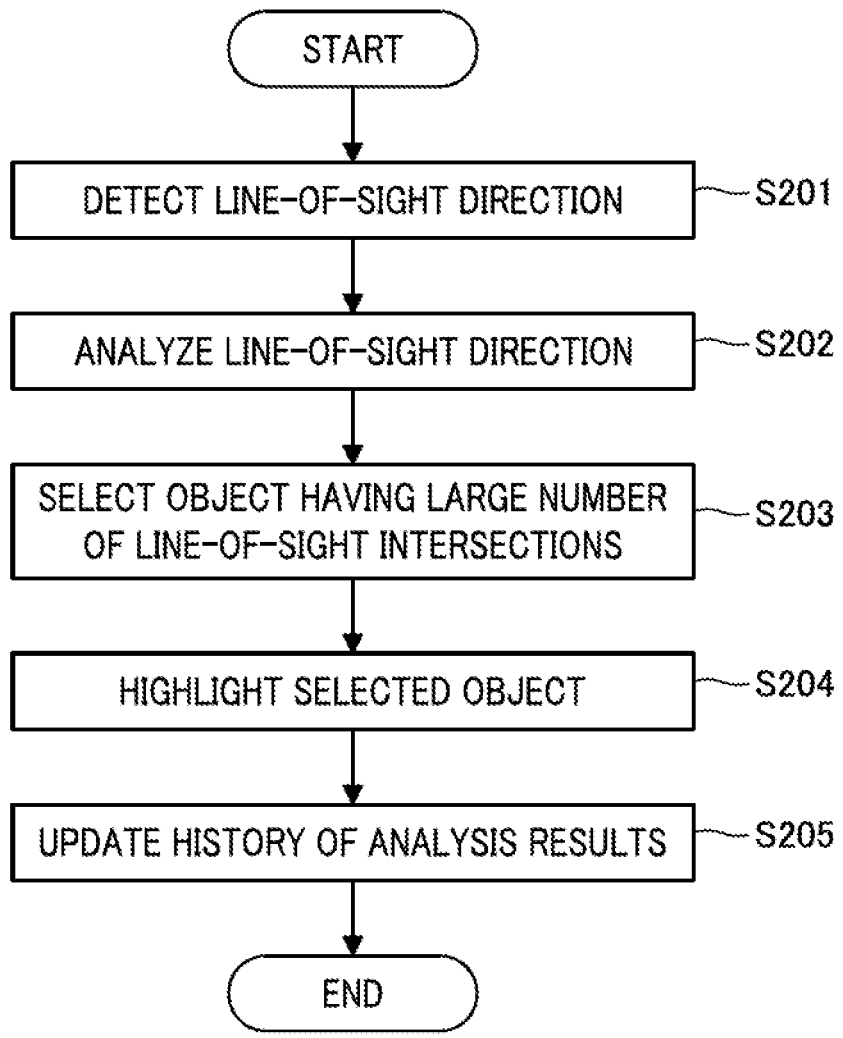
FIG. 36 is an explanatory diagram illustrating an operation of a system in accordance with the second example.
Figure 37:
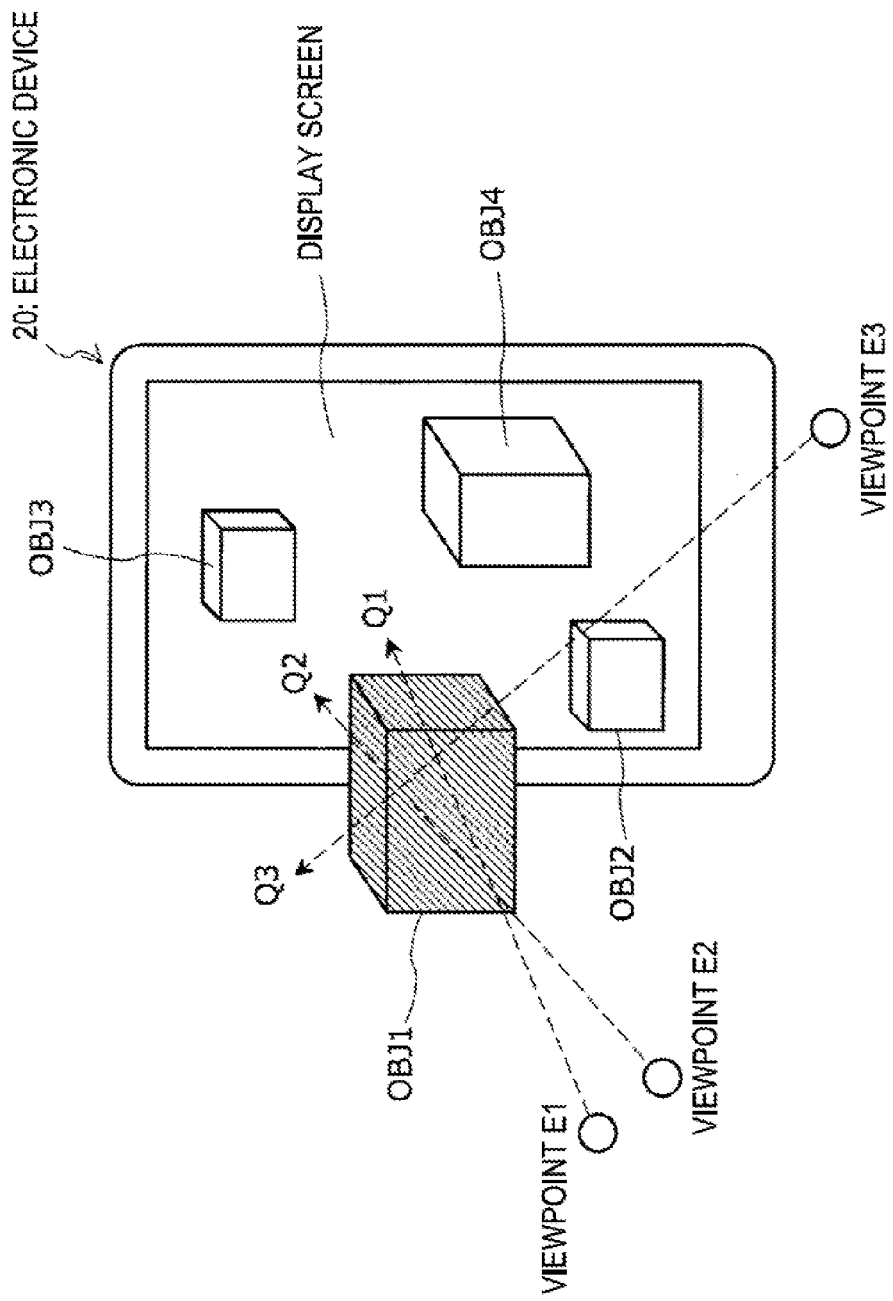
FIG. 37 is an explanatory diagram illustrating an operation of a system in accordance with the second example.

Here, the basic operation of the system in accordance with the second example will be described with reference to FIGS. 36 and 37. FIGS. 36 and 37 are explanatory diagrams illustrating the basic operation of the system in accordance with the second example.

As illustrated in FIG. 36, first, the electronic device 20 detects the user's line-of-sight direction (S201), and transmits line-of-sight information and display information to the server 30. Then, the server 30 executes an analysis process based on the line-of-sight information and the display information (S202). The number of lines of sight intersecting an object (hereinafter, the number of line-of-sight intersections) is calculated. In the example of FIG. 37, lines of sight Q1 to Q3 intersect an object OBJ1, and a line of sight Q3 intersects an object OBJ2. Thus, the server 30 calculates the number of line-of-sight intersections w1 of the object OBJ1 as w1=3 and calculates the number of line-of-sight intersections w2 of the object OBJ2 as w2=1.

Then, the server 30 selects an object having a large number of line-of-sight intersections (S203), and transmits the selection result to the electronic device 20. At this time, the server 30 selects an object having a largest number of line-of-sight intersections or an object whose number of line-of-sight intersections has exceeded a predetermined threshold value Wth. In the example of FIG. 37, for example, the object OBJ1 having a largest number of line-of-sight intersections is selected. Then, the electronic device 20 highlights the object selected by the server 30 (S204).

For example, as illustrated in FIG. 37, the electronic device 20 causes a color of the selected object to be changed. Every time the number of line-of-sight intersections is updated, the color of the object may be configured to be changed. In addition, the server 30 transmitting the selection result to the electronic device 20 updates a history of results (for example, information regarding the selected object, a distribution of the number of viewpoint intersections, and the like) obtained in the course of an analysis process (S206). In addition, although a timing at which the object is selected has not been described here, a selection process may be executed at a predetermined timing, and the selection process may be executed at a timing at which the number of line-of-sight intersections for the object has exceeded the threshold value Wth.

The basic operation of the system in accordance with the second example has been described above.

[3-2: Case of Configuration Example #2]

In the case of the configuration example #2, the functional configuration of the electronic device 20 in accordance with the second example, for example, is represented as follows.

(3-2-1: Functional Configuration of Electronic Device (FIG. 38))

Figure 38:
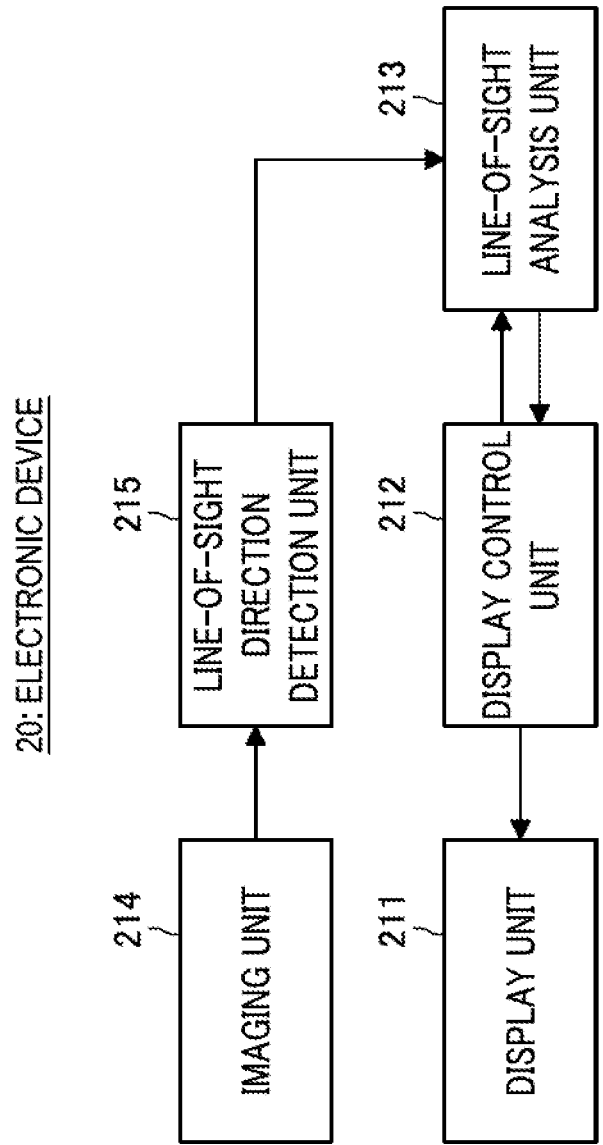
FIG. 38 is an explanatory diagram illustrating a functional configuration of an electronic device in accordance with the second example.

First, the functional configuration of the electronic device 20 will be described with reference to FIG. 38. FIG. 38 is an explanatory diagram illustrating the functional configuration of the electronic device 20 capable of implementing an operation technique of selecting an object using a line-of-sight direction. Although a configuration (see FIG. 9) in which a 3D-displayed object is selected by the operation technique in accordance with the second example will be described for ease of description here, for example, the same is true even in a configuration in which a 2D-displayed object having depth information is selected.

As illustrated in FIG. 38, the electronic device 20 mainly includes a display unit 211, a display control unit 212, a line-of-sight analysis unit 213, an imaging unit 214, and a line-of-sight direction detection unit 215. The electronic device 20 may include an imaging unit (not illustrated), which images a subject, a storage unit (not illustrated), which stores information, a GPS, a gyro sensor, an acceleration sensor, and the like.

The display unit 211 has a function of displaying an object in a 3D or 2D display scheme. The display control unit 212 causes the display unit 211 to display the object. In addition, the display control unit 212 highlights the object, displays additional information, or moves a display position of the object. The line-of-sight analysis unit 213 calculates the number of line-of-sight intersections of each object based on the detection result of the line-of-sight direction, and selects an object based on the selection result. In addition, the imaging unit 214 images the user.

A captured image captured by the imaging unit 214 is input to the line-of-sight direction detection unit 215. When the captured image is input, the line-of-sight direction detection unit 215 detects a line-of-sight direction of the user from the captured image. For example, using the above-described head tracking technology or another image analysis technique, the line-of-sight direction detection unit 215 detects a head direction, an eye position, or the like, and detects the user's line-of-sight direction. Information (line-of-sight information) regarding the line-of-sight direction detected by the line-of-sight direction detection unit 215 is input to the line-of-sight analysis unit 213. In addition, display information indicating a display position of each object from the display control unit 212 is input to the line-of-sight analysis unit 213.

When the line-of-sight information and the display information are input, the line-of-sight analysis unit 212 selects an object based on the input display information and line-ofsight information, and inputs the selection result to the display control unit 212. For example, the line-of-sight analysis unit 213 determines whether a line of sight specified by the line-of-sight information intersects a display range of each object specified by the display information. Further, the line-of-sight analysis unit 213 determines whether the number of line-of-sight intersections for each object has exceeded a predetermined number. The line-of-sight analysis unit 213 selects an object whose number of intersections has exceeded the predetermined number. When the selection result is input, the display control unit 212 causes a display of an object to be changed based on the input selection result, or executes a process corresponding to the selected object.

The functional configuration of the electronic device 20 has been described above.

(3-2-2: Basic Operation of System (FIG. 39))

Figure 39:
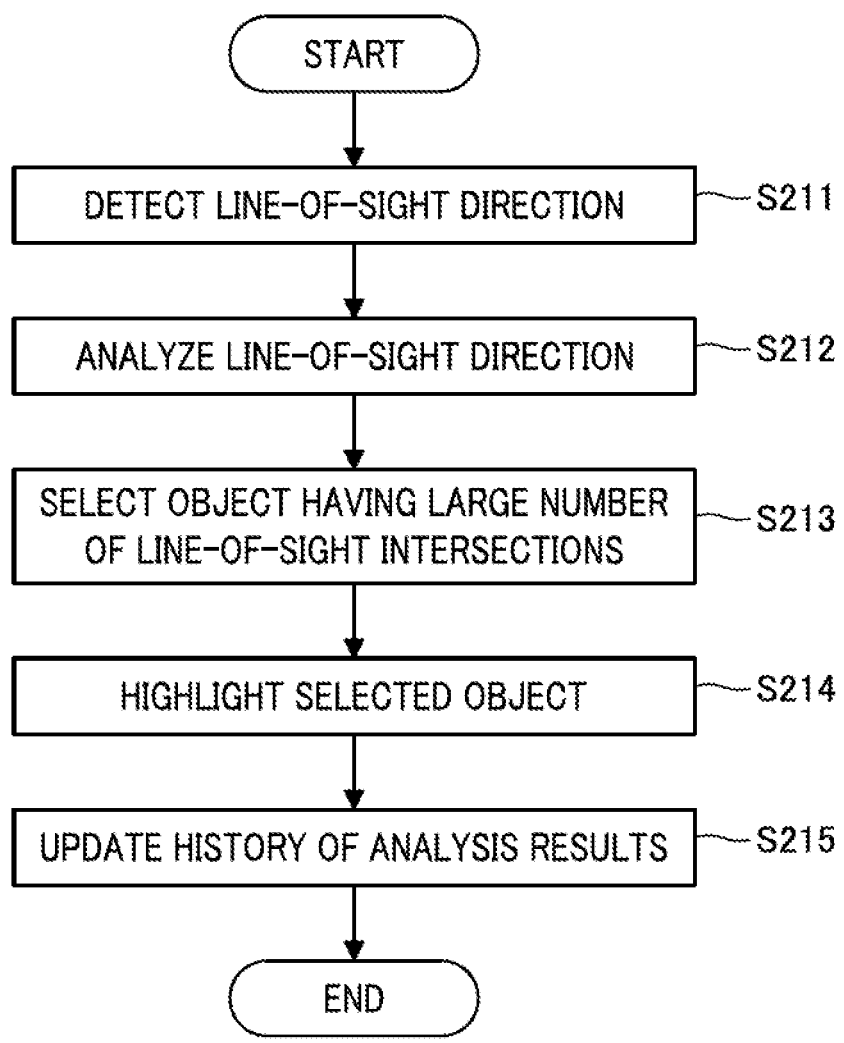
FIG. 39 is an explanatory diagram illustrating an operation of a system in accordance with the second example.

Here, the basic operation of the system in accordance with the second example will be described with reference to FIG. 39. FIG. 39 is an explanatory diagram illustrating the basic operation of the system in accordance with the second example.

As illustrated in FIG. 39, first, the electronic device 20 detects the user's line-of-sight direction (S211). Then, the electronic device 20 executes an analysis process based on the line-of-sight information and the display information (S212), and calculates the number of lines of sight intersecting the object (the number of line-of-sight intersections). In the above-described example of FIG. 37, lines of sight Q1 to Q3 intersect an object OBJ1, and the line of sight Q3 intersects an object OBJ2. Thus, the electronic device 20 calculates the number of line-of-sight intersections w1 of the object OBJ1 as w1=3 and calculates the number of line-of-sight intersections w2 of the object OBJ2 as w2=1.

Then, the electronic device 20 selects an object having a large number of line-of-sight intersections (S213). At this time, the electronic device 20 selects an object having a largest number of line-of-sight intersections or an object whose number of line-of-sight intersections has exceeded the predetermined threshold value Wth. In the above-described example of FIG. 37, for example, the object OBJ1 having a largest number of line-of-sight intersections is selected. Then, the electronic device 20 highlights the selected object (S214).

For example, as illustrated in FIG. 37 described above, the electronic device 20 causes a color of the selected object to be changed. Every time the number of line-of-sight intersections is updated, the color of the object may be configured to be changed. In addition, the electronic device 20 updates a history of results (for example, information regarding the selected object, a distribution of the number of viewpoint intersections, and the like) obtained in the course of an analysis process (S215). In addition, although a timing at which the object is selected has not been described here, a selection process may be executed at a predetermined timing, and the selection process may be executed at a timing at which the number of line-of-sight intersections for the object has exceeded the threshold value Wth.

The basic operation of the system in accordance with the second example has been described above.

[3-3: (Supplement) Depth Representation]

Here, description of a method of handling depth representation will be supplemented.

(3-3-1: 3D Display (FIG. 40))

Figure 40:
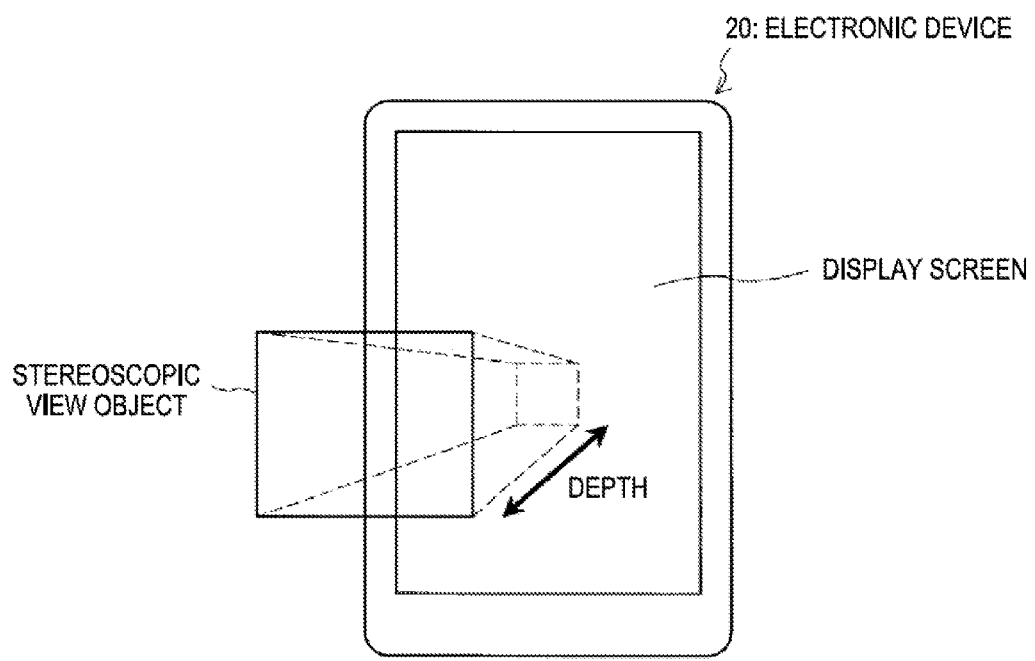
FIG. 40 is an explanatory diagram illustrating a 3D display.

The process of implementing the 3D display by causing pixel groups viewed by left and right eyes to be different and causing two types of images considering parallax to be displayed in the pixel groups has already been described. In the case of the 3D display, it is possible to control a display position of an object in a depth direction as illustrated in FIG. 40 by adjusting the two types of images so that the parallax is changed. Although the two types of images are actually displayed on the display screen, the object viewed by the user protrudes by a depth approximately defined in the parallax. The protrusion amount can be easily calculated from a parameter such as the parallax. Accordingly, the electronic device 20 can recognize a position of an object within a 3D space to be recognized by the user.

The user whose line of sight follows the 3D-displayed object will have the line of sight running within the 3D space. However, an image is displayed on a display screen as described above. In the case of the 3D display, the electronic device 20 recognizes a position of an object within a 3D space to be recognized by the user, and determines whether a line of sight of the user actually intersects the position. The electronic device 20 selects an object based on the determination result. As described above, in the case of the 3D display, it is necessary to determine a line-of-sight intersection by considering a virtual protrusion amount of an object.

(3-3-2: 2D Display+Depth Information (FIG. 41))

Figure 41:
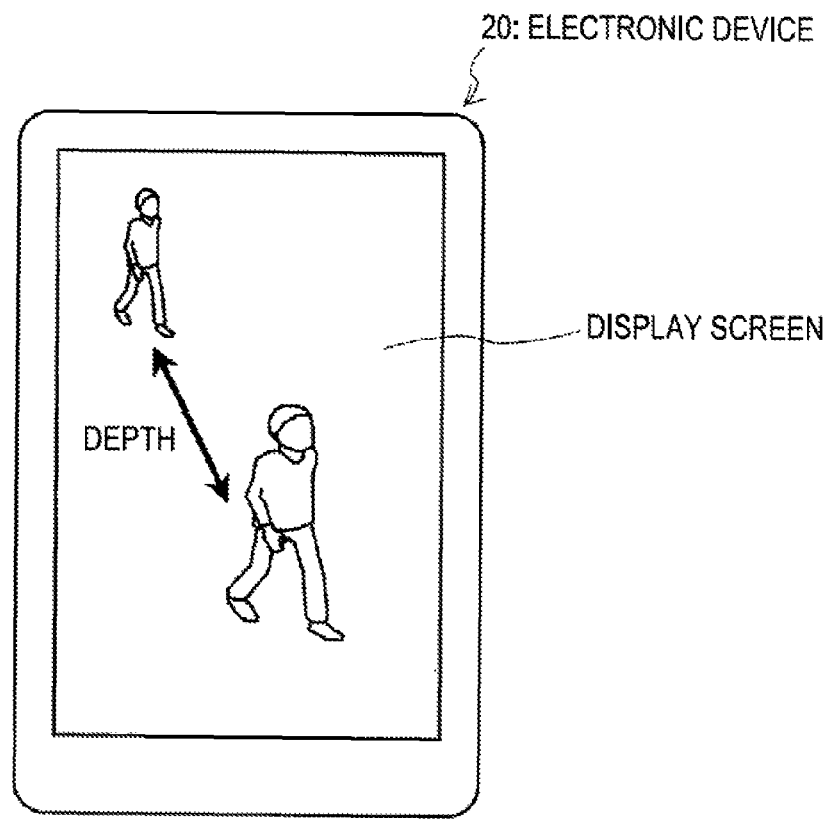
FIG. 41 is an explanatory diagram illustrating depth information in a two-dimensional (2D) display.

On the other hand, in the case of the 2D display, the user directly recognizes an image displayed on a display screen. Accordingly, an object does not protrude from the display screen. However, even in the 2D display, as illustrated in FIG. 41, there is an image having a depth sense. For example, even for a human having the same height, the human imaged at the near side becomes large and the human imaged at the far side becomes small. Thus, even in the 2D display, it is possible to detect a depth from an image.

In addition, in the case of a moving image or the like, when a video captured during movement at a given speed is viewed, a physical object at the near side passes backward at a speed close to a movement speed, but a time until distant mountains or clouds disappear from an angle of view is very long. It is possible to detect a depth within the video from the above-described principle. Also, the user similarly has the above-described depth sense. Thus, even for a 2D display image or video having the depth sense, the user can turn the line of sight by recognizing the depth. Accordingly, even for the 2D display, it is possible to apply a technique of selecting an object in accordance with the second example using an algorithm similar to the case of the 3D display.

A method of handling depth representation has been described above.

[3-4: Object Selection Method #1 (Single User)]

Hereinafter, the object selection method will be described in further detail later. In addition, its application example will be introduced with a specific example. Here, an operation technique in which one user selects an object while moving a line of sight will be described.

(3-4-1: Selection Method Based on Number of Line-of-Sight Intersections (FIGS. 42 to 44))

Figure 42:
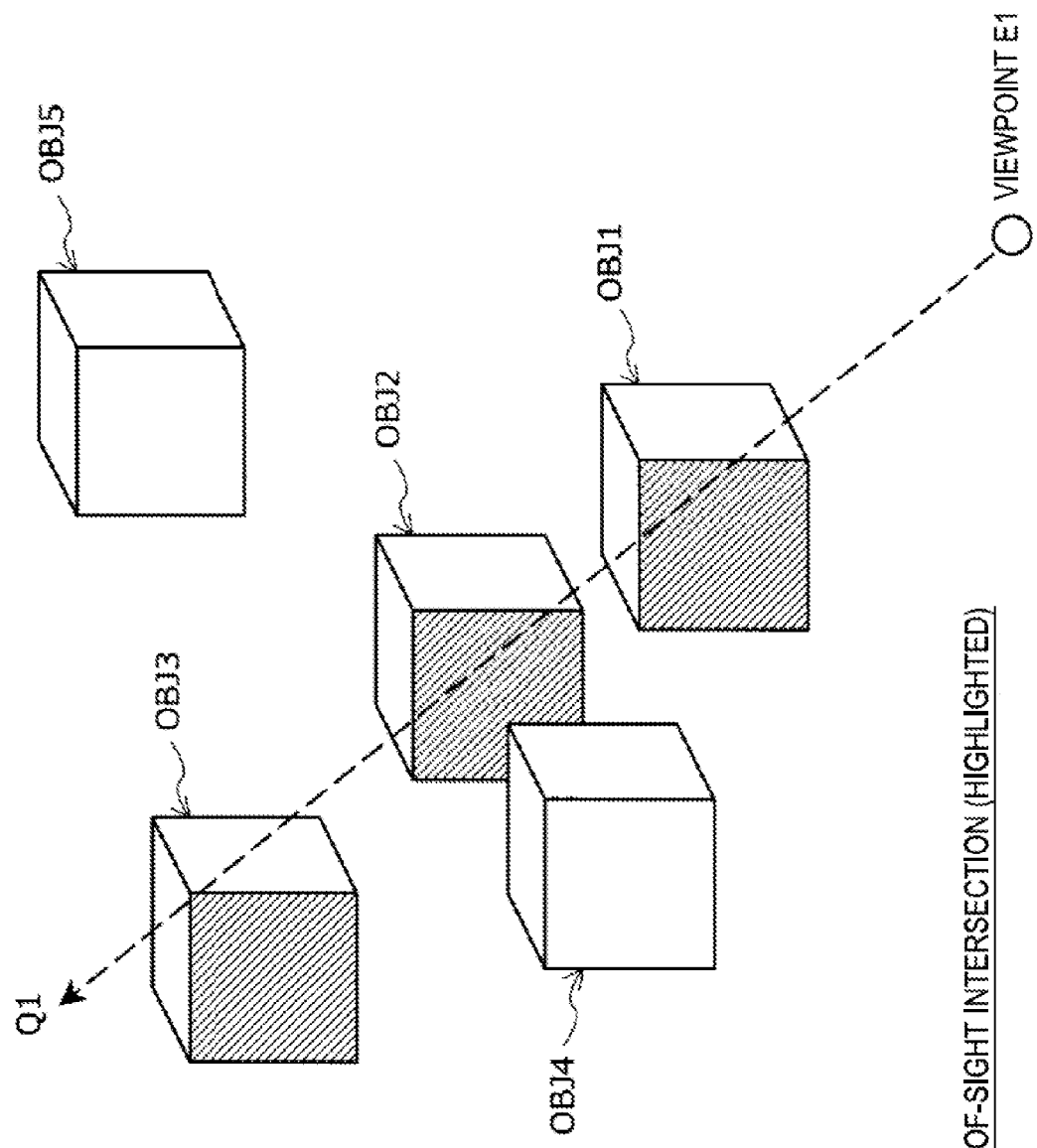
FIG. 42 is an explanatory diagram illustrating a method of selecting an object based on the number of line-of-sight intersections.

First, the selection method based on the number of line-of-sight intersections described above will be described in further detail later. As illustrated in FIG. 42, when a line of sight is detected, an object (hereinafter, an intersection object) intersecting the line of sight is detected. In the example of FIG. 42, objects OBJ1 to OBJ3 are selected as intersection objects for a line of sight Q1. These intersection objects are selected as candidates for an ultimately selected object (hereinafter, a gaze object). The candidates of the gaze object may be highlighted by a predetermined representation method (for example, color, brightness, blinking, transparency/semi-transparency, blur, or the like) as illustrated in FIG. 42.

Figure 43:
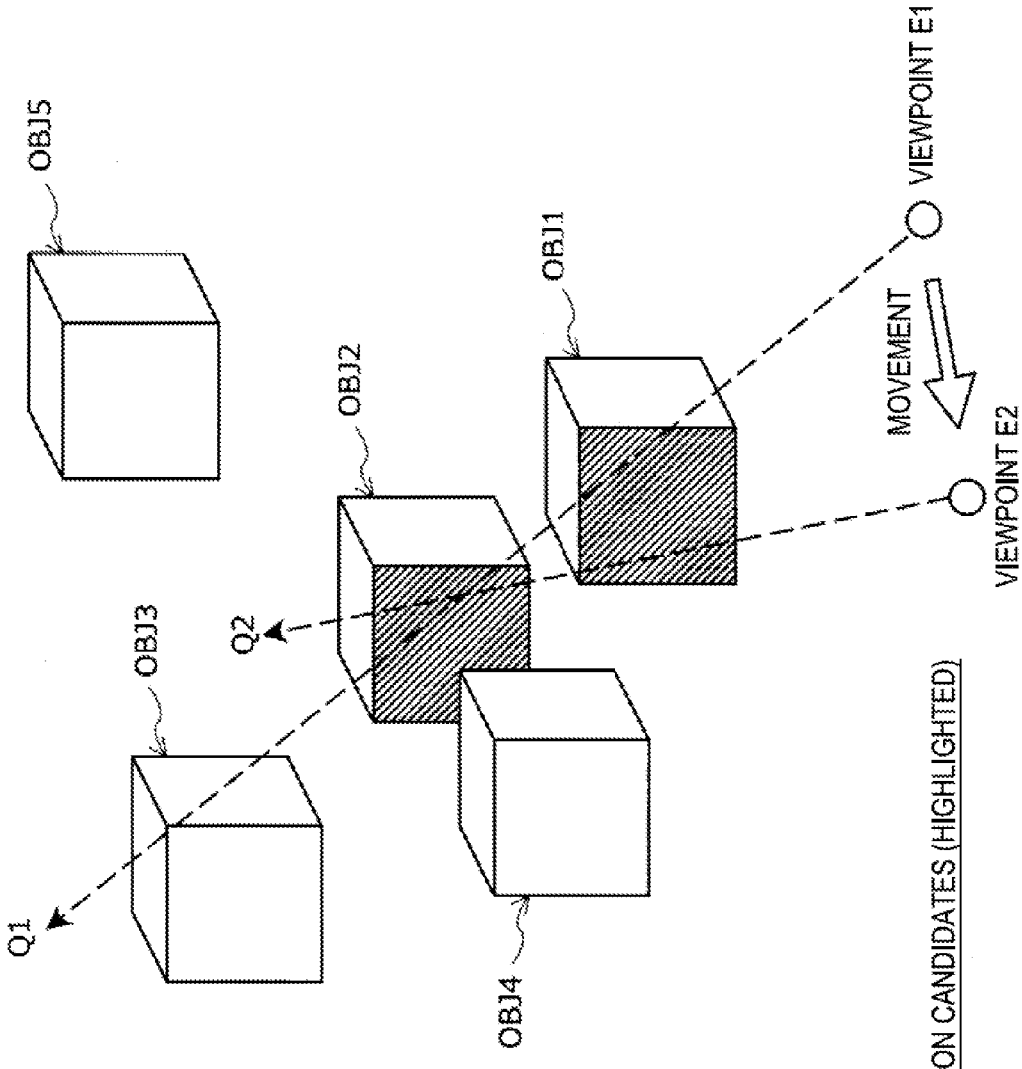
FIG. 43 is an explanatory diagram illustrating a method of selecting an object based on the number of line-of-sight intersections.

Next, as illustrated in FIG. 43, when a viewpoint moves and a new line of sight Q2 is detected, an intersection object is detected with respect to the line of sight Q2. In the example of FIG. 43, the objects OBJ1 and OBJ2 are detected as intersection objects. At this time, the electronic device 20 updates the number of line-of-sight intersections of the objects OBJ1 and OBJ2 to 2. In addition, the objects OBJ1 and OBJ2 may be further highlighted. For example, a configuration in which a representation is changed so that a degree of highlighting becomes strong (for example, a color is darker or the like) when narrowing-down progresses or the like is considered.

Figure 44:
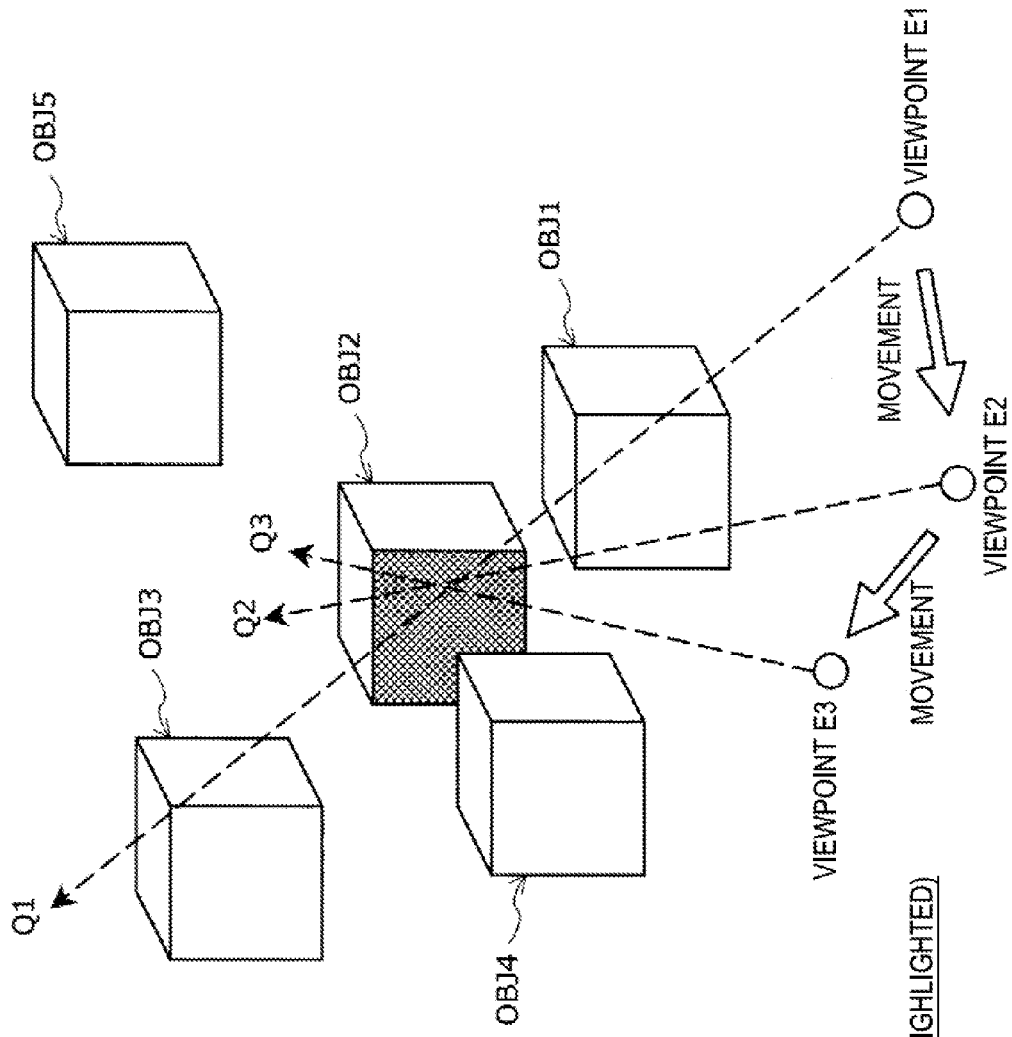
FIG. 44 is an explanatory diagram illustrating a method of selecting an object based on the number of line-of-sight intersections.

Next, as illustrated in FIG. 44, when a viewpoint moves and a new line of sight Q3 is detected, an intersection object is detected for the line of sight Q3. In the example of FIG. 44, the object OBJ2 is detected as an intersection object. At this time, because the number of intersection objects is narrowed down to 1, the electronic device 20 selects the object OBJ2 as a gaze object. Although a method of iterating the detection of a line of sight and the selection of an intersection object until the number is narrowed down to 1 has been introduced as an example here, a method of selecting an object having a largest number of line-of-sight intersections at a certain timing is also considered.

In addition, a method of selecting an object having a predetermined number of line-of-sight intersections or less as a gaze object is also considered. The line of sight may be detected periodically at predetermined time intervals, and may be detected by a predetermined pattern. In addition, a process of selecting the gaze object may be an operation that is manually started and ended by the user, and may be an operation that is automatically started and ended using a timer, a program, or the like. When a mechanism for selecting an object based on the above-described line-of-sight intersections is used, the user can select a desired object by merely moving a line of sight. For example, it is possible to operate an object imaged on a distant display or the like.

Although the object selection operation has been described, it is also possible to complexly control the electronic device 20 only by a line of sight if a predetermined process is executed at a timing at which a gaze object has been selected. In this case, it is desirable to design an operation of displaying an operation object corresponding to each process or the like. For example, a configuration in which operation objects and the like are displayed to switch a playback button, a stop button, and content of a music player and a process corresponding to each object is executed and the like are considered. In addition, a configuration in which a fast forward button is displayed and a playback speed increases step by step according to the number of line-of-sight intersections for the button is also considered. Of course, the above-described modification belongs to a technical scope of the second example.

(Selection Process when Gaze Object is Obvious)

Although a method of selecting a gaze object from among a plurality of objects has been described, a mechanism for immediately selecting an object whose line-of-sight intersection has been detected when the number of objects serving as a target is 1 or when there is no other object around the object whose line-of-sight intersection has been detected is also considered. For example, because the object is immediately selected even when the number of line-of-sight intersections does not exceed a predetermined threshold value, stress imposed on the user due to a selection delay can be significantly reduced.

(3-4-2: Region Division of Object (FIGS. 45 and 46))

Figure 45:
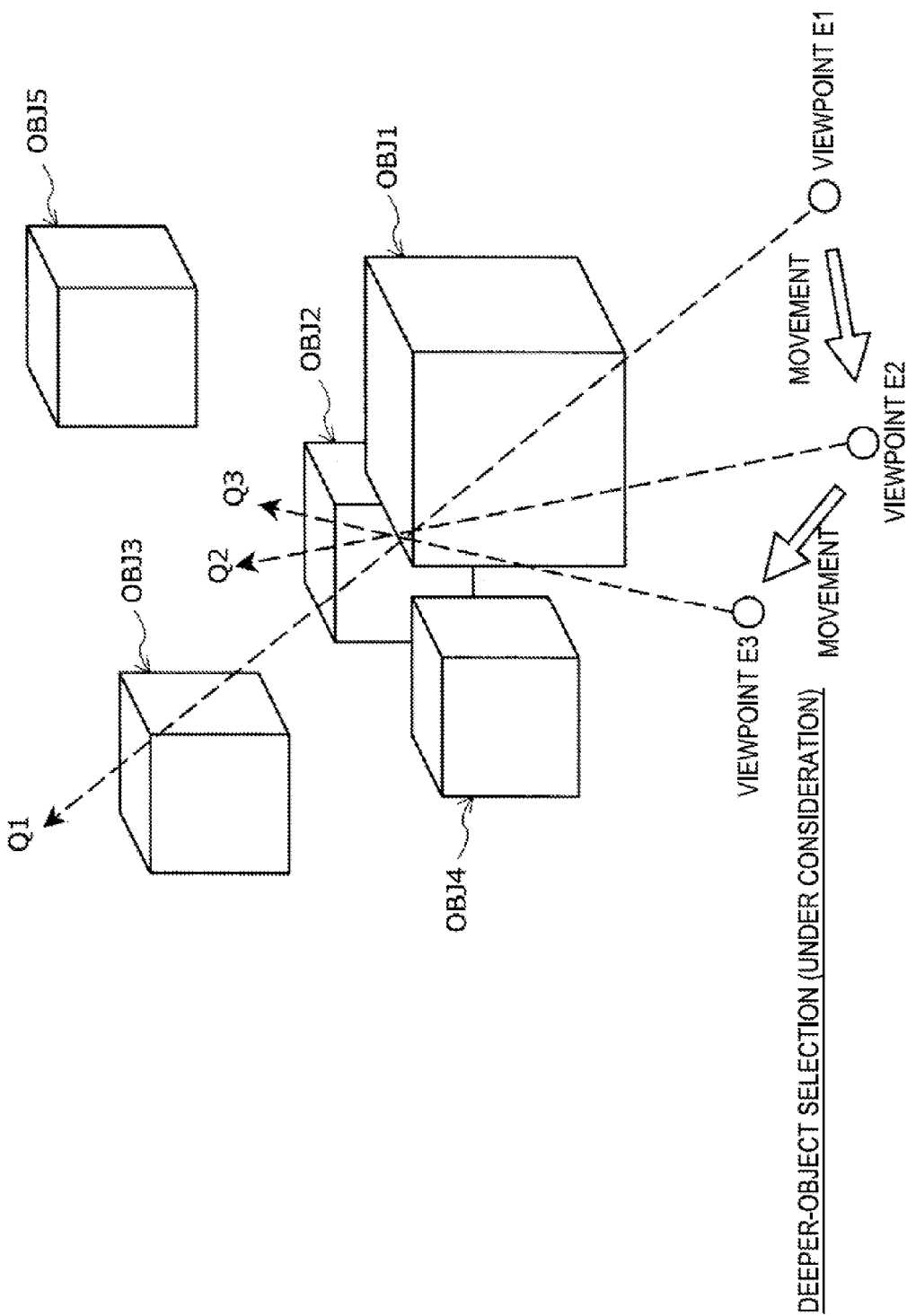
FIG. 45 is an explanatory diagram illustrating a method of selecting an object based on the number of line-of-sight intersections to which an object region division is applied.

A method of selecting one object as a gaze object from among objects having substantially the same size has been described above. However, the objects usually have various sizes as illustrated in FIG. 45. Thus, when there is a large object, the line of sight is concentrated on the object, and it is difficult to select an object behind the large object or a small object. In the example of FIG. 45, it is difficult to select an object OBJ2 in the shadow of an object OBJ1.

Figure 46:
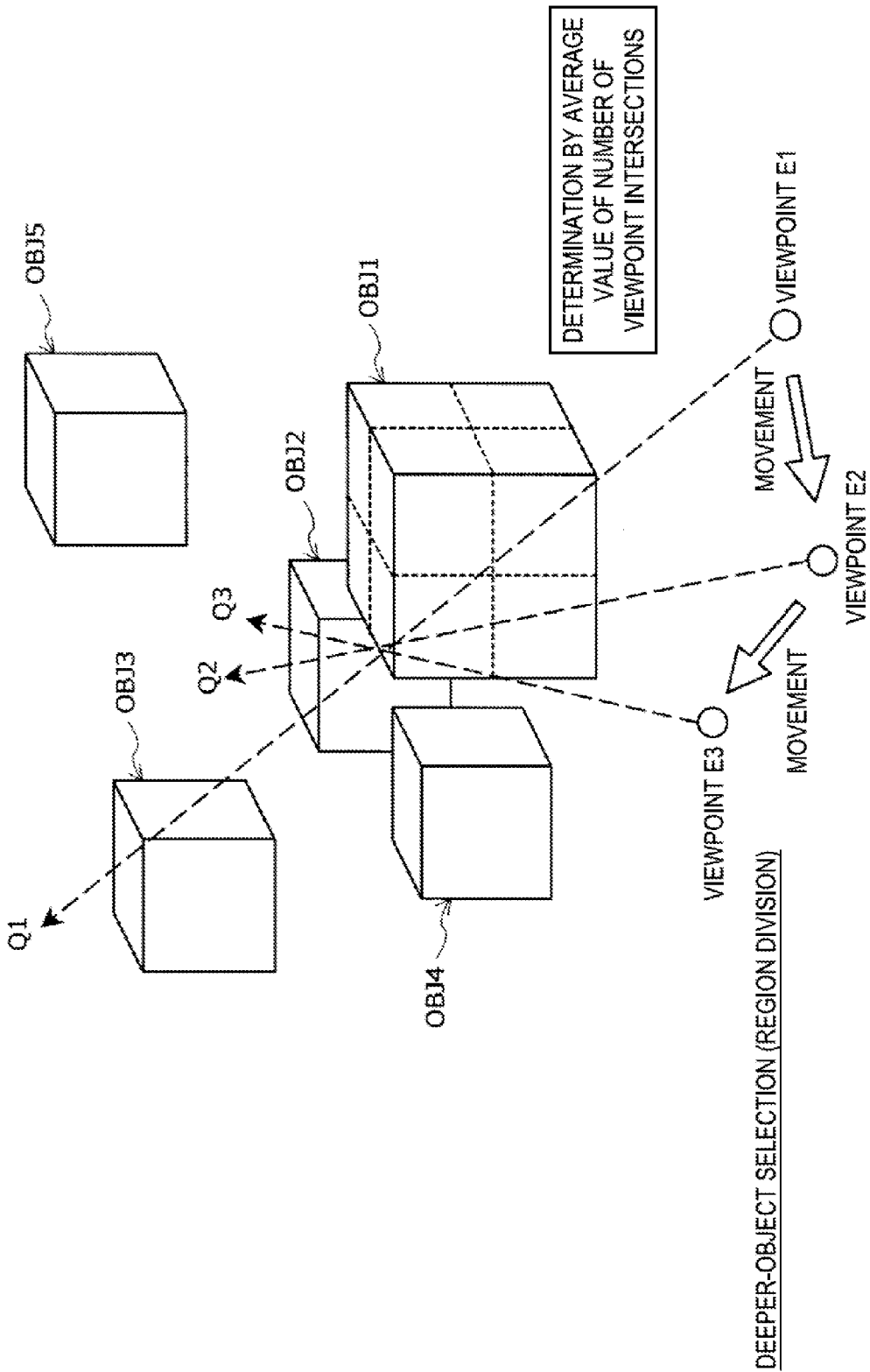
FIG. 46 is an explanatory diagram illustrating a method of selecting an object based on the number of line-of-sight intersections to which an object region division is applied.

Therefore, as illustrated in FIG. 46, a method of dividing each object into predetermined-size blocks and counting the number of line-of-sight intersections of each block is proposed. In the method, after the number of line-of-sight intersections of each block has been counted, the average number of line-of-sight intersections per block for each object including the blocks is calculated, and an object is selected based on the average number of line-of-sight intersections. In the case of an object that is smaller than a predetermined size, it is only necessary to weight the number of line-of-sight intersections for a ratio of a size. According to the above-described configuration, it is possible to improve a situation in which it is difficult to select a small object.

Although a configuration in which the average number of line-of-sight intersections is directly used to select an object has been introduced, a configuration in which the actual number of line-of-sight intersections is weighted using a weight value based on the average number of line-of-sight intersections, and an object is selected based on the number of line-of-sight intersections after weighting is also considered. It is possible to adjust a degree to which a small object is likely to be selected and a degree to which a large object is likely to be selected with a good balance according to adjustment using the above-described weight value.

When a method of dividing a large object into a plurality of blocks and adjusting the ease of selection by weighting corresponding to a size is used as described above, a small object is immediately selected, but a situation in which a large object is not easily selected may occur. However, the above-described situation is quite similar to a form in which heat is quickly transferred in a small physical object but heat is not easily transferred throughout a large physical object. Accordingly, the user can intuitively recognize that it is necessary to give a large-size object a careful glance and perform an operation without discomfort according to intuition.

When a region division configuration is applied as described above, this also contributes to the implementation of an intuitive UI.

(3-4-3: Selection Determination Based on Gaze Time (FIG. 47))

Figure 47:
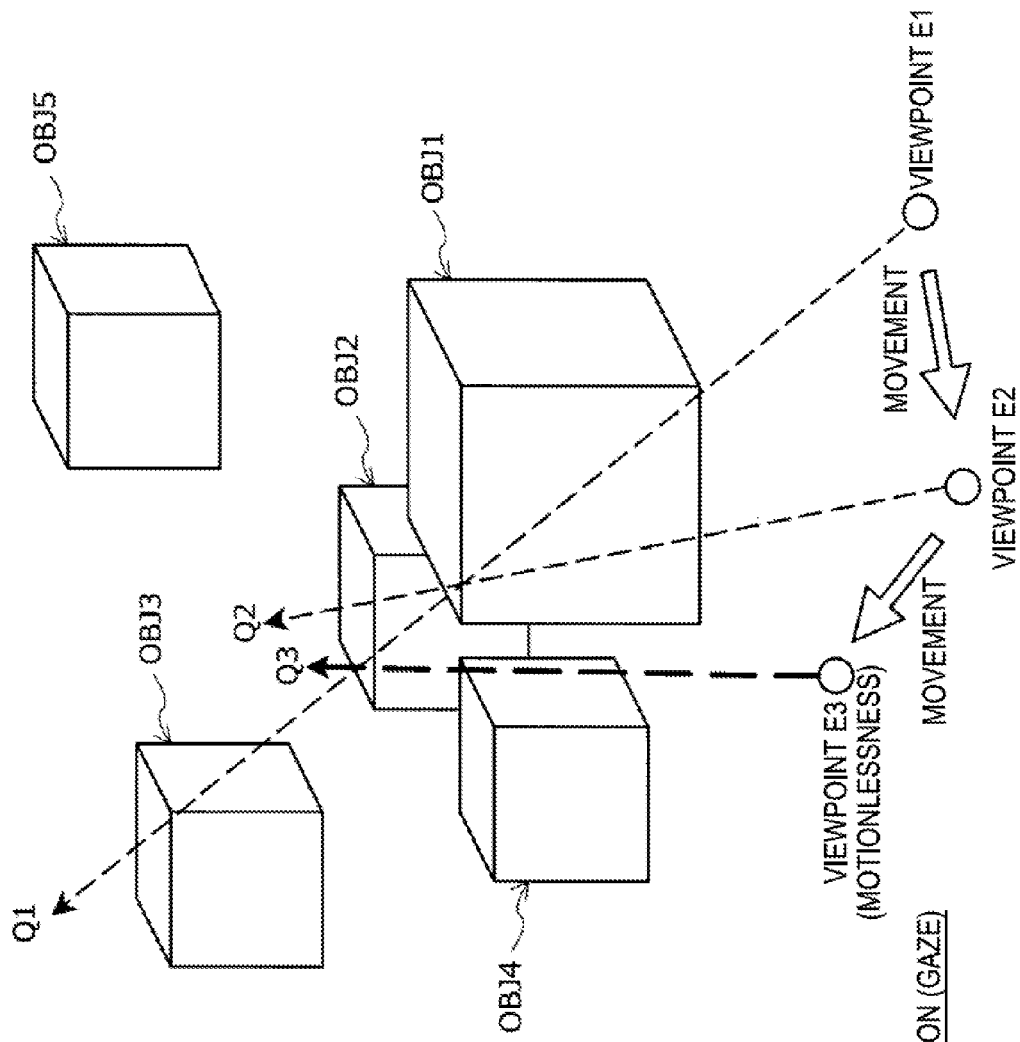
FIG. 47 is an explanatory diagram illustrating a method of determining object selection based on a gaze time.

It is comparatively difficult to cause a line of sight to be exactly continuously directed to a small region. However, a method of increasing selection precision reversely using the above-described property is considered. For example, as illustrated in FIG. 47, in a state in which a viewpoint has been stationary for more than a predetermined time, an object is selected, but a method of assigning a large weight to the number of line-of-sight intersections or the like is considered. When a line of sight is stationary for a long time in a state in which the line of sight has intersected a certain object, the user is considered to have selected the object with a strong will. Thus, when the motionlessness of the line of sight has continued for a predetermined time or more, the selection effect reflecting the user's strong will is obtained when the object is selected.

In addition, when a line of sight intersecting a plurality of superimposed and displayed objects has been stationary, an object positioned at the back side may be configured to be selected. When the user views through an inner physical object or views a physical object, only part of which has protruded, the user stares at the physical object. That is, the user causes the line of sight to be stationary with great concentration to a certain extent. In other words, the above-described configuration implements the above-described natural operation as a UI. Accordingly, the user can perform a more intuitive operation through the above-described configuration.

(3-4-4: Selection Determination Based on Line-of-Sight Movement Speed (FIG. 48))

In addition, it is possible to further increase the precision of object selection and increase operability by considering a line-of-sight movement speed in addition to the stationary line of sight. As described above, it is difficult to select a small object positioned deeper than a large object. On the other hand, although an object region dividing method is the same as described above, it is possible to expect the same effect even when an object is selected by considering a line-of-sight movement speed as illustrated in FIG. 48.

Figure 48:
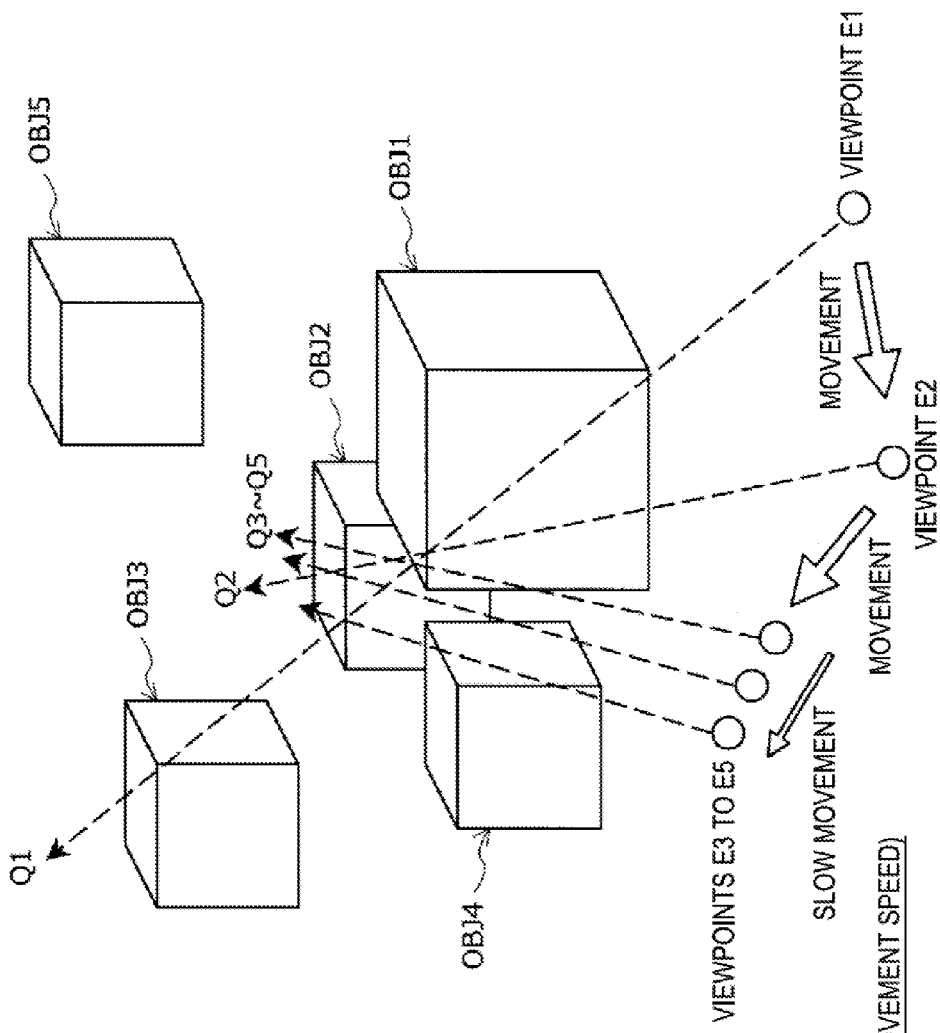
FIG. 48 is an explanatory diagram illustrating a method of determining object selection based on a line-of-sight movement speed.

When the line of sight slowly moves in a state in which the line of sight is directed to an object at the back side as illustrated in FIG. 48, the number of line-of-sight intersections for the object OBJ2 largely increases. Accordingly, the object OBJ2 is likely to be selected. However, when an object is largely hidden at the back side, the object is unlikely to be sufficiently selected even when the line of sight slowly moves. Therefore, a configuration in which the number of line-of-sight intersections is weighted according to a line-of-sight movement speed is considered. For example, a mechanism for assigning the number of line-of-sight intersections increasing 1.5 times to an object intersecting the line of sight during movement at the speed when a line-of-sight movement speed has been halved or the like is considered.

In addition, a mechanism for changing resolution when a line-of-sight intersection is detected according to a line-of-sight movement speed is also considered. The resolution mentioned here, for example, is defined by (Resolution)= (Reference Speed V0)/(Actual Speed V). By detecting the number of line-of-sight intersections at a frequency multiplied by the resolution, the number of line-of-sight intersections is detected at a high frequency when the actual speed V is low. As a result, when the user slowly moves the line of sight, the number of line-of-sight intersections for an object the line of sight has intersected further increases and an object accurately reflecting the user's intention is set to be selected. When the above-described mechanism is used, a small object or an object at the back side is easily selected.

(3-4-5: Decision Operation by Gesture (FIG. 49))

Although an object selection state has been automatically decided at a certain timing as described above, the user may desire to arbitrarily decide the selection state by his or her will. For example, this corresponds to the case in which, although the number of intersection objects is narrowed down to 1, a plurality of currently selected intersection objects are desired to be immediately selected as gaze objects or the like.

Figure 49:
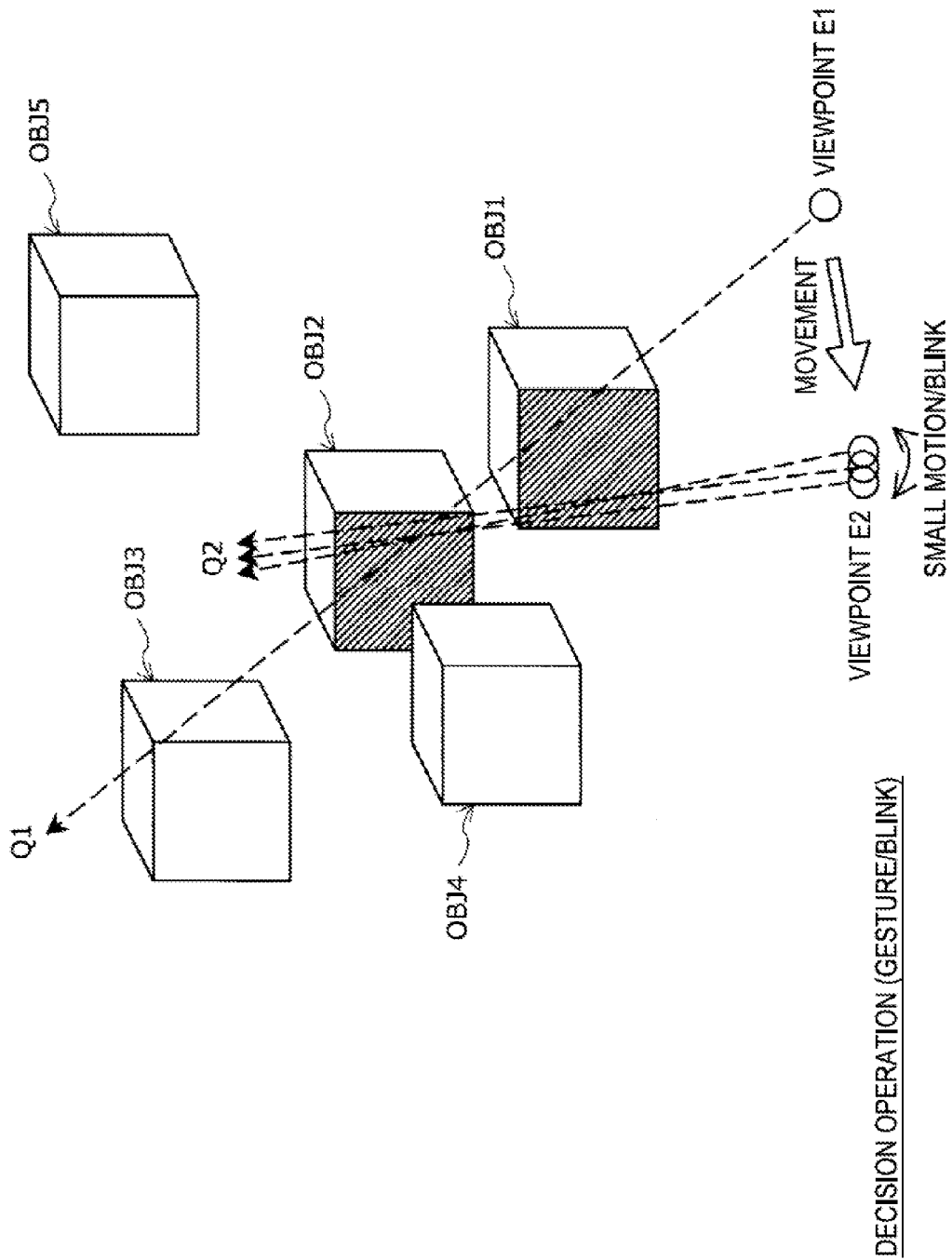
FIG. 49 is an explanatory diagram illustrating a decision operation by a gesture or blink.

Therefore, a mechanism for deciding a selection state using a gesture will be introduced with reference to FIG. 49. As the gesture, for example, a method of moving a line-of-sight direction little by little, changing the line-of-sight direction in a predetermined pattern, or changing a line-of-sight movement speed in a predetermined pattern or the like is considered. In addition, a method of utilizing facial expression recognition technology and deciding a selection state when the user's facial expression has become a predetermined facial expression (for example, a smile, a frowning face, or the like) is also considered. According to this method, it is possible to implement a decision operation within a range of an operation technique by a head's motion absolutely including line-of-sight movement.

Of course, a method combined with a pointing device or combined with a gesture of moving a part (for example, a hand, or the like) other than the head is also considered. In the case of this method, although an operation of moving a part other than the head is necessary, the operation is more precise and easier than an operation by the motion of the head in a scene in which a careful operation or a more accurate operation is necessary. Accordingly, it is desirable to use a combination of the above-described mechanisms according to a use form, a type of object, or the like.

(3-4-6: Decision Operation by Blink (Facial Expression Change) (FIG. 49))

In addition, a method of causing a line of sight to disappear instead of moving a line of sight is considered. That is, by detecting the user's blink, the selection state of the object is decided according to the blink. In addition, in a similar concept, a UI for deciding the selection state of the object according to a facial expression change is also considered. The facial expression change can be detected from a change in a feature quantity of a face image captured in real time. In addition, a configuration can be made to decide the selection state of the object when a specific facial expression has been changed. In any method, it is possible to implement the decision operation within a range of an operation technique based on line-of-sight movement.

(3-4-7: Assistance of Narrowing-Down Operation by Movement of Object (FIGS. 50 and 51))

Figure 50:
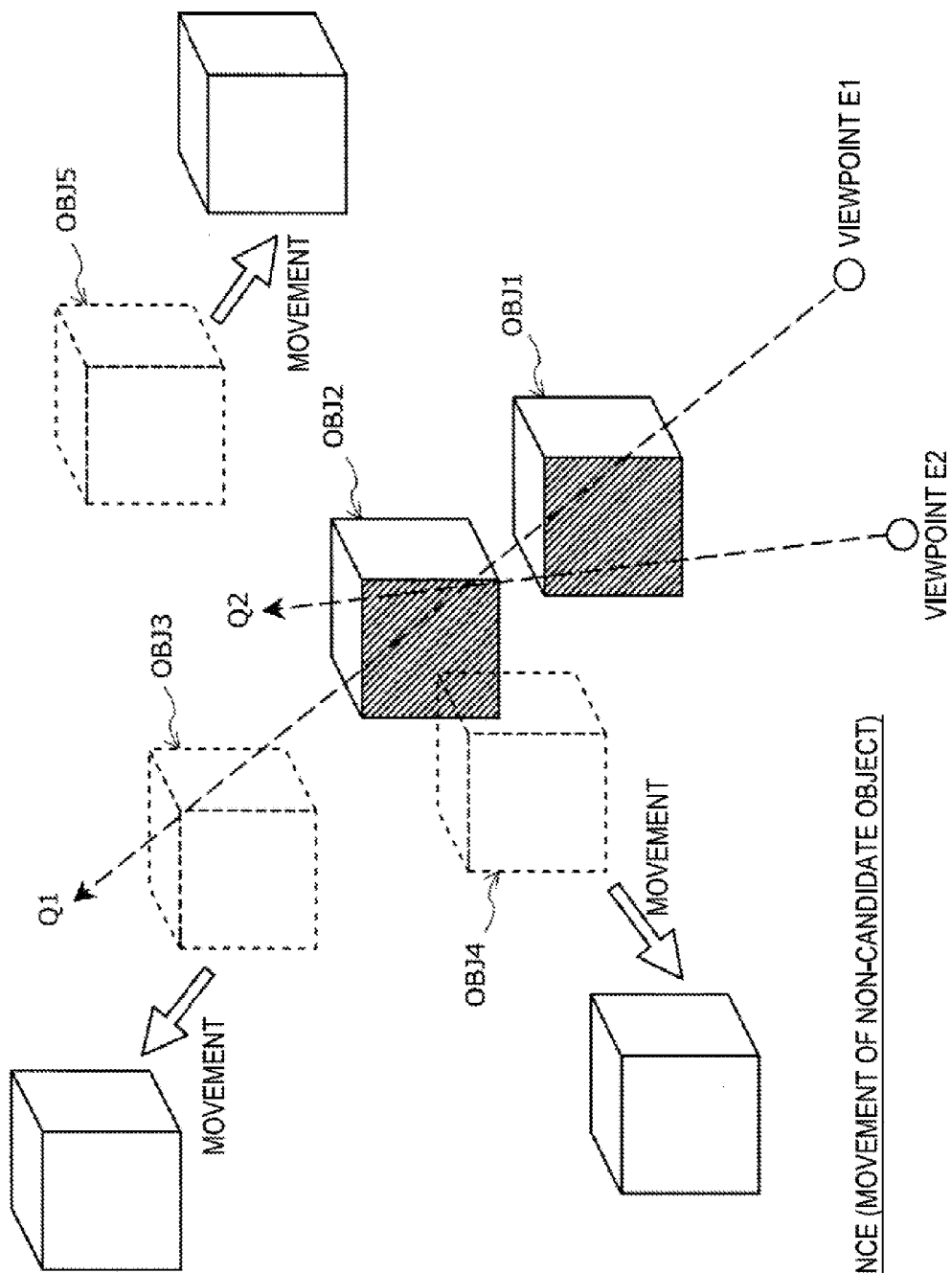
FIG. 50 is an explanatory diagram illustrating the assistance of a narrowing-down operation by movement of an object.

By applying the above-introduced method, it is possible to expect the user to be able to perform an object selection operation with comfort in many cases. However, it is ultimately necessary to implement a UI capable of being used by any user without skill. Therefore, a configuration in which an object other than a candidate is moved as illustrated in FIG. 50 so that a candidate for a gaze object is easily identified and the next narrowing-down operation is easily performed is proposed.

In addition, a method of temporarily or perpetually suppressing a display of an object other than the candidate instead of moving the object other than the candidate is also considered. As a method of suppressing a display, for example, a method of eliminating a display or performing a semi-transparent display or the like is considered. When the above-described configuration is applied, it is possible to significantly facilitate the next narrowing-down operation because a narrowing-down process can be recognized at a glance.

Figure 51:
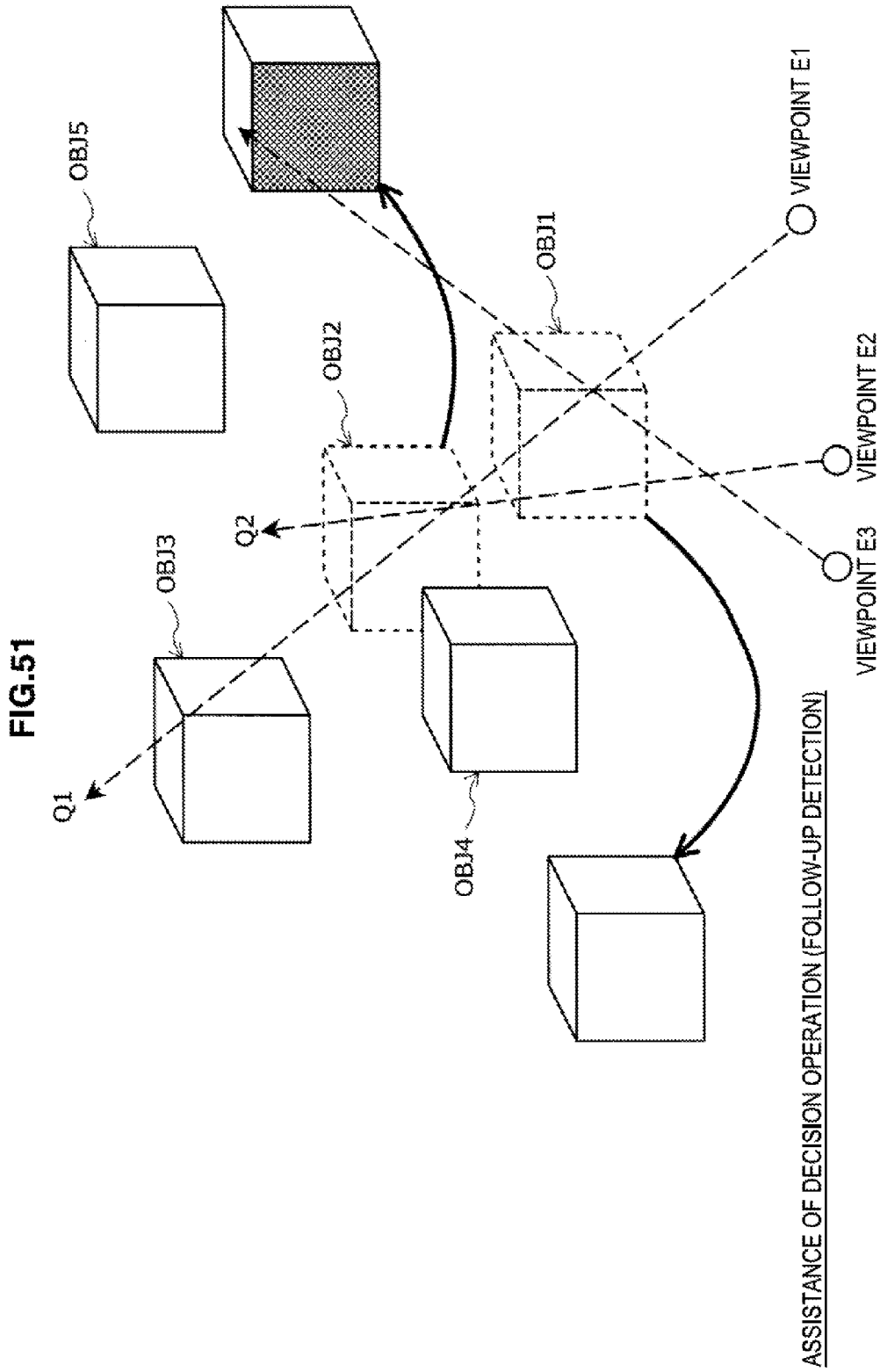
FIG. 51 is an explanatory diagram illustrating the assistance of a narrowing-down operation by movement of an object.
Figure 52:
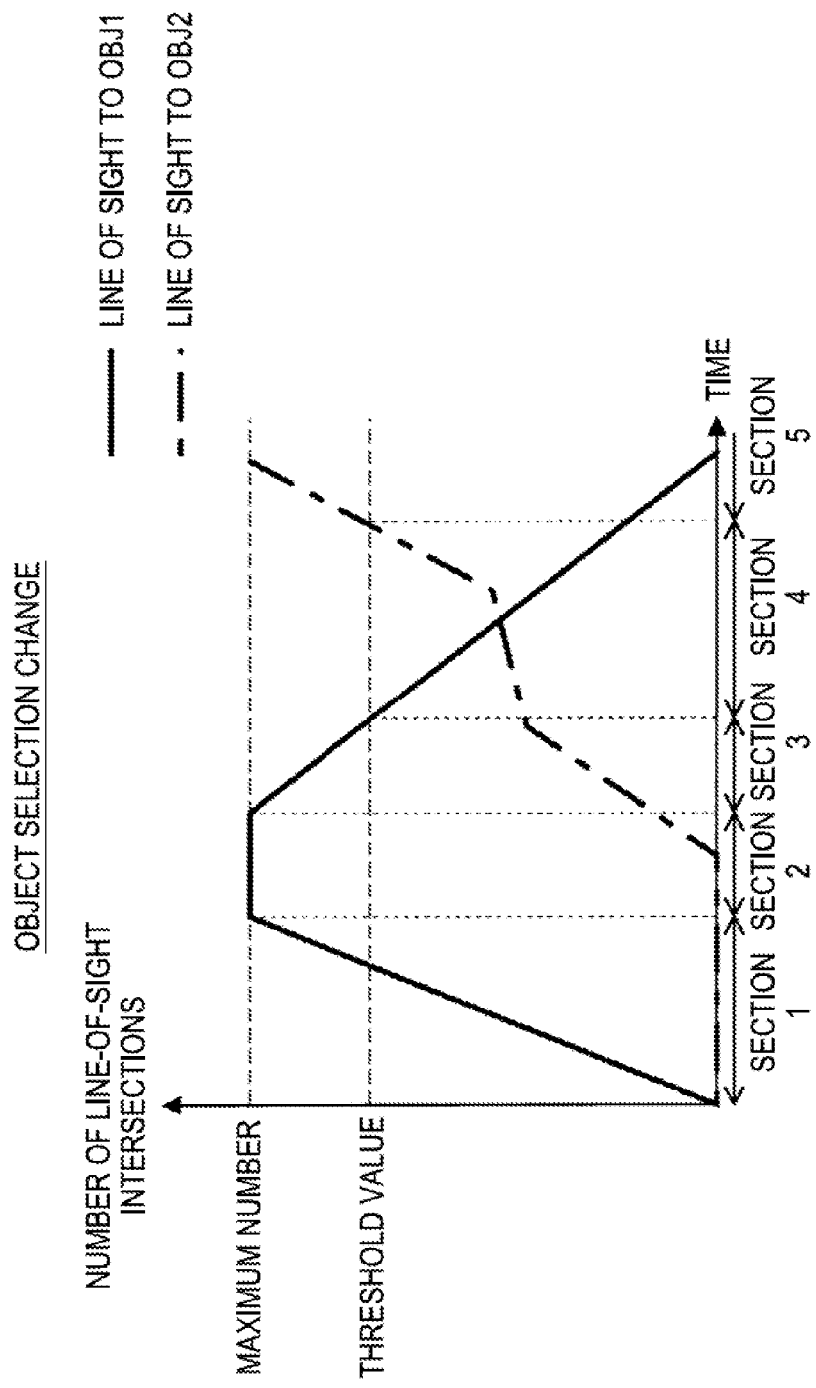
FIG. 52 is an explanatory diagram illustrating a method of changing a selection object.

In addition, as a scene in which the narrowing-down operation on the object by a line of sight is difficult, a situation in which a plurality of objects are positioned in the vicinity is considered. In the above-described situation, substantially the same number of line-of-sight intersections is maintained for the plurality of objects and the narrowing-down operation is likely not to progress indefinitely. Therefore, as illustrated in FIG. 51, a mechanism for moving objects selected as candidates for a gaze object in different directions and selecting an object detected by following a line of sight during movement as the gaze object is proposed.

Specifically, a mechanism for determining that a line of sight follows an object when the number of line-of-sight intersections for the object during movement has increased and selecting the object as a gaze object or the like is considered. By providing the above-described mechanism, the precision improvement of a selection determination and the improvement of operability can be expected.

(3-4-8: Change of Selection Object (FIG. 52))

An operation technique until the selection of an object is decided has been described above. However, a gaze object may be desired to be changed. Therefore, a mechanism in which the number of line-of-sight intersections for each object gradually decreases with the passage of time is proposed. In addition, with this mechanism, a mechanism for providing a maximum number in the number of line-of-sight intersections is proposed. For example, during gaze at an object OBJ1, the number of line-of-sight intersections for the object OBJ1 increases as illustrated in a section 1 of FIG. 52. However, when the number of line-of-sight intersections reaches the maximum number, the number of line-of-sight intersections is fixed to the maximum number even when the line of sight is directed (see a section 2). In addition, when the line of sight is diverted from the object OBJ1, the number of line-of-sight intersections decreases with the passage of time (see sections 3 to 5).

In addition, when the line of sight is diverted from the object OBJ1 and the line of sight is directed to an object OBJ2, the number of line-of-sight intersections for the object OBJ2 increases (the sections 2 to 5). Therefore, the number of line-of-sight intersections of the object OBJ2 exceeds the number of line-of-sight intersections of the object OBJ1 in the section 4 and the number of line-of-sight intersections of the object OBJ1 exceeds a predetermined threshold value (selection decision threshold value) at the beginning of the section 5. At this point in time, the object OBJ2 is selected as the gaze object. On the other hand, the object OBJ1 is less than the predetermined threshold value at an end point of the section 3, and the selection station of the gaze object is released. As described above, when the above-described mechanism is applied, it is possible to switch the selection state of the gaze object only by the line-of-sight movement.

The object selection technique and the like have been described above.

[3-5: Object Selection Method #2 (Plurality of Users)]

Next, a method of selecting an object based on lines of sight of a plurality of users will be described. The above-described object selection method #1 can also be directly applied to the case of the plurality of users. Thus, a specific scheme to be applied to the case of the plurality of users will be introduced here.

(3-5-1: Selection Method Based on Number of Line-of-Sight Intersections (FIG. 53))

Figure 53:
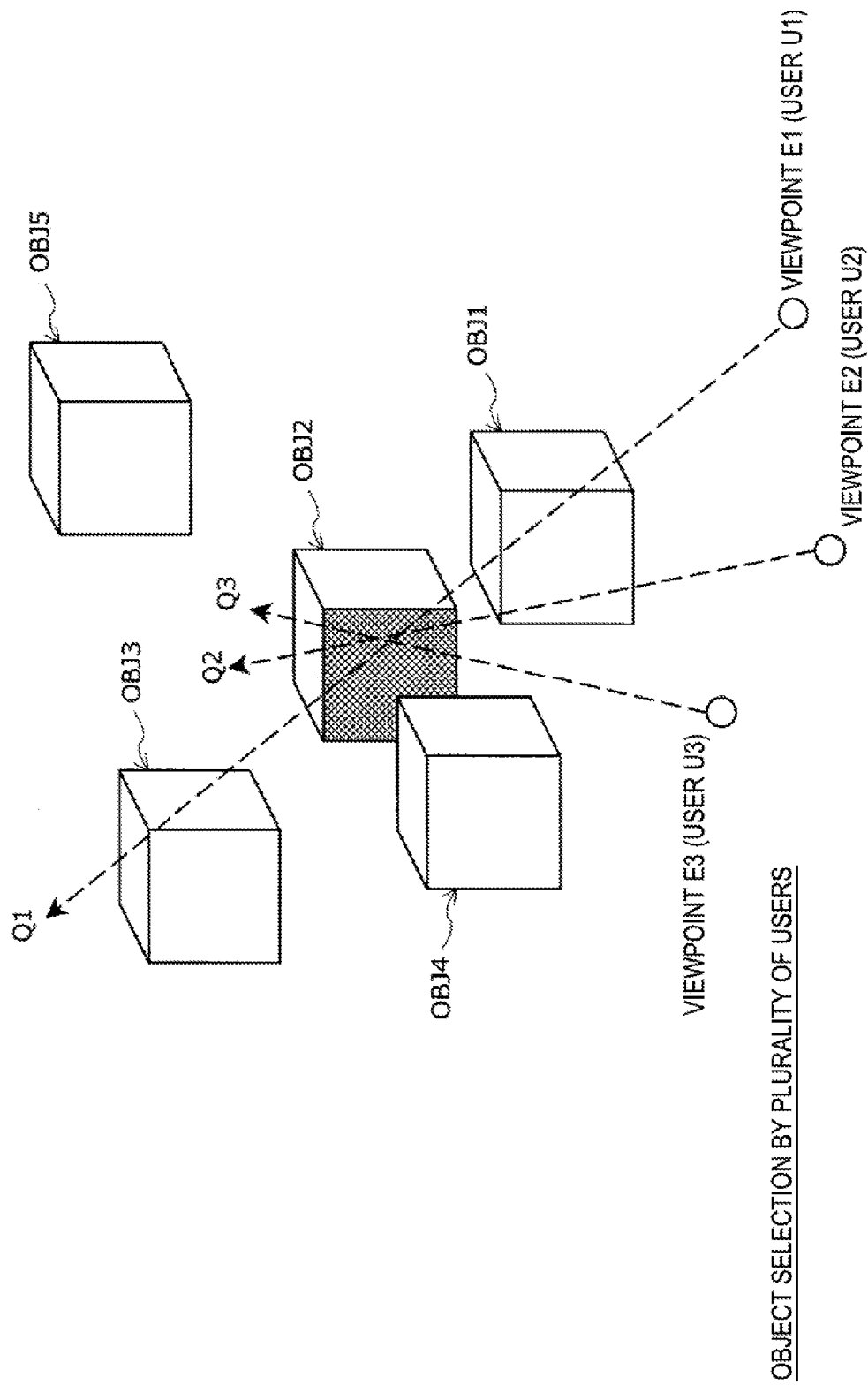
FIG. 53 is an explanatory diagram illustrating a method of selecting an object based on the number of line-of-sight intersections.

In the case of the above-described object selection method #1, an object is selected based on the number of intersections between a line of sight detected in a certain period and an object. However, when a plurality of users direct lines of sight, it is possible to count the number of line-of-sight intersections at a certain moment as illustrated in FIG. 53. In addition, a method of detecting a form in which a distribution of the number of line-of-sight intersections is temporally changed or statistically processing the detection result to use the processed detection result for marketing or the like is also considered. In this case, an intersection with each object is determined for each of a plurality of lines of sight detected at a certain timing, and one object or a predetermined number of objects having a large number of line-of-sight intersections with respect to objects are selected as observation objects.

(3-5-2: Personalization Based on Physical-Object Identification Result (Age/Sex/Registrant, Etc.) (FIG. 54))

Figure 54:
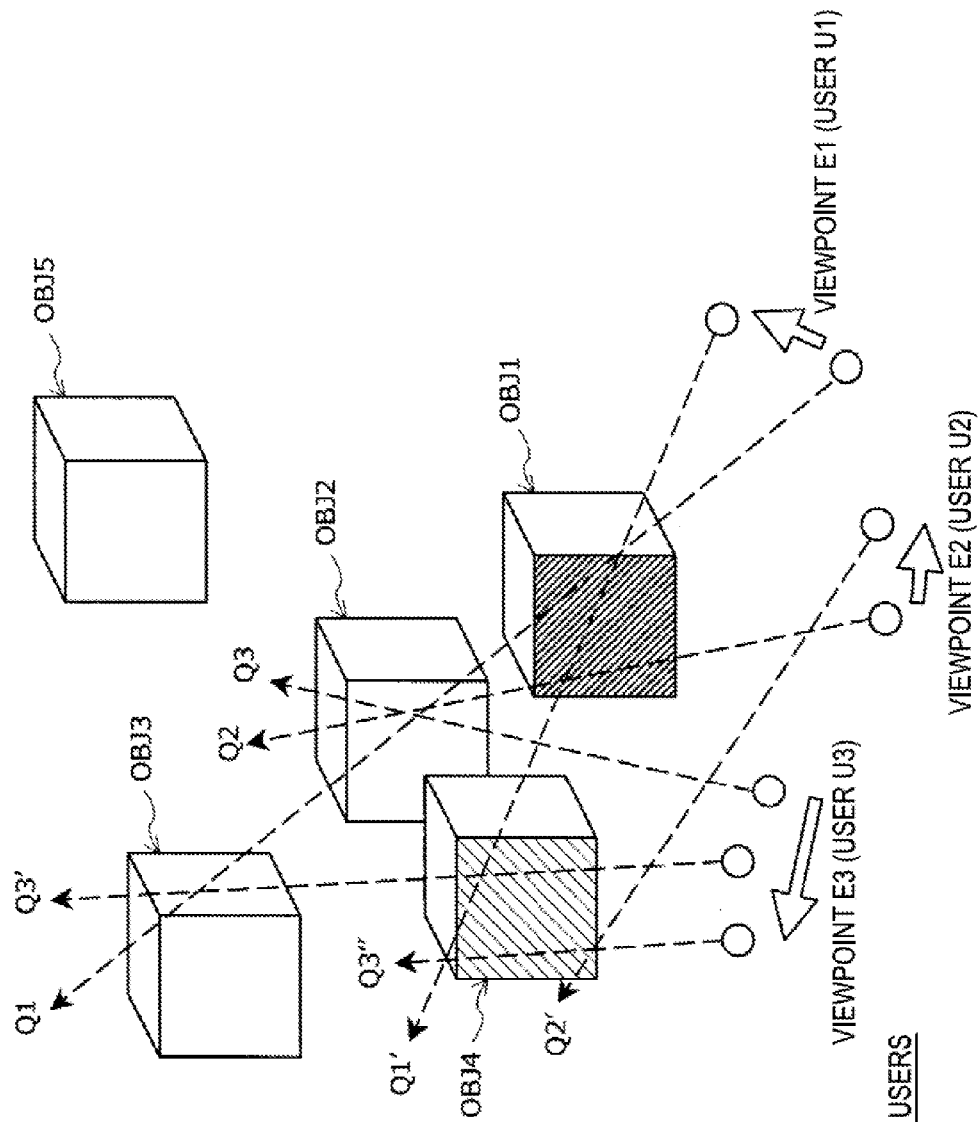
FIG. 54 is an explanatory diagram illustrating a method of selecting an object based on the number of line-of-sight intersections to which personalization is applied based on a physical-object identification result.

In addition, because each user can be identified in combination with face recognition technology or the like, each user can select a gaze object as illustrated in FIG. 54. In this case, it is desirable to assign any display (for example, a color assigned to a user, a user name, an ID, a face photo, an avatar, or the like) from which a user can be identified to an object selected as a gaze object or its candidate so that it can be determined which user has selected which object. In addition, an object can be set to be selected in units of groups instead of units of users. In this case, it is only necessary to prepare group information associated with a group and users so that the correspondence relationship between each line of sight and a group can be identified using the face identification result and the group information.

(3-5-3: Ranking Display of Selection Results (FIG. 55))

When the technology in accordance with the second example is applied, a gaze situation for each object by a plurality of users is obtained as the number of line-of-sight intersections. Thus, an object can be ranked based on the number of line-of-sight intersections. In addition, because an age or sex of each user can be discriminated when the face recognition technology or the like is used, it is possible to generate a degree-of-gaze ranking of an object for each age group or sex as illustrated in FIG. 55. Information regarding the above-described degree-of-gaze ranking may be displayed on a display screen in real time, and the information may be statistically processed and used for marketing or the like.

For example, when the technology in accordance with the second example has been executed by a digital signage terminal, it is possible to simply perform a popularity vote for new products on a street corner. In addition, if the technology in accordance with the second example is applied to a television receiver of each household, it is also possible to extract a popular program entertainer for each sex or age group, detect a product among popular commercial messages (CMs) for each family configuration, or the like. As described above, the technology in accordance with the second example can be used not only to implement an excellent UI having high operability, but also to collect various statistical data.

The object selection technique and the like have been described above.

[3-6: Display of Gaze Situation]

Next, a method of displaying a gaze situation will be described.

(3-6-1: Highlighting Corresponding to Number of Line-of-Sight Intersections (Color/Motion/Transmission, Etc.) (FIG. 56))

In the object selection process briefly introduced above, it is meaningful to notify the user of a selection situation. For example, as illustrated in FIG. 56, a method of changing a color of each object, moving each object, or changing transparency of each object according to the number of line-of-sight intersections or the like is considered. Blur representation, flickering representation, or the like is also considered. Further, a configuration in which a predetermined audio corresponding to the number of line-of-sight intersections is output when an audio output device equipped with a stereophonic sound function is connected may be made.

(3-6-2: Heat Map Display (FIG. 57))

Figure 57:
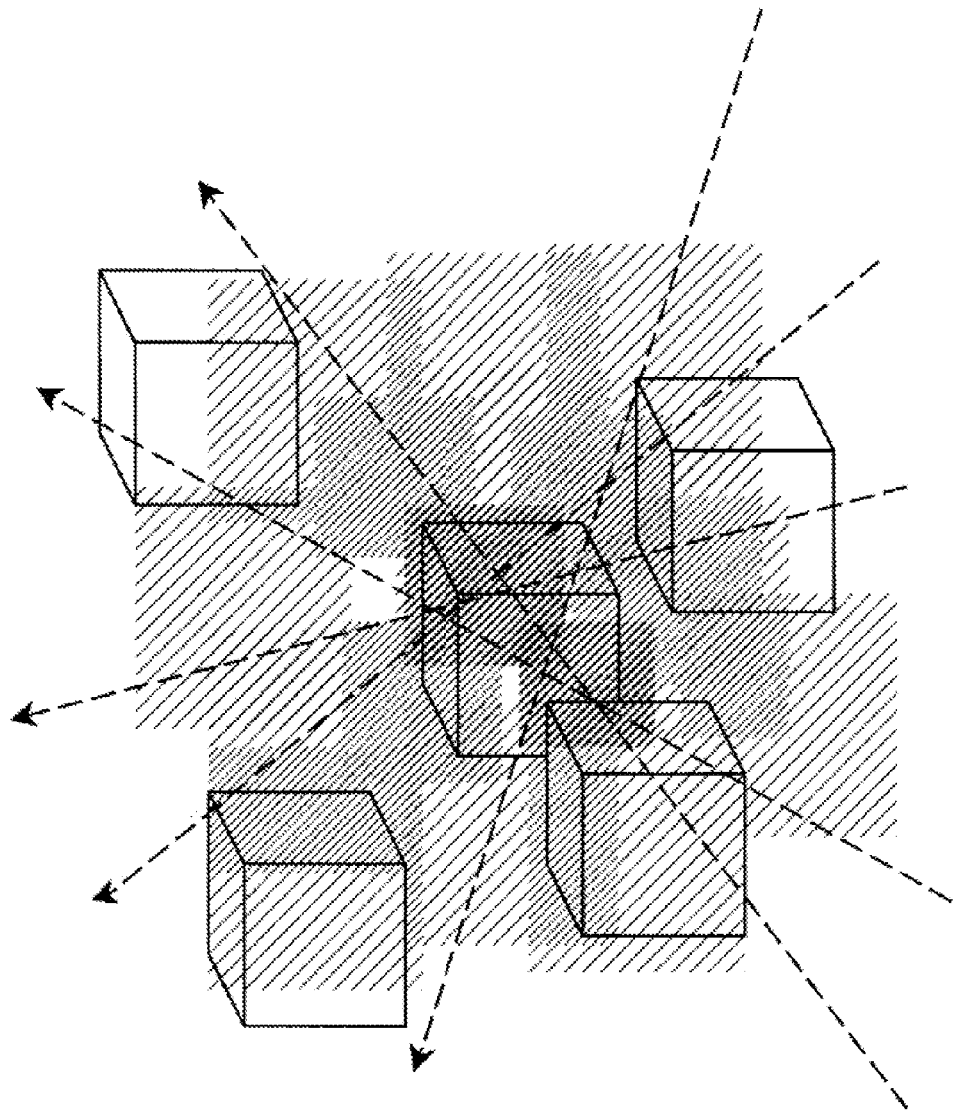
FIG. 57 is an explanatory diagram illustrating a heat map display.

In addition, although a configuration for changing the representation of each object has been described above, a method of displaying the entire space in a heat map based on the number of line-of-sight intersections as illustrated in FIG. 57 or the like is also considered. The heat map mentioned here, for example, is a representation method in which a portion having a large number of line-of-sight intersections is displayed to be dark and a portion having a small number of line-of-sight intersections is displayed to be light. Applicable representation methods include a method of changing redness or blueness and the like in addition to a gradation change. In addition, a method of displaying the inside of each object in the heat map instead of the entire space in the heat map is also considered. In particular, when the object selection method using a region division described above is applied, the heat map display of each object is effective.

(3-6-3: Display of Number of Line-of-Sight Intersections by Numeric Value or Character (FIG. 58))

Figure 58:
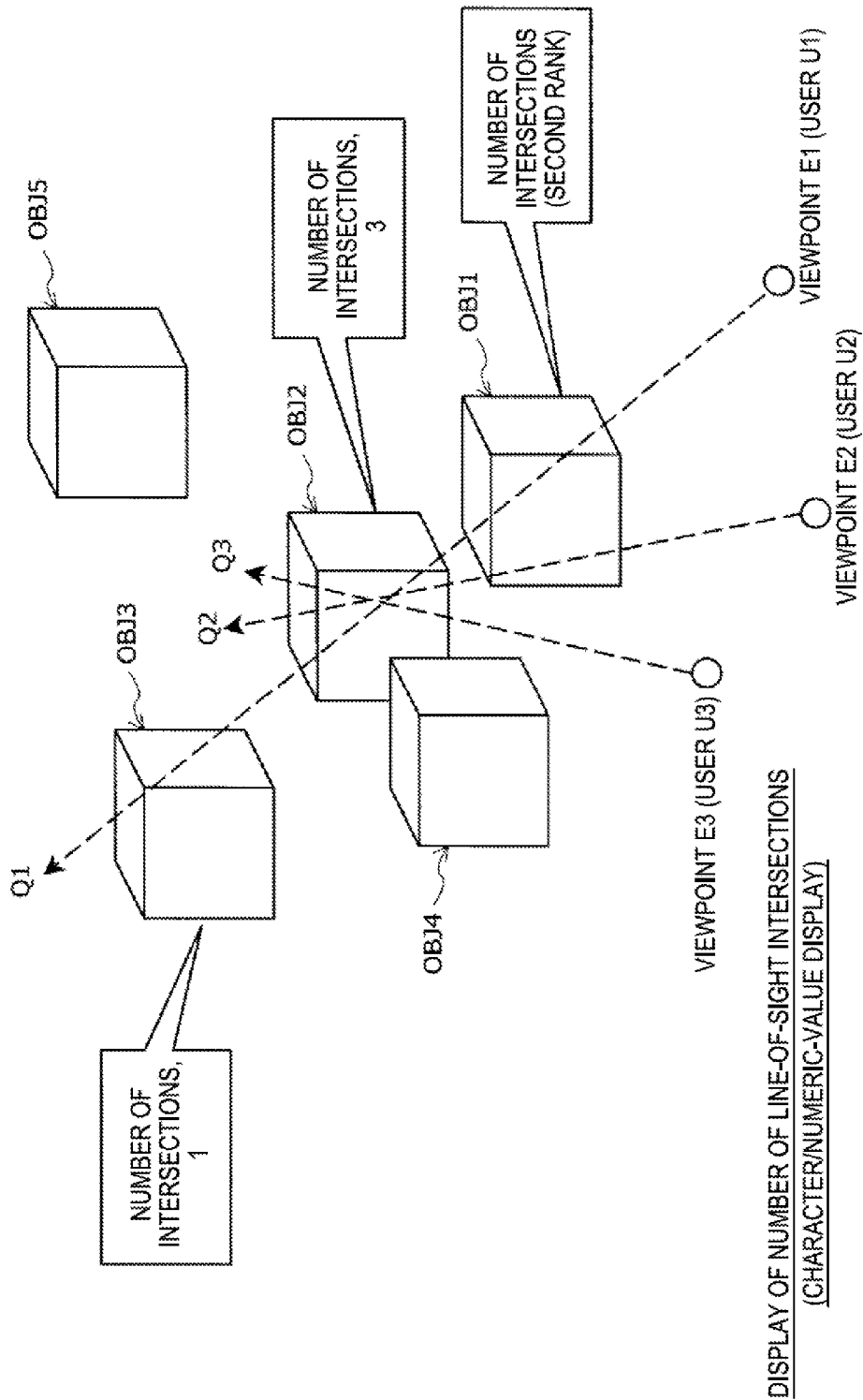
FIG. 58 is an explanatory diagram illustrating a display of the number of line-of-sight intersections by a numeric value or character.

In addition, as illustrated in FIG. 58, a method of directly displaying the number of line-of-sight intersections on a screen is considered. In the example of FIG. 58, the number of line-of-sight intersections is numerically displayed or a rank based on the number of line-of-sight intersections is displayed in text. In addition, although various representation methods using text or numbers are considered, a method of displaying information regarding the number of line-of-sight intersections using an arbitrary representation method is applicable as in FIG. 58.

(3-6-4: Display of Number of Line-of-Sight Intersections by Indicator (FIG. 59))

Figure 59:
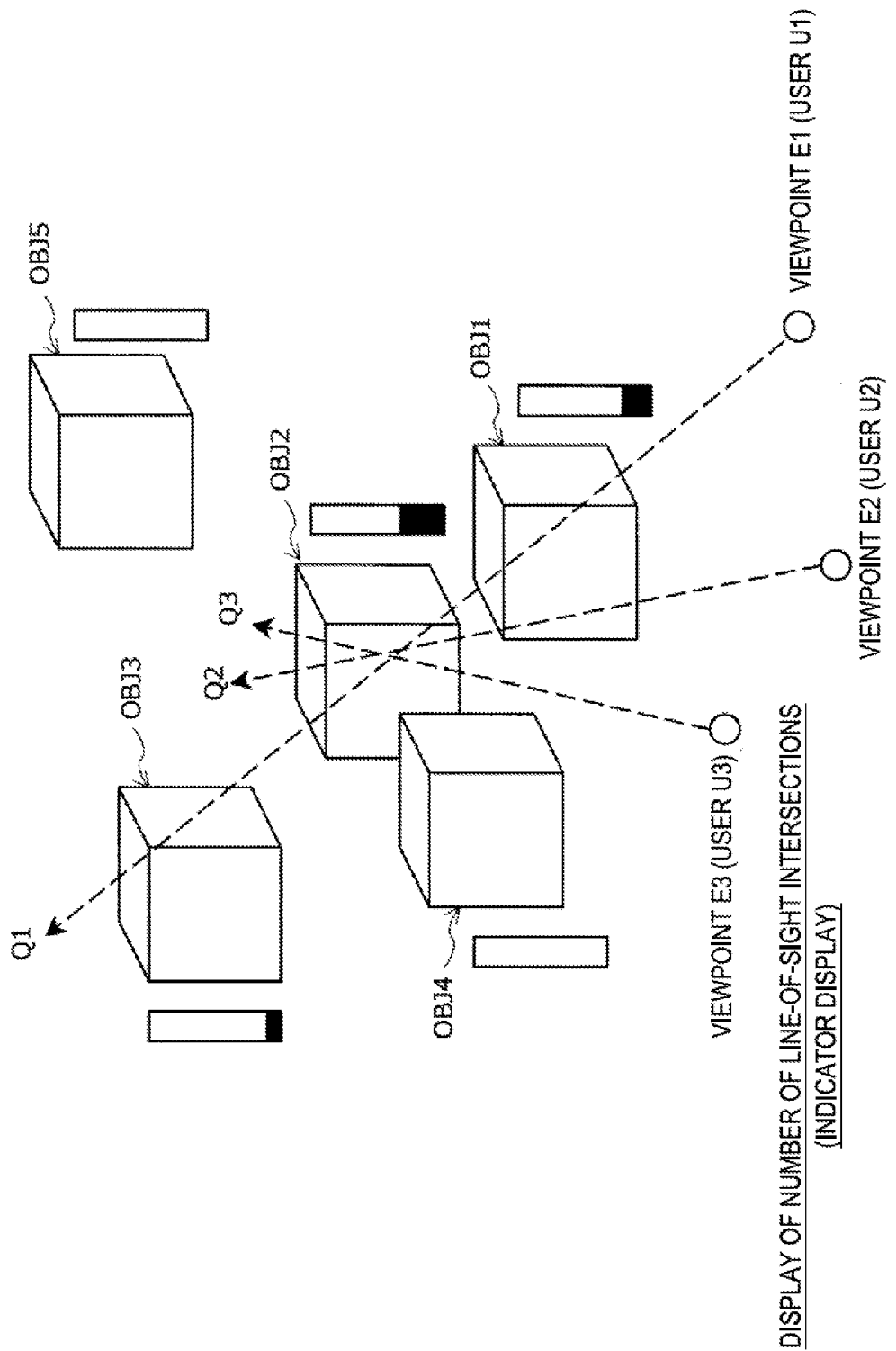
FIG. 59 is an explanatory diagram illustrating a display of the number of line-of-sight intersections by an indicator.

In addition, as illustrated in FIG. 59, a method of displaying the number of line-of-sight intersections using the indicator is also considered. When the indicator display is used, quantities of the number of line-of-sight intersections can be recognized at a glance. When a threshold value for an object selection determination is provided, the user can easily recognize whether to select the object according to how many times a line of sight is given by displaying a scale of the threshold value on the indicator.

[3-7: Cancelation Method]

Here, a method of canceling a gaze object will be briefly described. Although already suggested, for example, a blink, line-of-sight movement to the margin, a facial expression change, a gesture by a line of sight, and the like are considered as the gaze-object cancelation method. In addition, a cancelation method of applying a physical operation such as shaking the electronic device 20 itself or the like is also considered.

[3-8: Method of Considering Conspicuous Region]

Figure 60:
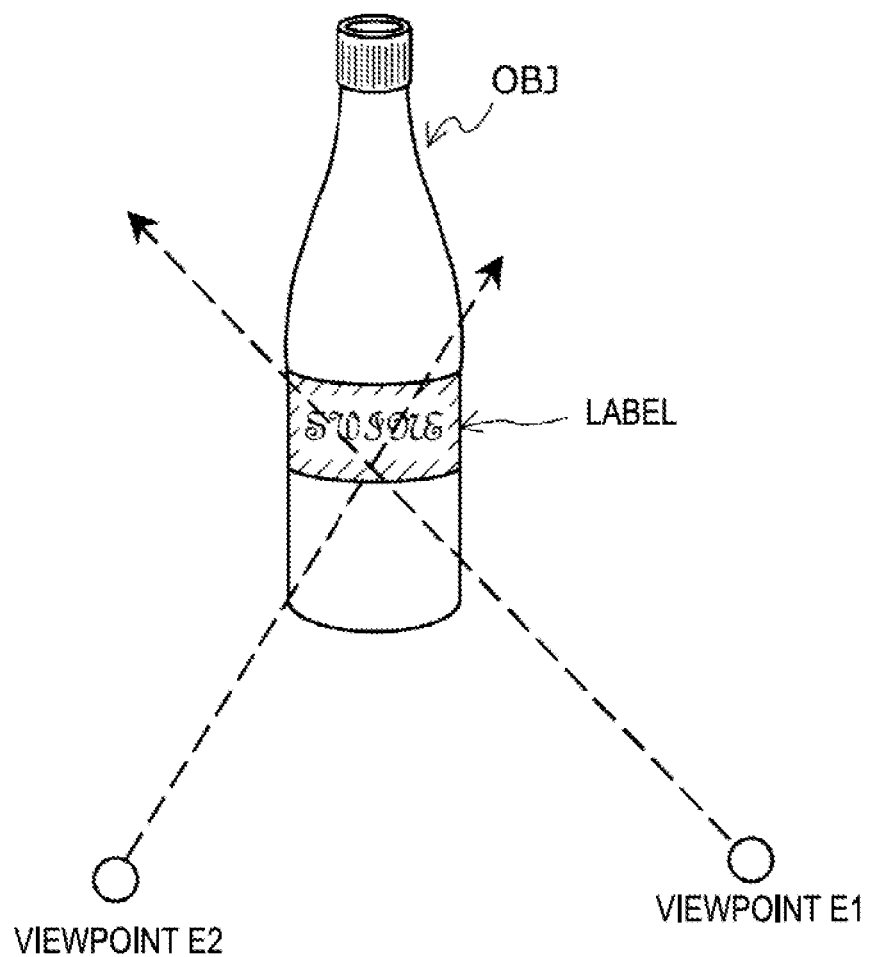
FIG. 60 is an explanatory diagram illustrating a method of weighting the number of line-of-sight intersections of a conspicuous portion.

Incidentally, there are a portion conspicuous to the user and a portion inconspicuous to the user in one object. For example, a label of a bottle as illustrated in FIG. 60 or the like is a representative example of the portion conspicuous to the user. When attracted to a certain object, the user is allowed to obtain detailed information regarding the object. In the example of the bottle illustrated in FIG. 60, the user desiring to observe the bottle will observe the label of the bottle so as to know information regarding the origin or content of the bottle and the like. If this bottle has been arranged in a shop, a price tag or the like can be a portion to be observed along with the label.

Therefore, a mechanism in which a gaze object can be selected with high precision in consideration of the user's psychology or behavior pattern or the like is proposed. For example, a method of weighting the number of line-of-sight intersections for an object when the user's line of sight has intersected its portion having a high degree of observation is considered. Specifically, a method using a value $Wb=Wa \times \omega$ obtained by multiplying a weight value $\omega$ ($\omega>1$) corresponding to the number of lines of sight intersecting the label by Wa as the number of line-of-sight intersections for an object OBJ when the number of line-of-sight intersections for the object OBJ illustrated in FIG. 60 is Wa or the like can be implemented.

If the above-described method is applied when a mechanism for selecting an object exceeding the threshold value Wth as an observation object is adopted, the user can quickly select the observation object by directing a line of sight to an observation portion such as a label. In addition, when a mechanism for selecting an object having a large number of line-of-sight intersections at a certain timing as the observation object is adopted, an object having the observation portion to which the line of sight is directed is easily selected and the selection of the observation object more precisely reflecting the user's intention is implemented. As described above, it is possible to improve the precision of selection or the smoothness of an operation and significantly increase operability by selecting an object in consideration of a region conspicuous to the user.

[3-9: Application Example]

The technology in accordance with the second example described above is applied to various devices. For example, the present technology is applicable to portable devices such as a mobile phone, a portable information terminal, a portable game machine, a portable music player, and a portable video player. In addition, the present technology can also be applied to a large display apparatus installed on a street corner such as a digital signage terminal. Further, the present technology is applicable to a video device such as a television receiver or an imaging apparatus. In addition, the present technology is applicable to a set-top box, a recording/playback apparatus, a game machine, or the like in combination with the television receiver. Also, for example, the present technology is also applicable to a car navigation system or an apparatus such as an ATM, an automatic ticket vending machine, or a vending machine. However, an apparatus having at least a display function or connected to a device equipped with the display function is necessary.

[3-10: Effects]

When the configuration of the second example is applied, the user can perform an operation by merely moving a line of sight or tilting a device, or comfortably perform an operation using a method in which there is no contact with a physical interface device. For example, an object can be selected by merely holding a device having a display screen with one hand and tilting the device or tilting one's predetermined portion. As a result, it is possible to comfortably perform an operation even in a scene in which two hands are not freely used such as when one hand is holding luggage. In addition, it is possible to perform an additional operation different from an operation using both hands in a device that is operated with both hands such as a portable game machine. Further, it is possible to operate a distant device such as a digital signage terminal away from the user.

4: APPLICATION EXAMPLE

Combination

Here, a configuration in which the first and second examples are combined as an application example will be introduced.

[4-1: Display of Object Corresponding to Line-of-Sight Direction+Selection by Line of Sight]

A UI in which the display of an object in accordance with the first example and the selection of an object in accordance with the second example have been combined will be described.

(4-1-1: Fixing of Object Display+Selection by Line-of-Sight Movement)

First, the display of an object is switched according to the operation technique in accordance with the first example. Then, display content is fixed by the operation technique in accordance with the first example. Then, the displayed object is selected by the operation technique in accordance with the second example. The first and second examples can be combined by performing the above-described operation process.

(4-1-2: Display Control by Upward/Downward Movement+ Selection Operation by Left/Right Movement)

In addition, when the operation technique in accordance with the first example is limited to upward/downward movement and the operation technique in accordance with the second example is limited to left/right movement, and the object display is switched by upward/downward/left/right viewpoint movement, it is possible to combine the object selection operation.

[4-2: Combination of Plurality of Devices]

Next, a configuration in which the plurality of devices are combined will be introduced.

(4-2-1: Portable Device (Filter)+Television Receiver (Line-of-Sight Operation))

For example, a configuration in which the operation technique of the first example is applied to the portable device and the operation technique of the second example is applied to the television receiver will be introduced. In the portable device, an operation application of the television receiver and an operation application of a recording/playback apparatus are switched by the operation technique of the first example and the switching result is transmitted to the television receiver, so that a channel switching interface corresponding to each device is displayed according to the switching result. Therefore, a configuration in which the operation technique of the second example is effective when the interface is displayed and a channel can be selected using the operation technique or the like is considered.

(4-2-2: Portable Device (Filter)+Digital Signage Terminal (Line-of-Sight Operation))

In addition, a configuration in which the operation technique of the first example is applied to the portable device and the operation technique of the second example is applied to the digital signage terminal is also considered. For example, an imaging unit of the portable device images display content for the digital signage terminal and superimposition information to be superimposed on a captured image is set to be switched by the operation technique of the first example. The switching result is reflected in a display of the digital signage terminal and a process of detecting the number of line-of-sight intersections in accordance with the second example is set to be performed for an object included in display content after the reflection. According to the above-described configuration, statistical data for information considering the selection of information by the user is obtained instead of statistical data for general information simply displayed on the digital signage terminal.

The second example has been described above.

5: HARDWARE CONFIGURATION EXAMPLE

FIG. 61

Functions of each constituent included in the electronic device 10 or 20 and the server 30 described above can be realized by using, for example, the hardware configuration of the information processing apparatus shown in FIG. 61. That is, the functions of each constituent can be realized by controlling the hardware shown in FIG. 61 using a computer program. Additionally, the mode of this hardware is arbitrary, and may be a personal computer (PC), a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 61, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is a medium for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

6: SUMMARY

Finally, the technical ideas of this embodiment will be briefly summarized. The technical ideas described hereinafter, for example, are applicable to various information processing apparatuses such as a PC, a portable phone, a portable game machine, a portable information terminal, an information appliance, and a car navigation system. These information processing apparatuses function as a control apparatus or an electronic device as will be described later. Further, the information processing apparatus can implement a control method as will be described later. In addition, it is also possible to operate the information processing apparatus according to a program as will be described later.

(1) A control apparatus including:

a control unit configured to control information to be displayed on a display screen in a manner that a different type of information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship.

When a configuration of the above-described (1) is applied, the user can move a predetermined portion or switch display information by merely tilting a device, or comfortably perform an operation using a method in which there is no contact with physical interface device. For example, the display information can be switched by merely holding a device having a display screen with one hand and tilting the device or tilting one's predetermined portion. As a result, it is possible to comfortably perform an operation even in a scene in which two hands are not freely used such as when one hand is holding luggage. In addition, it is possible to perform an additional operation different from an operation using both hands in a device that is operated with both hands such as a portable game machine.

(2) The control apparatus according to (1), wherein, when a visual recognition restriction unit, which causes a pixel group of the display screen visually recognizable by the user to be different according to an angle at which the user views the display screen, is provided on the display screen, the control unit controls the extracted information to be displayed for each pixel group corresponding to the angle of view.

(3) The control apparatus according to (1), further including:

a detection result acquisition unit configured to acquire a detection result of the positional relationship, wherein the control unit controls the extracted information corresponding to the positional relationship to be displayed on the display screen based on the detection result of the positional relationship.

(4) The control apparatus according to any one of (1) to (3), wherein, when a captured image being captured is displayed on the display screen in real time, information to be displayed on the display screen under the control of the control unit is superimposition information to be superimposed and displayed on the captured image.

(5) The control apparatus according to any one of (1) to (4), further including:

an information acquisition unit configured to acquire information to be displayed on the display screen under the control of the control unit, wherein, in a case where the positional relationship is that the predetermined portion of the user substantially faces the display screen, the information acquisition unit initially acquires information to be displayed on the corresponding display screen.

(6) The control apparatus according to (5), wherein the information acquisition unit acquires information to be displayed on the display screen in order of proximity substantially facing in the positional relationship when, in a case where a positional relationship is other than the positional relationship that the predetermined portion of the user substantially faces the display screen, acquiring a plurality of pieces of information to be displayed on the corresponding display screen.

(7) The control apparatus according to any one of (1) to (6), wherein the control unit controls an amount of information to be displayed on the display screen according to the positional relationship.

(8) The control apparatus according to (7), wherein the control unit controls an amount of information to be displayed on the display screen to increase with increase in distance from the positional relationship in which the predetermined portion of the user substantially faces the display screen.

(9) The control apparatus according to (7) or (8), wherein the amount of the information is a number of information display objects to be displayed on the display screen.

(10) The control apparatus according to (7) or (8), wherein the amount of the information is a detailed degree of information to be displayed on the display screen.

(11) The control apparatus according to any one of (1) to (10), wherein the control unit includes a function of providing information to be displayed on the display screen to an electronic device having a display unit that displays information and a display control unit that causes the information to be displayed on the display unit, and controls the electronic device to display the provided information on the display screen.

(12) An electronic device including:

a display unit configured to display information; and a control unit configured to control information to be displayed on a display screen of the display unit in a manner that a different type of information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship.

(13) A control method including:

controlling information to be displayed on a display screen in a manner that a different type of information is visually recognized according to a positional relationship between the display screen and a predetermined portion of a user viewing the display screen, wherein the information to be displayed on the display screen under control in the controlling step is information extracted from information capable of being displayed on the display screen as information having an attribute satisfying a predetermined condition set for each positional relationship.

(14) A control method including:

controlling, by an electronic device having a display unit that displays information, information to be displayed on a display screen of a display unit in a manner that a different type of information is visually recognized according to a positional relationship between the display screen and a predetermined portion of a user viewing the display screen, wherein the information to be displayed on the display screen under control in the controlling step is information extracted from information capable of being displayed on the display screen as information having an attribute satisfying a predetermined condition set for each positional relationship.

(15) A program for causing a computer to realize a control function of controlling information to be displayed on a display screen in a manner that a different type of information is visually recognized according to a positional relationship between the display screen and a predetermined portion of a user viewing the display screen, wherein the information to be displayed on the display screen under control of the control function is information extracted from information capable of being displayed on the display screen as information having an attribute satisfying a predetermined condition set for each positional relationship.

(16) A program for causing a computer to realize:

a display function of displaying information; and a control function of controlling information to be displayed on a display screen on which the information is displayed in a manner that a different type of information is visually recognized according to a positional relationship between the display screen and a predetermined portion of a user viewing the display screen, wherein the information to be displayed on the display screen under control of the control function is information extracted from information capable of being displayed on the display screen as information having an attribute satisfying a predetermined condition set for each positional relationship.

(17) A recording medium having a program recorded thereon, the program being configured to cause a computer to realize a control function of controlling information to be displayed on a display screen in a manner that a different type of information is visually recognized according to a positional relationship between the display screen and a predetermined portion of a user viewing the display screen, wherein the information to be displayed on the display screen under control of the control function is information extracted from information capable of being displayed on the display screen as information having an attribute satisfying a predetermined condition set for each positional relationship.

(18) A recording medium having a program recorded thereon, the program being configured to cause a computer to realize:

a display function of displaying information; and a control function of controlling information to be displayed on a display screen on which the information is displayed in a manner that a different type of information is visually recognized according to a positional relationship between the display screen and a predetermined portion of a user viewing the display screen, wherein the information to be displayed on the display screen under control of the control function is information extracted from information capable of being displayed on the display screen as information having an attribute satisfying a predetermined condition set for each positional relationship.

(Remarks)

The electronic devices 10 and 20 and the server 30 described above are examples of a control apparatus. The display control units 102, 112, 122, 132, 202, and 212, the superimposition information selection unit 302, and the line-of-sight analysis unit 312 described above are examples of a control unit. The above-described multi-parallax display units 101 and 121 are examples of a display screen provided with a visibility control unit. The imaging units 114, 134, 204, and 214, the head tracking units 115 and 135, the subject information acquisition unit 303, and the line-of-sight analysis unit 312 are examples of a detection result acquisition unit. The superimposition information acquisition units 103 and 113 and the communication units 203 and 311 are examples of an information acquisition unit.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus comprising:

a control unit configured to control information to be displayed on a display screen in a manner that a different type of information is visually recognized according to a positional relationship between the display screen and a predetermined portion of a user viewing the display screen; and an information acquisition unit configured to acquire information to be displayed on the display screen under the control of the control unit, wherein the information to be displayed on the display screen under control of the control unit is information extracted from information capable of being displayed on the display screen as information having an attribute satisfying a predetermined condition set for each positional relationship, wherein, in a case where the positional relationship is that the predetermined portion of the user substantially faces the display screen, the information acquisition unit initially acquires information to be displayed on the corresponding display screen, and wherein the information acquisition unit acquires information to be displayed on the display screen in order of proximity substantially facing in the positional relationship when, in a case where a positional relationship is other than the positional relationship that the predetermined portion of the user substantially faces the display screen, acquiring a plurality of pieces of information to be displayed on the corresponding display screen.

2. A control apparatus comprising:

a control unit configured to control information to be displayed on a display screen in a manner that a different type of information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship, wherein the control unit is configured to control an amount of information to be displayed on the display screen according to the positional relationship, and wherein the control unit is configured to control an amount of information to be displayed on the display screen to increase with increase in distance from the positional relationship in which the predetermined portion of the user substantially faces the display screen.

3. A control apparatus comprising:

a control unit configured to control information to be displayed on a display screen in a manner that a different type of information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship, wherein the control unit is configured to control an amount of information to be displayed on the display screen according to the positional relationship, and wherein the amount of the information is a number of information display objects to be displayed on the display screen.

4. A control apparatus comprising:

a control unit configured to control information to be displayed on a display screen in a manner that a different type of information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship, wherein the control unit is configured to control an amount of information to be displayed on the display screen according to the positional relationship, and wherein the amount of the information is a detailed degree of information to be displayed on the display screen.

5. The control apparatus according to claim 1, wherein the control unit includes a function of providing information to be displayed on the display screen to an electronic device having a display unit that displays information and a display control unit that causes the information to be displayed on the display unit, and controls the electronic device to display the provided information on the display screen.

6. An electronic device comprising:

a display unit configured to display information; and a control unit configured to control information to be displayed on a display screen of the display unit in a manner that different information is visually recognized according to a positional relationship between the display screen and a predetermined portion of a user viewing the display screen, wherein the information to be displayed on the display screen under control of the control unit is information extracted from information capable of being displayed on the display screen as information having an attribute satisfying a predetermined condition set for each positional relationship, and wherein the control unit is configured to control an amount of information to be displayed on the display screen according to the positional relationship such that when the positional relationship is changed from a first positional relationship to a second positional relationship which is different from the first positional relationship the amount of information displayed on the display screen increases with increase in distance from the positional relationship in which the predetermined portion of the user substantially faces the display screen.

7. A control method comprising:

controlling information to be displayed on a display screen in a manner that different information is visually recognized according to a positional relationship between the display screen and a predetermined portion of a user viewing the display screen, wherein the information to be displayed on the display screen under control in the controlling step is information extracted from information capable of being displayed on the display screen as information having an attribute satisfying a predetermined condition set for each positional relationship, and wherein the controlling step includes controlling an amount of information to be displayed on the display screen according to the positional relationship such that when the positional relationship is changed from a first positional relationship to a second positional relationship which is different from the first positional relationship the amount of information displayed on the display screen increases with increase in distance from the positional relationship in which the predetermined portion of the user substantially faces the display screen.

8. A control method comprising:

controlling, by an electronic device having a display unit that displays information, information to be displayed on a display screen of a display unit in a manner that different information is visually recognized according to a positional relationship between the display screen and a predetermined portion of a user viewing the display screen, wherein the information to be displayed on the display screen under control in the controlling step is information extracted from information capable of being displayed on the display screen as information having an attribute satisfying a predetermined condition set for each positional relationship, and wherein the controlling step includes controlling an amount of information to be displayed on the display screen according to the positional relationship such that when the positional relationship is changed from a first positional relationship to a second positional relationship which is different from the first positional relationship the amount of information displayed on the display screen increases with increase in distance from the positional relationship in which the predetermined portion of the user substantially faces the display screen.

9. A program stored on a non-transitory computer-readable medium for causing a computer to realize a control function of controlling information to be displayed on a display screen in a manner that a different type of information is visually recognized according to a positional relationship between the display screen and a predetermined portion of a user viewing the display screen, wherein the information to be displayed on the display screen under control of the control function is information extracted from information capable of being displayed on the display screen as information having an attribute satisfying a predetermined condition set for each positional relationship, and wherein the control function includes controlling an amount of information to be displayed on the display screen according to the positional relationship such that when the positional relationship is changed from a first positional relationship to a second positional relationship which is different from the first positional relationship the amount of information displayed on the display screen increases with increase in distance from the positional relationship in which the predetermined portion of the user substantially faces the display screen.

10. A program stored on a non-transitory computer-readable medium for causing a computer to realize:
a display function of displaying information; and
a control function of controlling information to be displayed on a display screen on which the information is displayed in a manner that a different type of information is visually recognized according to a positional relationship between the display screen and a predetermined portion of a user viewing the display screen,
wherein the information to be displayed on the display screen under control of the control function is information extracted from information capable of being displayed on the display screen as information having an attribute satisfying a predetermined condition set for each positional relationship, and
wherein the control function includes controlling an amount of information to be displayed on the display screen according to the positional relationship such that when the positional relationship is changed from a first positional relationship to a second positional relationship which is different from the first positional relationship the amount of information displayed on the display screen increases with increase in distance from the positional relationship in which the predetermined portion of the user substantially faces the display screen.

* * * * *